(12) United States Patent
Kuroda et al.

(10) Patent No.: US 7,249,883 B2
(45) Date of Patent: Jul. 31, 2007

(54) THERMOMETER, ELECTRONIC DEVICE HAVING A THERMOMETER, AND METHOD FOR MEASURING BODY TEMPERATURE

(75) Inventors: Masao Kuroda, Shiojiri (JP); Naoki Ishibashi, Shiojiri (JP); Yutaka Kobayashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 35 days.

(21) Appl. No.: 11/224,035

(22) Filed: Sep. 13, 2005

(65) Prior Publication Data

US 2006/0056487 A1 Mar. 16, 2006

(30) Foreign Application Priority Data

| Sep. 15, 2004 | (JP) | ............................. 2004-267885 |
| Nov. 12, 2004 | (JP) | ............................. 2004-328594 |
| Jan. 6, 2005 | (JP) | ............................. 2005-001155 |
| Mar. 30, 2005 | (JP) | ............................. 2005-098145 |
| Jun. 21, 2005 | (JP) | ............................. 2005-181232 |

(51) Int. Cl.
*G01K 7/00* (2006.01)
(52) U.S. Cl. .......................... 374/110; 374/30; 374/166
(58) Field of Classification Search ................. 374/30, 374/29, 110, 112
See application file for complete search history.

(56) References Cited

U.S. PATENT DOCUMENTS 6,890,096 B2* 5/2005 Tokita et al. ................ 374/163

| 2005/0141591 A1* | 6/2005 | Sakano ........................ 374/163 |
| 2005/0226310 A1* | 10/2005 | Nakazawa et al. .......... 374/208 |
| 2007/0038141 A1* | 2/2007 | Koch .......................... 600/549 |

FOREIGN PATENT DOCUMENTS

| JP | 61120026 A | 6/1986 |
| JP | 2002372464 A | 12/2002 |
| JP | 2003270051 A | 9/2003 |

* cited by examiner

*Primary Examiner*—Gail Verbitsky
*Assistant Examiner*—Mirellys Jagan
(74) *Attorney, Agent, or Firm*—Global IP Counselors, LLP

(57) ABSTRACT

A deep-area temperature calculating device 441 calculates the temperature $T_{core}$ of a deep area on the basis of a first body-surface temperature and second body-surface temperature from body-surface sensors 31A and 31B, and on the basis of a first intermediate temperature and second intermediate temperature from intermediate sensors 32A and 32B. Since the temperature $T_{core}$ of the deep area is determined from two body-surface temperatures and two intermediate temperatures, the temperature $T_{core}$ of the deep area can be calculated regardless of the heat resistance of the thermometer without making any assumptions regarding the heat resistance of the area that extends from the deep area of the human body to the body surface. Thereby, the temperature $T_{core}$ of the deep area can be calculated and the body temperature can be measured with high precision regardless of differences in the body type or contact with clothing or bedding.

8 Claims, 31 Drawing Sheets

THERMOMETER, ELECTRONIC DEVICE HAVING A THERMOMETER, AND METHOD FOR MEASURING BODY TEMPERATURE

CROSS-REFERENCE TO RELATED APPLICATIONS

This application claims priority to Japanese Patent Application Nos. 2004-267885, 2004-328594, 2005-001155, 2005-098145, and 2005-181232. The entire disclosure of Japanese Patent Application Nos. 2004-267885, 2004-328594, 2005-001155, 2005-098145, and 2005-181232 is hereby incorporated herein by reference.

BACKGROUND OF THE INVENTION

1. Field of the Invention

The present invention generally relates to a thermometer. More specifically, the present invention relates to a thermometer for measuring body temperature, an electronic device having a thermometer, and a method for measuring body temperature.

2. Background Information

Methods for measuring the temperature of the body surface of a thermal insulating material in contact with a body surface and the temperature of the outside air and calculating the temperature of a deep area have been proposed as methods for measuring the body temperature of humans and other organisms such a method is shown in Japanese Laid-Open Patent Application No. 61-120026, especially on page 3. Japanese Laid-Open Patent Application No. 61-120026 is hereby incorporated by reference.

In this measurement method, the depth from the body surface to a deep area where the core temperature can be obtained is assumed to be 2 cm, the thermal conductivity is assumed to be $1\times10^{-3}$ cal/cm·sec·° C. using the thermal conductivity of muscle, and the heat resistance of the skin is calculated. The value of this heat resistance, the heat resistance of the thermal insulating material, and the temperature of the outside air are then used to calculate the temperature of a deep area corresponding to the measured temperature of the body surface. In such a measurement method, electric power is consumed because there is no need for heaters or other such conventional heating devices that have been needed to cancel out the heat flow conducted from the organism to the thermometer.

However, organisms have various physiques. As in the case of humans, from infants to adults to the elderly, the conditions of developed muscles are largely different. Therefore, the heat transfer characteristics of various organisms are markedly different depending on their various body types, and heat resistance from the body surface to the deep areas fluctuate considerably. Therefore, in a body temperature measurement method in which the heat resistance is constant, there are differences between the measured and the actual body temperature due to the differences in body type. Also, problems occur in that the heat resistance of the thermal insulating material fluctuates when clothing or bedding or the like is in contact with the outer side of the thermal insulating material, and thus, making it impossible to obtain highly precise measurements.

In view of the above, it will be apparent to those skilled in the art from this disclosure that there exists a need for an improved a thermometer for measuring body temperature, an electronic device having a thermometer, and a method for measuring body temperature. This invention addresses this need in the art as well as other needs, which will become apparent to those skilled in the art from this disclosure.

SUMMARY OF THE INVENTION

An object of the present invention is to provide a thermometer that can measure temperature with high precision regardless of fluctuations in heat transfer characteristics resulting from differences in the body types of organisms or from contact with clothing or bedding, and to provide an electronic device having a thermometer, as well as a method for measuring body temperature.

According to a first aspect of the present invention, a thermometer has a first temperature measuring device, a second temperature measuring device. A heat flux adjusting device and a deep-area temperature calculating device. The first temperature measuring device is configured to be capable of contact with a first body surface of an organism. The first temperature measuring device is provided with a first base temperature measuring unit to measure a first base temperature from the first body surface at a first base temperature measuring position having a first heat resistance, and a first heat flux measuring unit to measure a first heat flux at the first base temperature measuring position. The second temperature measuring device is configured to be capable of contact with a second body surface at a different position from the first body surface. The second temperature measuring device is provided with a second base temperature measuring unit to measure a second base temperature from the second body surface at a second base temperature measuring position having a second heat resistance having an unknown ratio to the first heat resistance, and a second heat flux measuring unit to measure a second heat flux at the second base temperature measuring position. The heat flux adjusting device to sets the first heat flux and the second heat flux at different values. The deep-area temperature calculating device is configured to calculate the temperature of a deep area in the organism using the ratios of the first and second base temperatures, the first and second heat flux, and the first and second heat resistance.

According to this aspect of the present invention, the first base temperature and the first heat flux at the measurement position thereof and second base temperature and the second heat flux at the measurement position thereof are measured by the first temperature measuring device and the second temperature measuring device configured at different body surfaces. At this time, the heat flux of the first temperature measuring device and the heat flux of the second temperature measuring device have different values depending on the heat flux adjusting device. Therefore, a relationship of different temperatures and heat resistance is obtained with the first temperature measuring device and the second temperature measuring device.

Further, the ratio between the first heat resistance from the first body surface to the first base temperature measuring position, and the second heat resistance from the second body surface to the second base temperature measuring position is known. In other words, even if the heat resistance of the area that extends from the deep area of the organism to the body surface and the heat resistance from the surface of the organism to the base temperature measuring position are unknown, these values are eliminated from the calculation of the relationship between the two different temperatures and the heat resistance, and the temperature of the deep area of the organism is calculated. Therefore, there is no need to measure the temperature of the deep area with a known thermometer or the like.

Furthermore, there is no need to assume that the heat resistance of the area that extends from the deep area of the organism to the body surface is a fixed value, and the temperature of the deep area can thereby be accurately calculated from the body-surface temperature of the organism even if the heat transfer characteristics differ due to differences in the body type.

The term "deep area of the organism" refers to a region where there are fewer changes in temperature and a more stable temperature distribution than the temperature of the body surface; for example, the center of the body. Therefore, the temperature of the deep area is meant as the core temperature, for example. The term "core temperature" refers to a temperature in a homoiothermic animal that is unaffected by changes in heat dissipation in the environment that affects circulatory regulation or the organism exterior, and ideally refers to the average temperature in the core area. This also applies to the inventions hereinbelow.

A thermometer according to a second aspect of the present invention is the thermometer of the first aspect, wherein it is preferable that the first temperature measuring device have a first reference temperature measuring unit to measure the temperature of a first reference temperature measuring position where the heat resistance from the first body surface is different from the first heat resistance as a first reference temperature. Further, it is also preferable that the second temperature measuring device have a second reference temperature measuring unit to measure the temperature of a second reference temperature measuring position where the heat resistance from the second body surface is different from the second heat resistance, as a second reference temperature. It is also preferable that the first heat flux measuring unit calculate the first heat flux on the basis of the first base temperature, the first reference temperature, and the heat resistance between the first base temperature measuring position and the first reference temperature measuring position. It is also preferable that the second heat flux measuring unit calculate the second heat flux on the basis of the second base temperature, the second reference temperature, and the heat resistance between the second base temperature measuring position and the second reference temperature measuring position. It is also preferable that the ratio of the heat resistance between the first base temperature measuring position and the first reference temperature measuring position, and the heat resistance between the second base temperature measuring position and the second reference temperature measuring position be known.

According to the invention of the second aspect, the first heat flux and the second heat flux are obtained by measuring the first and second reference temperatures in addition to the first and second base temperatures, and using the heat resistance between the base temperatures and the reference temperatures. If the ratio of the heat resistance between the first base temperature measuring position and the first reference temperature measuring position, and the heat resistance between the second base temperature measuring position and the second reference temperature measuring position is known, then the temperature of the deep area of the organism is calculated from the two relationships between temperature and heat resistance obtained by the first temperature measuring device and the second temperature measuring device. Therefore, the temperature of the deep area of the organism is measured using only temperatures that are measured relatively easily. Also, the handling of the thermometer is improved by simplifying the base temperature measuring operation.

A thermometer according to a third aspect of the present invention is the thermometer according to the second aspect, wherein it is preferable that thermal insulating materials having common heat resistance be disposed between the first base temperature measuring position and the first reference temperature measuring position, and between the second base temperature measuring position and the second reference temperature measuring position. It is also preferable that the heat flux adjusting device have a first thermal insulating material disposed between the first reference temperature measuring position and the outside air, a second thermal insulating material disposed between the second reference temperature measuring position and the outside air, and be provided with a different heat resistance from the heat resistance of the first thermal insulating material.

According to the third aspect of the present invention, thermal insulating materials having common heat resistance are disposed between the first base temperature measuring position and the first reference temperature measuring position, and between the second base temperature measuring position and the second reference temperature measuring position. Therefore, using the same thermal insulating materials results in having the same thickness and simplifies the structure.

Also, according to such a configuration, even when the heat resistance between the reference temperature measuring positions and the outside air changes due to contact with clothing or bedding or the like, the heat resistance between the base temperature measuring position and the standard temperature measuring position are constant and common, and only the temperature difference between the base temperature and the reference temperature changes. Therefore, the temperature of the deep area of the organism is still calculated from only the measured temperature, and the temperature of the deep area is calculated accurately.

A thermometer according to a fourth aspect of the present invention is the thermometer according to the second aspect, wherein it is preferable that the heat flux adjustment device have a first thermal insulating material disposed between the first base temperature measuring position and the first reference temperature measuring position, and a second thermal insulating material disposed between the second base temperature measuring position and the second reference temperature measuring position. The first thermal insulating material and the second thermal insulating material have a common thermal conductivity and cross section, and the thickness of the first thermal insulating material and the thickness of the second thermal insulating material are different values. According to this aspect of the present invention, the heat fluxes in the first temperature measuring device and the second temperature measuring device are adjusted by varying the heat resistance between the first thermal insulating material provided between the first base temperature measuring position and the first reference temperature measuring position, and the second thermal insulating material provided between the second base temperature measuring position and the second reference temperature measuring position. Therefore, the heat flux adjusting device is configured from a first thermal insulating material and a second thermal insulating material and does not need to be provided to other positions, which simplifies the structure. Also, since the first thermal insulating material and the second thermal insulating material differ only in thickness, the thickness ratio corresponds to the ratio of the heat resistance between the first base temperature measuring position and the first reference temperature measuring position, and the heat resistance between the second base temperature measuring position and the second reference temperature measuring position. Therefore, the temperature of the deep area of the organism is calculated using the thickness ratio.

A thermometer according to a fifth aspect of the present invention is the thermometer according to any one of the second to fourth aspects, wherein it is preferable that the first heat resistance and the second heat resistance be the same values and that the following formula be stored in the deep-area temperature calculating device as the mathematical formula to calculate the temperature $T_{core}$ of the deep area $$T_{core} = \frac{\{Tb3 \cdot (Tb1 - Tb2) - \alpha \cdot Tb1 \cdot (Tb3 - Tb4)\}}{\{(Tb1 - Tb2) - \alpha \cdot (Tb3 - Tb4)\}}$$

$T_{b1}$ is a first base temperature, $T_{b2}$ is a first reference temperature, $T_{b3}$ is a second base temperature, $T_{b4}$ is a second reference temperature, and $\alpha$ is the ratio of the heat resistance between the first base temperature measuring position and the first reference temperature measuring position, and the heat resistance between the second base temperature measuring position and the second reference temperature measuring position.

According to this aspect of the present invention, since an appropriate arithmetic formula is stored in the deep-area temperature calculating device, measuring the first base temperature $T_{b1}$, the first reference temperature $T_{b2}$, the second base temperature $T_{b3}$, and the second reference temperature $T_{b4}$ and substituting the measured values into the arithmetic formula will allow the temperature $T_{core}$ of the deep area to be calculated. Therefore, there is no need to calculate the heat resistance of the area that extends from the deep area of the organism to the body surface from these measured values, and the calculation is simplified. The calculation process is thereby accelerated and the responsiveness of the thermometer is thereby improved.

A thermometer according to a sixth aspect of the present invention has a first temperature measuring device, a second temperature measuring device, a heat flux adjusting device, a temperature distribution calculating device, and a deep-area temperature calculating device. The first temperature measuring device is configured to be capable of contact with a first body surface of an organism, and is configured from a plurality of measuring units capable of measuring the temperature at positions having mutually different heat resistances from the first body surface. The second temperature measuring device is configured to be capable of contact with a second body surface at a different position from the first body surface, and is configured from a plurality of measuring units capable of measuring the temperature at positions having mutually different heat resistances from the second body surface. The heat flux adjusting device sets the heat flux of the first temperature measuring device and the heat flux of the second temperature measuring device at different values. The temperature distribution calculating device calculates a first temperature distribution from a curve approximation using the temperatures determined by the measuring units of the first temperature measuring device and the heat resistances in the measuring units. Further, the temperature distribution calculating device calculates a second temperature distribution from a curve approximation using the temperatures determined by the measuring units of the second temperature measuring device and the heat resistances in the measuring units. The deep-area temperature calculating device is configured to calculate the temperature of a deep area in the organism from the first temperature distribution and the second temperature distribution.

According to this aspect of the present invention, the temperature measuring device has a first temperature measuring device and a second temperature measuring device, and the temperature distribution calculating device calculates the temperature distributions in the first and second temperature measuring devices using the temperatures determined by the measuring units of the first and second temperature measuring devices and the heat resistances in the measuring units. The deep-area temperature calculating device calculates the temperature of the deep area using these two temperature distributions.

The heat flux of the first temperature measuring device and the heat flux of the second temperature measuring device have different values due to the heat flux measuring device, and different temperature distributions are obtained. Since the temperature of the deep area is calculated from these two temperature distributions, there is no need to measure the temperature of the deep area with a known thermometer. Therefore, the base temperature measuring procedure is simplified, and the handling of the thermometer is improved.

A thermometer according to a seventh aspect of the present invention is the thermometer according to the sixth aspect, wherein it is preferable that the temperature distribution calculating device be configured to calculate the temperature distributions by polynomial approximations.

According to this aspect of the present invention, since the temperature distributions are calculated by polynomial approximations, it is possible to calculate accurately the temperature of the deep area with a simple arithmetic formula.

A thermometer according to an eighth aspect of the present invention is the thermometer according to the sixth or seventh aspect, wherein it is preferable that at least one of the measuring units come into contact with the body surface of the organism and measure the temperature of the body surface.

According to this aspect of the present invention, since at least one of the measuring units comes into contact with the body surface, the temperature can be measured more accurately.

A thermometer according to a ninth aspect of the present invention is the thermometer according to any one of the first to eighth aspect, wherein it is preferable that the thermometer include a display device having a display unit to display the temperature of the deep area calculated by the deep-area temperature calculating device, and a thermometer main body having a first temperature measuring device and a second temperature measuring device, wherein the display device and the thermometer main body are configured as separate units.

According to this aspect of the present invention, since the display device and the thermometer main body are configured as separate units, weight reduction is facilitated in the thermometer main body that has first and second temperature measuring devices and must come into contact with the body surface of the organism. Therefore, no strain is generate when the thermometer main body is in contact with the body surface of the organism for a long period of time, and it is possible to monitor continuously the body temperature over a long period of time.

A thermometer according to a tenth aspect of the present invention is the thermometer according to the ninth aspect, wherein it is preferable that the deep-area temperature calculating device be provided to the display device.

According to this aspect of the present invention, since the deep-area temperature calculating device is provided to the display device, the structural components in the thermometer main body can be reduced to a minimum. Therefore, weight and size reductions are facilitated in the thermometer main body, and the load is even further reduced when the thermometer main body is in contact with the body surface of the organism even when the temperature is measured over a long period of time.

A thermometer according to an eleventh aspect of the present invention is the thermometer according to the ninth or tenth aspect, wherein it is preferable that the display device and the thermometer main body both include transceiver devices capable of exchanging information with each other by wireless communication.

According to this aspect of the present invention, since the display device and the thermometer main body both include transceiver devices and are configured to be capable of wireless communication with each other, it is possible for the display device to be placed a certain distance from the thermometer main body. Since the display device is not wired to the thermometer main body, the thermometer main body can be completely separated from the display device, and therefore weight reduction in the thermometer main body is further facilitated and the handling of the thermometer is improved.

For the transceiver devices, it is preferable to use wireless communication technology with low power consumption and low manufacturing costs, communication that uses faint radio waves, or specific low-power communication. This also applies to the following aspect of the present invention.

A thermometer according to a twelvth aspect of the present invention has a base temperature measuring unit, a heat flux measuring unit, a heat resistance calculating device, a storage device, and a deep-area temperature calculating device. The base temperature measuring unit to measure the base temperature from the body surface of an organism at a specific base temperature measuring position. The heat flux measuring unit to measure the heat flux at the base temperature measuring position. The heat resistance calculating device calculates the surface-layer heat resistance from the deep area in the organism to the base temperature measuring position, based on a for-calculation deep-area temperature of a deep area in the organism measured at the same time as a for-calculation base temperature measured by the base temperature measuring unit and a for-calculation heat flux measured by the heat flux measuring unit. The surface heat resistance calculated by the heat resistance calculating device is stored in the storage device. The deep-area temperature calculating device calculates the temperature of the deep area using the base temperature measured by the base temperature measuring unit, the heat flux measured by the heat flux measuring unit, and the surface-layer heat resistance stored in the storage device during body temperature measurement.

According to this aspect of the present invention, when the for-calculation base temperature and the heat flux are measured at a specific base temperature measuring position from the body surface of the organism, the heat resistance calculating device calculates the surface-layer heat resistance from the deep area of the organism to the base temperature measuring position from the temperature, the for-calculation deep-area temperature of the deep area of the organism, and the heat flux. This surface-layer heat resistance is stored in the storage device, whereby the preparations are made to measure the base temperature. When the body temperature is actually measured, the deep-area temperature calculating device calculates the temperature of the deep area of the organism from the base temperature and the heat flux using the surface-layer heat resistance calculated by the heat resistance calculating device and stored in the storage device.

Since the base temperature and the heat flux are measured by the heat resistance calculating device, and the surface-layer heat resistance is calculated based on these measurements, the heat resistance of the area that extends from the deep area to the base temperature measuring position for each organism is calculated. In other words, since the heat resistance particular to the organism is used by the deep-area temperature calculating device, the temperature of the deep area of the organism is calculated more accurately. The temperature of the deep area is thereby calculated accurately from the base temperature even when the heat transfer characteristics differ due to differences in the body type.

Another possibility is for the for-calculation deep-area temperature to be measured by a known thermometer that measures the underarm temperature or oral temperature, for example, and for the base temperature value thereof to be acquired as a for-calculation deep-area temperature. This also applies to the following aspect of the present inventions.

A thermometer according to a thirteenth aspect of the present invention is the thermometer according to the twelfth aspect, wherein it is preferable that the heat flux measuring unit have a reference temperature measuring unit to measure, as a reference temperature, the temperature at the reference temperature measuring position that is different from the base temperature measuring position, wherein the heat resistance between the base temperature measuring position is known, and the heat flux value is measured based on the base temperature, the reference temperature, and the known heat resistance.

According to this aspect of the present invention, when the for-calculation base temperature and the for-calculation reference temperature are measured at a specific base temperature measuring position from the body surface of the organism, the heat resistance calculating device calculates the surface-layer heat resistance from the deep area of the organism to the base temperature measuring position from these temperatures, the for-calculation deep-area temperature of the deep area of the organism, and the known heat resistance from the base temperature measuring position to the reference temperature measuring position. This surface-layer heat resistance is stored in the storage device, whereby preparations are made to measure the base temperature. When the body temperature is actually measured, the deep-area temperature calculating device calculates the temperature of the deep area of the organism from the base temperature, the reference temperature, and the known heat resistance using the surface-layer heat resistance calculated by the heat resistance calculating device and stored in the storage device.

Since the base temperature and the reference temperature of the organism are measured by the heat resistance calculating device in a state in which the device is in contact with the body surface of the organism, and the surface-layer heat resistance is calculated based on these temperatures, the heat resistance of the area that extends from the deep area to the base temperature measuring position for each organism is calculated. In other words, since the heat resistance particular to the organism is used by the deep-area temperature calculating device, the temperature of the deep area of the organism is calculated more accurately. The temperature of the deep area is thereby calculated accurately from the base temperature even when the heat transfer characteristics differ due to differences in the body type. Rather, since the deep-area temperature calculating device calculates the temperature of the deep area on the basis of the base temperature and the reference temperature, the body temperature measuring operation is simplified because the base temperature and the reference temperature are best measured when the body temperature is actually measured. The handling of the thermometer is thereby improved.

A thermometer according to a fourteenth aspect of the present invention has a temperature measuring device, a temperature distribution calculating device, a deep-area temperature calculating device, a heat resistance calculating device, and a storage device. The temperature measuring device is configured to be capable of contact with a body surface of an organism. Further, the temperature measuring dvice is configured from a plurality of measuring units capable of measuring the temperature at positions having mutually different heat resistances from the body surface.

The temperature distribution calculating device calculates the relationship between heat resistance and temperature as a temperature distribution from a curve approximation using the plurality of heat resistances and the temperature determined by the temperature measuring device. The deep-area temperature calculating device calculates the temperature of a deep area in the organism using the temperature distribution obtained by the temperature distribution calculating device. The heat resistance calculating device calculates the surface heat resistance from the deep area in the organism to a measuring unit nearest to the body surface by performing a curve approximation using the temperature determined by the temperature measuring device, the heat resistance, and the for-calculation deep-area temperature of the deep area in the organism that is measured at the same time as the temperature. The surface heat resistance calculated by the heat resistance calculating device is stored in the storage device. Further, the deep-area temperature calculating device is configured to calculate the temperature of the deep area of the organism using the temperature calculated by the temperature distribution calculating device and the surface heat resistance stored in the storage device.

According to this invention, the temperature in a plurality of measuring units is measured by the temperature measuring device. Since the heat resistances from the body surface to the measuring devices differ, the temperature data in the plurality of measured points with different heat resistances are acquired from among temperature distributions all the way from the deep area of the organism to the body surface, and then from the body surface through the thermometer to the outside air. The temperature distribution calculating device calculates the relationship between heat resistance and temperature from the deep area of the organism to the body surface by performing curve approximation on the basis of these multiple pieces of temperature data. The deep-area temperature calculating device calculates the temperature of the deep area of the organism using the temperature distributions.

Since the relationship between heat resistance and temperature specific to the organism is calculated by the temperature distribution calculating device from the multiple pieces of temperature data, the temperature of the deep area of the organism is calculated with consideration for the heat resistance of the area that extends from the deep area to the body surface specific to the organism. The temperature of the deep area is calculated from actual measured values and set heat resistances, and there is therefore no need to assume that the heat resistance of the area that extends from the deep area of the organism to the body surface is a fixed value. Thus, the temperature of the deep area is accurately calculated from the body-surface temperature of the organism even if the heat transfer characteristics differ due to differences in the body type.

Also, since the temperature distribution calculating device calculates the temperature distribution by curve approximation from the temperatures measured in a plurality of measuring units, the temperature distribution is more accurate than when the relationship between heat resistance and temperature is calculated by collinear approximation from two measuring points, for example. In other words, the relationship of temperature to the heat resistance from a human body or another such organism to the body surface is nonlinear even in a steady state, and errors therefore occur in the actual temperature distribution when a collinear approximation is used from measured data at two points, for example. In this aspect of the present invention, since multiple pieces of temperature data are acquired and a curve approximation is used, it is possible to calculate a temperature distribution nearer to the actual temperature distribution, and the temperature of the deep area of the organism is therefore more accurately calculated by the deep-area temperature calculating device.

The heat resistance calculating device calculates the surface-layer heat resistance from the deep area of the organism to the body surface by curve approximation using the multiple temperatures determined by the temperature measuring device, the heat resistance, and the for-calculation deep-area temperature in the deep area of the organism. This surface-layer heat resistance is stored in the storage device, whereby preparations are made to measure body temperature. When the body temperature is actually measured, the deep-area temperature calculating device calculates the temperature of the deep area of the organism from the temperature distribution calculated by the temperature distribution calculating device using the surface-layer heat resistance calculated by the heat resistance calculating device and stored in the storage device.

Since the temperatures in a plurality of measuring units are measured by the temperature measuring device, and the surface-layer heat resistance is calculated by the heat resistance calculating device while the device is in contact with the body surface of the organism on the basis of these temperatures, the heat resistance of the area that extends from the deep area to the base temperature measuring position for each organism is calculated. In other words, since the heat resistance particular to the organism is used by the deep-area temperature calculating device, the temperature of the deep area of the organism is calculated more accurately. The temperature of the deep area is thereby calculated accurately from the body-surface temperature of the organism even when the heat transfer characteristics differ due to differences in the body type.

A thermometer according to a fifteenth aspect of the present invention is the thermometer according to the fourteenth aspect, wherein it is preferable that the temperature distribution calculating device be configured to calculate the temperature distribution by polynomial approximation.

According to this aspect of the present invention, since the temperature distribution is calculated by polynomial approximation, it is possible to calculate accurately the temperature of a deep area with a simple arithmetic formula.

A thermometer according to a sixteenth aspect of the present invention is the thermometer according to the fifteenth aspect, wherein it is preferable that at least one of the measuring units come into contact with the body surface of the organism and measure the temperature of the body surface.

According to this aspect of the present invention, since at least one of the measuring units comes into contact with the body surface, a more accurate temperature measurement is made possible.

A thermometer according to a seventeenth aspect of the present invention is the thermometer of any one of the twelfth to sixteenth aspect aspect, wherein it is preferable that the thermometer include a display device having a display unit to display the temperature of the deep area calculated by the deep-area temperature calculating device, and a thermometer main body having the first temperature measuring device and the second temperature measuring device. Further, the display device and the thermometer main body are configured as separate units.

According to this aspect of the present invention, since the display device and the thermometer main body are configured as separate units, weight reduction is facilitated in the thermometer main body having the base temperature measuring unit and the heat flux measuring unit that must be in contact with the body surface of the organism. Therefore, no strain is generated when the thermometer main body is in contact with the body surface of the organism for a long period of time, and it is possible to monitor continuously the body temperature over a long period of time.

A thermometer according to a eighteenth aspect of the present invention is the thermometer of the seventeenth aspect, wherein it is preferable that the heat resistance calculating device and the deep-area temperature calculating device be provided to the display device.

According to this aspect of the present invention, since the heat resistance calculating device and the deep-area temperature calculating device are provided to the display device, the structural components of the thermometer main body are reduced to a minimum. Therefore, weight and size reductions of the thermometer main body are facilitated, and the load is further reduced during long term measurement when the thermometer main body is in contact with the body surface of the organism.

A thermometer according to a nineteenth aspect of the present invention is the thermometer of the eighteenth aspect, wherein preferable that the display device and the thermometer main body both include transceiver devices capable of exchanging information with each other by wireless communication.

According to this aspect of the present invention, since the display device and the thermometer main body both include transceiver devices and are configured to be capable of wireless communication with each other, it is possible for the display device to be placed a certain distance from the thermometer main body. Since the display device is not wired to the thermometer main body, the thermometer main body can be completely separated from the display device, and therefore weight reduction in the thermometer main body is further facilitated and the handling of the thermometer is improved.

A thermometer according to a twemtieth aspect of the present invention is the thermometer of the nineteenth aspect, wherein it is preferable that the transceiver devices be configured to be capable of receiving information about the for-calculation deep-area temperature measured by a known thermometer.

According to this aspect of the present invention, since the transceiver devices are configured to be capable of receiving the for-calculation deep-area temperature, there is no need for the operator to input manually the for-calculation deep-area temperature measured by a known thermometer, and the body temperature measuring operation is simplified. Also, since the transceiver devices for sending and receiving information between the thermometer main body and the display device are used to receive information about the for-calculation deep-area temperature, the original configuration of the transceiver devices can be put to other uses, and the configuration of the thermometer is simplified.

A thermometer according to a twenty-first aspect of the present invention is the thermometer of any one of the twelfth to twentieth aspect, wherein it is preferable that the storage device be configured to be capable of storing the surface heat resistance for multiple organisms.

According to this aspect of the present invention, since the storage device is configured to be capable of storing the surface heat resistance for multiple organisms, the body temperature can be measured by reading out the surface-layer heat resistance according to the organism even when the organism has changed, and therefore there is no need to calculate the surface-layer heat resistance again, and the measuring operation is simplified. Also, since the surface-layer heat resistance is stored for multiple organisms, the thermometer can be used multiple times, and the handling of the thermometer is simplified.

The storage device preferably can store the measurement positions of the for-calculation base temperature and the for-calculation reference temperature for each surface-layer heat resistance. The values of the surface-layer heat resistance differ depending on the measurement positions of the for-calculation base temperature and the for-calculation reference temperature. Therefore, as a result of configuring the storage device to be capable of storing these measurement positions, the thermometer can be disposed at the same measurement position, and an accurate body temperature measurement is made possible when the thermometer is used repeatedly.

A thermometer according to a twenty-second aspect of the present invention is the thermometer of any one of the first to twenty-first aspect, wherein it is preferable that the thermometer main body be configured to be capable of being attached to the body surface of an organism.

According to this aspect of the present invention, since the thermometer main body is configured to be capable of being attached to the body surface of an organism, there is no need to hold the thermometer for a fixed period of time, as is the case with conventional oral or underarm measurement, and therefore the operability and portability of the thermometer are improved. For example, when the thermometer is used with an infant or a toddler, it is difficult to maintain satisfactory contact between the thermometer and the body surface for a fixed period of time. In such cases, since the thermometer is configured to be capable of being attached to the body surface, the state of contact between the body surface and the thermometer can be satisfactorily maintained even if the infant or toddler moves, and an accurate temperature measurement is made possible.

An electronic device according to twenty-third aspect of the present invention has any of the thermometers previously described.

It is possible to provide an electronic device in which the previously described effects can be realized.

A temperature measuring method according to a twenty-fourth aspect of the present invention to measure the body temperature in a deep area of an organism has: a first temperature measuring step to measure a first base temperature at a first base temperature measuring position having a first heat resistance from a first body surface of the organism; a first heat flux measuring step to measure a first heat flux at the first base temperature measuring position; a second temperature measuring step to measure a second base temperature at a second base temperature measuring position having a second heat resistance whose ratio to the first heat resistance is known from a second body surface that is different from the first body surface; a second heat flux measuring step to measure a second heat flux at the second base temperature measuring position; and a deep-area temperature calculating step configured to calculate the temperature of a deep area in the organism using the ratios of the first and second base temperatures, the first and second heat fluxes, and the first and second heat resistance.

According to this aspect of the present invention, when the first base temperature, the first heat flux, the second base temperature, and the second heat flux are obtained in the first temperature measuring step, the second temperature measuring step, the first heat flux measuring step, and the second heat flux measuring step, then the temperature of the deep area of the organism is calculated based on these measured values in the deep-area temperature calculating step.

Since the ratio between the first heat resistance and the second heat resistance is known, these heat resistances are eliminated from the calculation, and the temperature of the deep area of the organism is calculated using the first base temperature, the first heat flux, the second base temperature, and the second heat flux. In other words, since the temperature of the deep area of the organism is calculated using only the measured values of multiple base temperatures and heat fluxes regardless of the changes in the heat resistance due to clothing or bedding, it is possible to measure the body temperature of the deep area with more precision. Also, since the temperature of the deep area is calculated from the actual measured values, it is possible to calculate the temperature of the deep area corresponding to the heat transfer characteristics of the organism without assuming that the heat resistance of the area that extends from the deep area of the organism to the body surface is a fixed value, and to measure the body temperature of the deep area with more precision.

A method of measuring body temperature according to a twenty-fifth aspect of the present invention is the method of the twenty-fourth aspect, wherein it is preferable that in the first heat flux measuring step, the temperature at a first reference temperature measuring position, where the heat resistance from the first body surface is different from the first heat resistance, is measured as the first reference temperature, and the first heat flux is calculated based on the first base temperature, the first reference temperature, and the heat flux value between the first base temperature measuring position and the first reference temperature measuring position. Further, in the second heat flux measuring step, the temperature at a second reference temperature measuring position, where the heat resistance from the second body surface is different from the second heat resistance, is measured as the second reference temperature, and the second heat flux is calculated based on the second base temperature, the second reference temperature, and the heat flux value between the second base temperature measuring position and the second reference temperature measuring position.

According to this aspect of the present invention, when the when the first base temperature, the first reference temperature, the second base temperature, and the second reference temperature are obtained in the first heat flux measuring step and the second heat flux measuring step, the temperature of the deep area of the organism is calculated based on these measured values in the deep-area temperature calculating step.

The temperature of the deep area of the organism is calculated based on the first base temperature, the first reference temperature, the second base temperature, the second reference temperature, the heat resistance between the first base temperature measuring position and the first reference temperature measuring position, and the heat resistance between the second base temperature measuring position and the second reference temperature measuring position. In other words, since the temperature of the deep area of the organism is calculated using the measured values of multiple body-surface temperatures and reference temperatures, it is possible to measure the body temperature of the deep area with more precision with a simple method of temperature measurement.

A method for measuring body temperature according to a twenty-sixth aspect of the present invention is the method according to the twenty-fourth or twenty-fifth aspect, wherein it is preferable that the first heat resistance and the second heat resistance have the same value, and the temperature $T_{core}$ of the deep area is calculated in the deep-area temperature calculating step by the following formula:

$$T_{core} = \frac{\{Tb3 \cdot (Tb1 - Tb2) - \alpha \cdot Tb1 \cdot (Tb3 - Tb4)\}}{\{(Tb1 - Tb2) - \alpha \cdot (Tb3 - Tb4)\}}$$

$T_{b1}$ is a first base temperature, $T_{b2}$ is a first reference temperature, $T_{b3}$ is a second base temperature, $T_{b4}$ is a second reference temperature, and $\alpha$ is the ratio of the heat resistance between the first base temperature measuring position and the first reference temperature measuring position, and the heat resistance between the second base temperature measuring position and the second reference temperature measuring position.

According to this aspect of the present invention, since the temperature of a deep area of an organism is calculated in the deep-area temperature calculating step from the first base temperature $T_{b1}$, the first reference temperature $T_{b2}$, the second base temperature $Tb_3$, and the second reference temperature $T_{b4}$, when these temperatures are measured, the temperature of the deep area can be calculated by substituting these measured values directly into the arithmetic formula. Therefore, there is no need to calculate the heat resistance of the area that extends from the deep area of the organism to the body surface from these measured values, and the calculation is simplified. The calculation process is thereby accelerated and the responsiveness of the thermometer is thereby improved.

A method for measuring body temperature according to twenty-seventh aspect of the present invention has: a body temperature measuring preparatory step to calculate and to store the surface-layer heat resistance from a deep area in the organism to a base temperature measuring position; and a body temperature measuring step to calculate the temperature of the deep area using the surface heat resistance calculated in the body temperature measuring preparatory step. Further, wherein the body temperature measuring preparatory step has: a base temperature measuring step to measure the for-calculation base temperature of the organism; a heat flux measuring step to measure the for-calculation heat flux at the base temperature measuring position; a heat resistance calculating step to calculate the surface heat resistance from the deep area in the organism to the base temperature measuring position on the basis of the for-calculation deep-area temperature of the deep area in the organism measured at the same time as the for-calculation base temperature and the for-calculation heat flux; and a storage step to store the surface heat resistance calculated in the heat resistance calculation step. Moreover, the body temperature measuring step has a base temperature measuring step to measure the base temperature, a heat flux measuring step to measure the heat flux, and a deep-area temperature calculating step to calculate the temperature of the deep area on the basis of the base temperature, the heat flux, and the surface heat resistance stored in the storage step.

According to this aspect of the present invention, since the temperature of a deep area of an organism is measured using the previously described thermometer, the same effects as those of the previously described thermometer are achieved. In other words, since the surface-layer heat resistance is calculated in the heat resistance calculating step using the for-calculation base temperature and the for-calculation reference temperature of the organism obtained in the calculation temperature measuring step, it is possible to calculate heat resistances specific to the organism. Therefore, it is possible to calculate the temperature of the deep area corresponding to the heat transfer characteristics of the organism, and the body temperature of the deep area can be measured with more precision.

Also, in the body temperature measuring preparatory step, if the surface-layer heat resistance is calculated and stored in advance, the temperature of the deep area is calculated using the stored surface-layer heat resistance in the body temperature measuring step, and therefore the body temperature measuring preparatory step can be omitted when measuring the body temperature a second time and all subsequent times. Therefore, the body temperature measuring operation is simplified, and the body temperature measuring time is shortened.

A method of measuring body temperature according to a twenty-eighth aspect of the present invention is the method of the twenty-seventh aspect, wherein it is preferable that in the heat flux measuring step, the temperature at a reference temperature measuring position, which is different than the base temperature measuring position and has a known heat resistance with respect to the base temperature measuring position, be measured as a reference temperature, and the heat flux value be calculated based on the base temperature, the reference temperature, and the known heat resistance.

According to this aspect of the present invention, the heat flux is measured with a simple method of temperature measurement.

A method to measure body temperature in a deep area of an organism according to a twenty-ninth aspect of the present invention has: a temperature measuring step to measure the temperatures at positions having mutually different heat resistances from the body surface of the organism; a temperature distribution calculating step to calculate the relationship between heat resistance and temperature as a temperature distribution by curve approximation using the multiple heat resistances and a plurality of temperatures measured in the temperature measuring step; and a deep-area temperature calculating step to calculate the temperature in a deep area of the organism using the temperature distribution calculated in the temperature distribution calculating step.

According to this aspect of the present invention, the temperature in a plurality of measuring units is measured by the temperature measuring step. Since the heat resistances from the body surface to the measuring devices differ, the temperature data in the plurality of measured points with different heat resistances are acquired from among temperature distributions all the way from the deep area of the organism to the body surface, and then from the body surface through the thermometer to the outside air. The temperature distribution calculating step calculates the relationship between heat resistance and temperature from the deep area of the organism to the body surface by performing curve approximation on the basis of these multiple pieces of temperature data. The deep-area temperature calculating step then calculates the temperature of the deep area of the organism using this temperature distribution.

Since the relationship between heat resistance and temperature specific to the organism is calculated in the temperature distribution calculating step from the multiple pieces of temperature data, the temperature of the deep area of the organism is calculated with consideration for the heat resistance of the area that extends from the deep area to the body surface specific to the organism. The temperature of the deep area is calculated from actual measured values and a set heat resistance, and there is therefore no need to assume that the heat resistance of the area that extends from the deep area of the organism to the body surface is a fixed value, whereby the temperature of the deep area is accurately calculated from the body-surface temperature of the organism even if the heat transfer characteristics differ due to differences in the body type.

Also, since the temperature distribution calculating step calculates the temperature distribution by curve approximation from the temperatures measured in the plurality of measuring units, the temperature distribution is more accurate than when the relationship between heat resistance and temperature is calculated by collinear approximation from two measuring points, for example. In other words, the relationship of the temperature to the heat resistance from a human body or another such organism to the body surface is nonlinear even in a steady state, and therefore errors occur in the actual temperature distribution when collinear approximation is used from measured data at two points, for example. In this invention, since multiple pieces of temperature data are acquired and curve approximation is used, it is possible to calculate a temperature distribution nearer to the actual temperature distribution, and therefore the temperature of the deep area of the organism is more accurately calculated in the deep-area temperature calculating step.

The deep-area temperature calculating device, the temperature distribution calculating device, and the heat resistance calculating device may be implemented using an IC or other such hardware, or they may be implemented by providing the thermometer with a computer and executing a thermometer control program in the computer.

Specifically, the thermometer control program allows the computer provided to the thermometers to function as the deep-area temperature calculating device, the temperature distribution calculating device, or the heat resistance calculating device.

Also, the thermometer control program may be installed on the thermometer via a wireless or wired network or a computer-readable recording medium on which the thermometer control program is recorded.

With the thermometer, the electronic device having a thermometer, and the method for measuring body temperature according to the present invention, the body temperature in a deep area is calculated in an organism by using the measured values of temperatures from the body surface to positions having common heat resistance. It is therefore possible to measure the body temperature in deep areas with better precision regardless of the differences in heat transfer characteristics due to the body type of the organism or due to contact with clothing or bedding.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The first embodiment of the present invention is described hereinbelow with reference to the diagrams. In the second and subsequent embodiments described below, identical components and components having the same functions as the structural components in the first embodiment described below are denoted by the same symbols.

Figure 1:
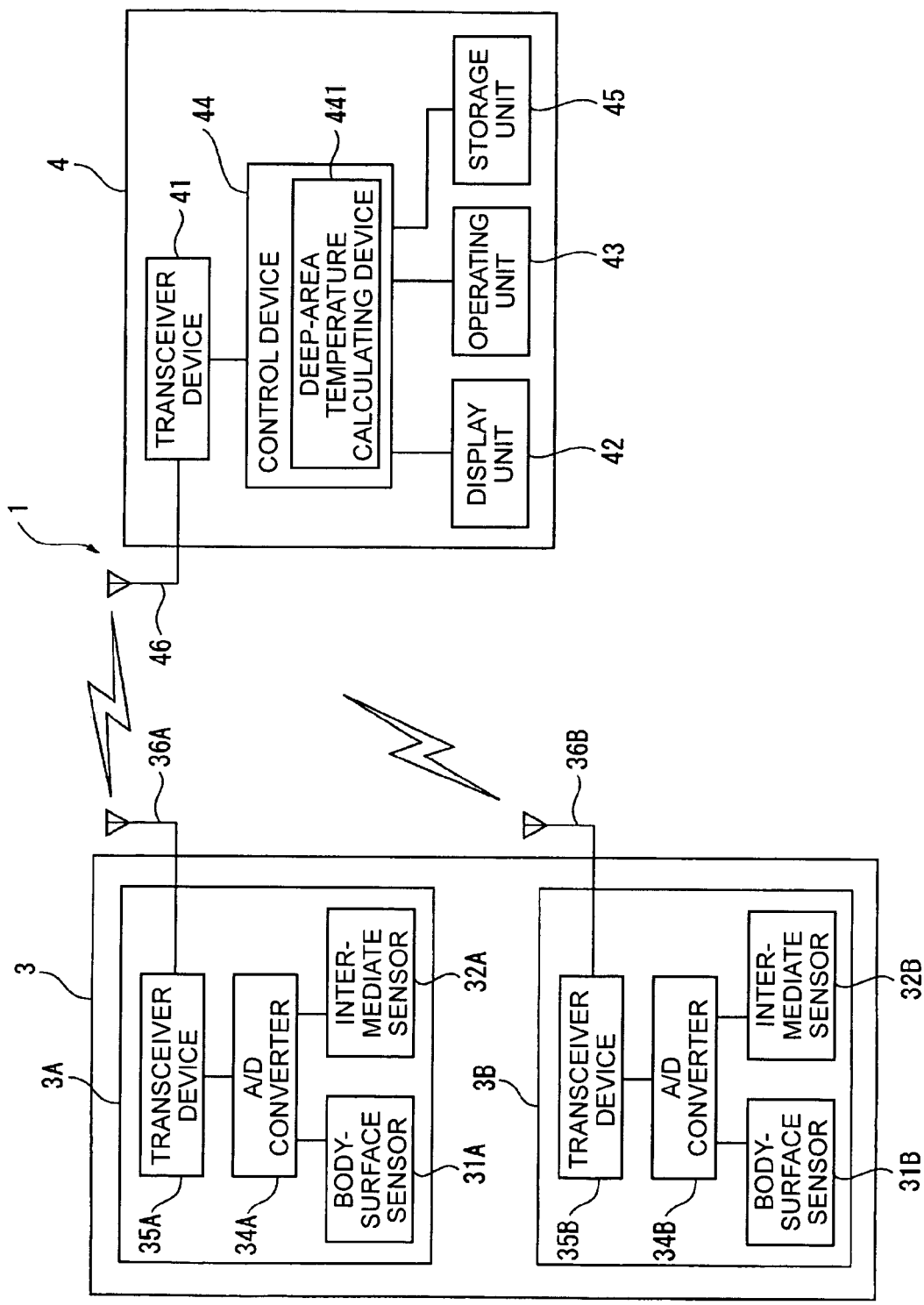
FIG. 1 is a view of a block diagram showing a thermometer according to a first preferred embodiment of the present invention.

FIG. 1 shows a block diagram of a thermometer 1 according to the present embodiment. This thermometer 1 includes a thermometer main body 3 that comes into contact with a body surface 2A (see FIG. 3) of a human body 2 (see FIG. 3) as the organism, and a display device 4 provided separately from the thermometer main body 3.

Figure 2:
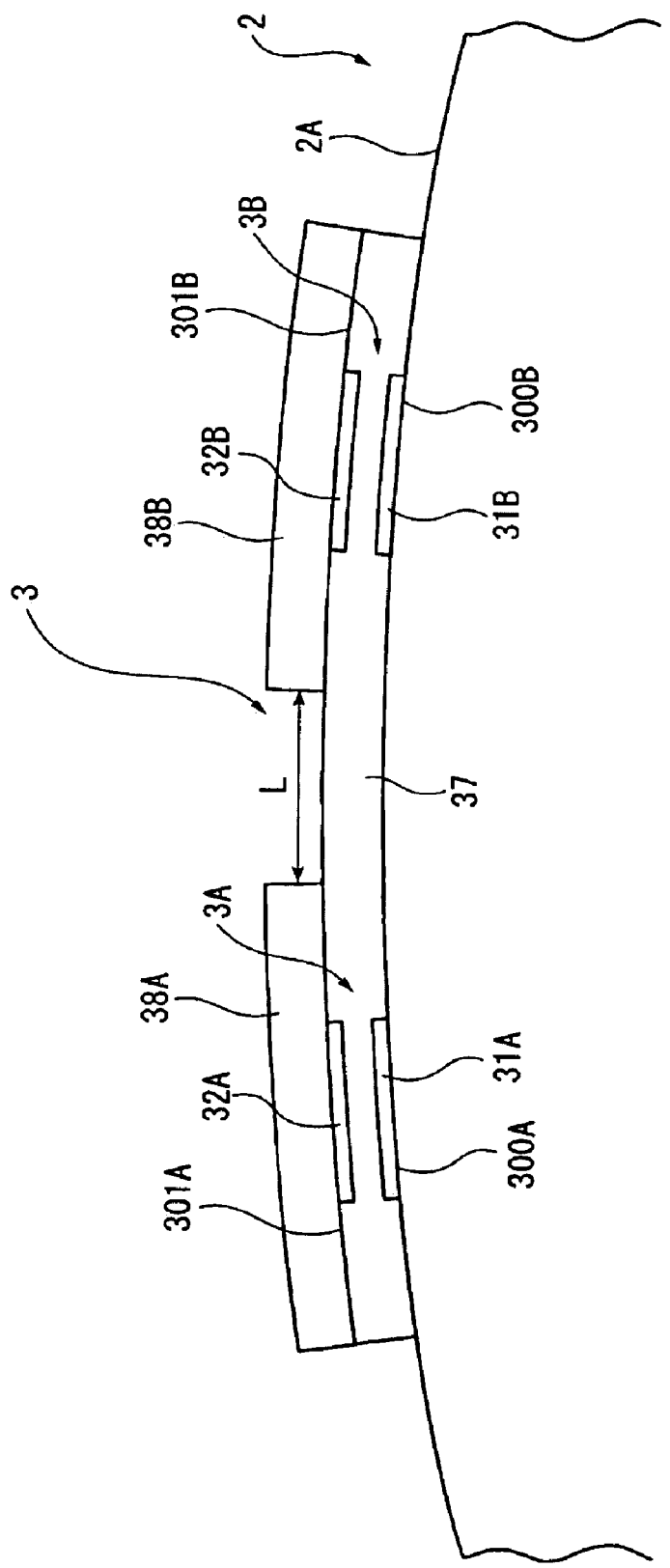
FIG. 2 is a view of a diagram showing a main body of the thermometer of the first embodiment.
Figure 3:
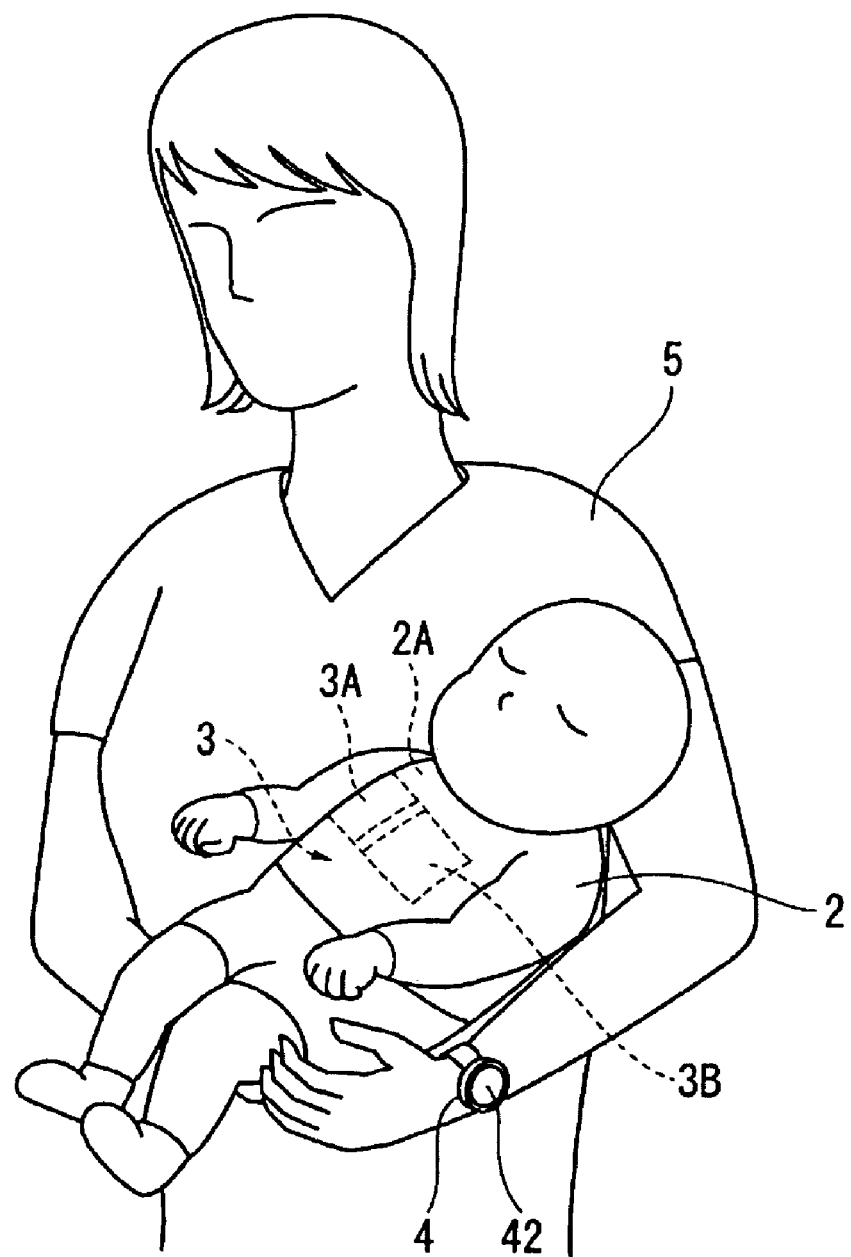
FIG. 3 is a view of a diagram showing the thermometer main body and a display device of the thermometer of the first embodiment.

FIG. 2 shows an enlarged view of the thermometer main body 3 mounted on the human body 2, and FIG. 3 shows a drawing of the thermometer main body 3 and the display device 4 in the mounted state.

First, as shown in FIG. 2, the thermometer main body 3 includes two (a pair of) temperature measuring devices 3A and 3B as first and second temperature measuring devices. The temperature measuring device 3A includes a thermal insulating material 37 having a contact surface 300A that comes into contact with the body surface 2A of the human body 2, and, as a heat flux adjusting device, a thermal insulating material 38A as a first thermal insulating material provided between the thermal insulating material 37 and the outside air. The temperature measuring device 3B includes a thermal insulating material 37 having a contact surface 300B that comes into contact with the body surface 2A at a different position from the contact position of the temperature measuring device 3A, and, as a heat flux adjusting device, a thermal insulating material 38B as a second thermal insulating material between the thermal insulating material 37 and the outside air. Specifically, the thermal insulating materials 37 are preferably the same for both the temperature measuring device 3A and the temperature measuring device 3B, and have the same heat resistance.

The temperature measuring device 3A includes a body-surface sensor 31A as a first base temperature measuring unit to measure the temperature of the body surface 2A as a first base temperature, and an intermediate sensor 32A as a first reference temperature measuring unit to measure the temperature of the interface 301A between the thermal insulating material 37 and the thermal insulating material 38A as a first reference temperature.

Also, the temperature measuring device 3B includes a body-surface sensor 31B as a second base temperature measuring unit to measure the temperature of the body surface 2A as a second base temperature, and an intermediate sensor 32B as a second reference temperature measuring unit to measure the temperature of the interface 301B between the thermal insulating material 37 and the thermal insulating material 38B as a second reference temperature.

The thermometer main body 3 composed of these temperature measuring devices 3A and 3B is configured so that the contact surfaces 300A and 300B can both be attached to the human body 2 by an adhesive or the like, and can be attached to the body surface 2A with a satisfactory amount of contact pressure with this adhesive. In the present embodiment, the thermometer main body 3 is attached to the chest of an infant (human body 2).

It is preferable that the adhered position of the thermometer main body 3 be attached to the forehead, the back of the neck, the chest, the back or another such location where the body-surface temperature can be measured in a relatively stable manner. Also, the thermometer main body 3 may be in contact with bedding even if clothing is worn over the thermometer main body 3. Furthermore, the thermal insulating materials 37, 38A, and 38B are preferably large enough so that when the temperature measuring devices 3A and 3B are attached to the body surface 2A, the heat flux from the inside of the human body 2 through the body surface 2A and the thermal insulating materials 37, 38A, and 38B to the surface can be approximated to be constant in a stationary state. In other words, the dimensions of the thermal insulating materials 37, 38A, and 38B are preferably selected so that when the movement of heat is balanced, this movement can be ignored in a direction substantially orthogonal to the direction joining the inside of the human body 2 with the position of the body surface 2A where the temperature measuring devices 3A and 3B are attached, that is, in the direction along the body surface 2A. The movement of heat from the inside of the human body 2 to the body surface 2A can be considered to be uniaxial, and the heat flux can be approximated to be moving in one direction.

The temperature measuring device 3A and the temperature measuring device 3B are disposed at a specific distance L from each other. The specific distance L is preferably set to a specific value or greater so that the movement of heat from the inside of the human body 2 to the body surface 2A can be considered to be uniaxial, that is, so that the movement of heat in the direction along the body surface 2A between the temperature measuring devices 3A and 3B can be ignored.

Also, the thermal insulating material 37 is provided separately from the portion of the temperature measuring device 3A and the portion of the temperature measuring device 3B, and may be entirely separated from the temperature measuring device 3A and the temperature measuring device 3B.

Furthermore, the thermal insulating material 38A of the temperature measuring device 3A and the thermal insulating material 38B of the temperature measuring device 3B are configured from different materials, and thereby the heat resistance value of the thermal insulating material 38A and the heat resistance value of the thermal insulating material 38B are set to different values. Therefore, the heat flux of the temperature measuring device 3A and the heat flux of the temperature measuring device 3B are different values.

The body-surface sensors 31A and 31B and the intermediate sensors 32A and 32B can be designed to convert the temperature of the body surface 2A and the temperatures of the interfaces 301A and 301B to resistance, or to convert the temperature to voltage. Chip thermistors, flexible printed boards on which thermistor patterns are printed, or platinum resistance thermometer bulbs can be used to convert temperature to resistance. Thermocouple elements, PN bonding elements, or diodes can be used to convert temperature to voltage.

Also, as shown in FIG. 1, the temperature measuring devices 3A and 3B respectively include A/D converters 34A and 34B, and transceiver devices 35A and 35B in addition to the body-surface sensors 31A and 31B and the intermediate sensors 32A and 32B. Since the temperature measuring devices 3A and 3B are formed integrally, it is possible to incorporate the A/D converters 34A and 34B as shared A/D converters, and the transceiver devices 35A and 35B as shared transceiver devices.

The A/D converters 34A and 34B convert analog signals of the resistance values or voltage values converted by the body-surface sensors 31A and 31B and the intermediate sensors 32A and 32B into digital signals, and output the signals to the transceiver devices 35A and 35B. RF converters that utilize CR oscillation may also be used instead of the A/D converters 34A and 34B.

The transceiver devices 35A and 35B respectively include antenna coils 36A and 36B. The signals of the temperature values (resistance values or voltage values) converted to digital signals by the A/D converters 34A and 34B are transmitted by radio waves to the display device 4. The antenna coils 36A and 36B can also be common antenna coils.

The display device 4 is configured to be portable in wristwatch style, and is designed so that the operator 5 holding the infant can attach the thermometer main body 3 to the infant, as shown in FIG. 3. As shown in FIG. 1, the display device 4 includes a transceiver device 41 to exchange signals with the thermometer main body 3, a display unit 42 to display the results of measuring the body temperature, an operating unit 43 to operate the display device 4 from the exterior, a control device 44 to control the operation of the display device 4, and a storage unit 45 to store information obtained from the transceiver device 41 and the control device 44.

The transceiver device 41 includes an antenna coil 46 and exchanges radio waves with the antenna coils 36A and 36B of the thermometer main body 3. The antenna coil 46 generates electromotive force in the antenna coils 36A and 36B through electromagnetic induction by transmitting radio waves to the antenna coils 36A and 36B, and charges the temperature measuring devices 3A and 3B. Therefore, the thermometer main body 3 is driven by this electromotive force, and there is no need for an internal battery or other such power source.

The display unit 42 displays temperature information and an operating screen shot on a liquid crystal screen or the like, and is capable of displaying the measured body-surface temperature or the calculated temperature of deep areas, for example. In the present embodiment, the display unit 42 is provided in a portion corresponding to a regular dial plate in a wristwatch, and the display unit 42 is visible when the operator 5 has strapped the display device 4 to the wrist.

The operating unit 43 is configured so that information can be input from the exterior to the display device 4 by buttons, levers, keys, or the like, and is also configured, for example, so that a menu can be selected according to the screen displayed on the display unit 42 and that the name and age of the person to be measured (the infant in the present embodiment), the date and time of the body temperature measurement, and other such information can be input.

The control device 44 includes a deep-area temperature calculating device 441 that calculates the temperature of deep areas in the human body 2 on the basis of a first body-surface temperature and a second body-surface temperature from the body-surface sensors 31A and 31B, and a first intermediate temperature and a second intermediate temperature from the intermediate sensors 32A and 32B.

The deep-area temperature calculating device 441 calculates the temperature $T_{core}$ of deep areas in the human body 2 using the first body-surface temperature (first base temperature) $T_{b1}$ obtained by the body-surface sensor 31A, the first intermediate temperature (first reference temperature) $T_{b2}$ obtained by the intermediate sensor 32A, the second body-surface temperature (second base temperature) $T_{b3}$ obtained by the body-surface sensor 31B, and the second intermediate temperature (second reference temperature) $T_{b4}$ obtained by the intermediate sensor 32B.

Figure 4:
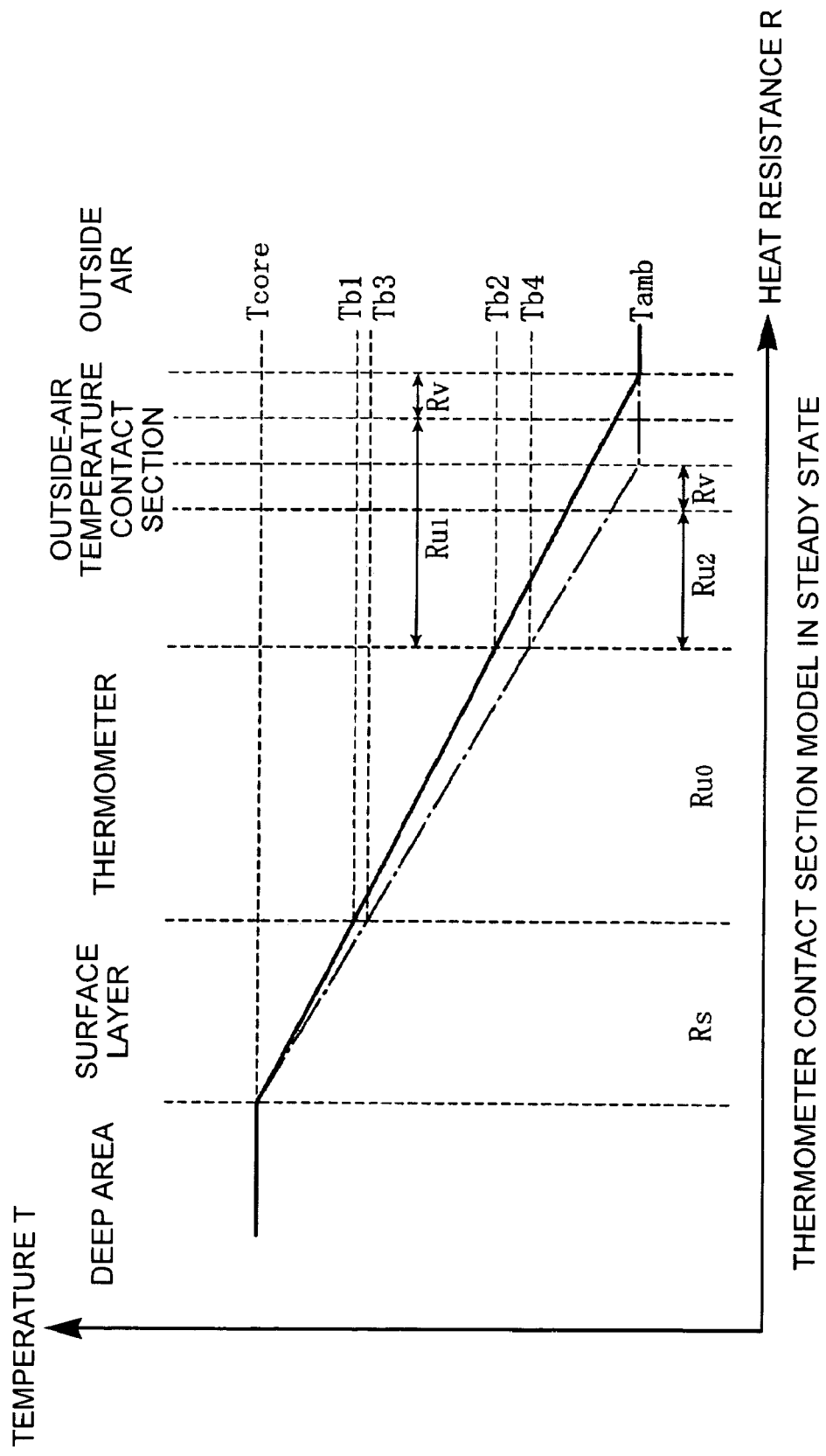
FIG. 4 is a view of a diagram showing a temperature distribution model of the thermometer and an organism of the first embodiment.

FIG. 4 shows a model of the temperature distribution from the deep areas in the human body 2 to the outside air through the body surface 2A and the thermometer main body 3. Temperature distribution models of the temperature measuring device 3A and the temperature measuring device 3B are shown by the solid line (temperature measuring device 3A) and the single dashed line (temperature measuring device 3B). The vertical axis is the temperature (T) and the horizontal axis is the heat resistance (R). If the relationship between the temperature (T) and the heat resistance (R) is linear, then the slope expresses the heat flux Q. Since the temperature distribution models of the temperature measuring device 3A and the temperature measuring device 3B exhibit the same behavior, the following description focuses on the temperature measuring device 3A shown by the solid line.

As shown in FIG. 4, in the model of temperature transmission from a deep area in the human body 2 to the outside air, the temperature $T_{core}$ in the deep of the human body 2 is substantially constant. In the surface layer on the outer side of the deep area, the body temperature decreases due to the heat resistance of the skin and to the influence of the outside-air temperature. In practice, a portion equivalent to the casing of the thermometer main body 3 may be included between the body surface 2A and the contact surface 300A of the temperature measuring device 3A. Microscopic gaps form, and the temperature therefore decreases in the contact heat resistant area due to heat radiation in these gaps. Accordingly, when the temperature of the body surface 2A is actually measured by the body-surface sensor 31A of the temperature measuring device 3A, the first body-surface temperature $T_{b1}$ that has decreased due to this contact heat resistant area is measured as a result.

Also, since the heat resistance (heat resistance $R_{u0}$) created by the thermal insulating material 37 exists in the temperature measuring device 3A as such, a reduction in temperature also occurs in the temperature measuring device 3A, and the first intermediate temperature $T_{b2}$ is established at the interface 301A of the temperature measuring device 3A. The first intermediate temperature $T_{b2}$ is measured by the intermediate sensor 32A. Furthermore, the temperature decreases because of the presence of the thermal insulating material 38A having the heat resistance $R_{u1}$ between the interface 301A of the temperature measuring device 3A and the outside-air, and heat is radiated in the outside-air temperature contact section (due to the heat resistance Rv of the contact section). The temperature further decreases and ultimately reaches the outside-air temperature $T_{amb}$.

In a steady state, the heat flux Q in all areas is constant, and therefore the slope of the graph in FIG. 4 is also constant. At this time, if the first body-surface temperature $T_{b1}$ and the first intermediate temperature $T_{b2}$ of the temperature measuring device 3A are known, the heat flux $Q_u$ from the surface of the temperature measuring device 3A on the side of the body-surface sensor 31A to the interface 301A can be calculated from Eq. (1) below by using heat resistance $R_{u0}$.

$$Qu1 = \frac{Tb1 - Tb2}{Ru0} \quad (1)$$

The heat flux $Q_{s+t}$ in the portion that contains both the surface layer and the contact heat resistant area, that is, in the portion from the deep area in the human body 2 to the body surface 2A (in practice, the portion from the deep area to the contact surface 300A), is expressed in Eq. (2) below by using the temperature $T_{core}$ of the deep are in the human body 2 and the heat resistance $R_s+R_t$ of the portion from the deep area in the human body 2 to the body surface 2A.

$$Qs + t = \frac{Tcore - Tb1}{Rs + Rt} \quad (2)$$

The heat resistance $R_t$ of the contact heat resistant area depends on the properties of the material interposed in the heat resistant section, such as in a portion equivalent to the casing of the thermometer main body 3, and also varies depending on the heat resistance of the thermal insulating material 37 of the thermometer 1 in contact with the body surface 2A. The heat resistance is determined by Eq. (3) below, for example, where λ1 is the thermal conductivity of the human body 2, λ2 is the thermal conductivity of the thermometer 1, δ1 is the surface roughness of the human body 2, δ2 is the surface roughness of the contact surface 300A of the thermometer 1, P is the pressure applied to the body surface 2A by the thermometer 1, H is the lesser of the two hardness levels of the human body 2 and the thermometer 1, λf is the thermal conductivity of the material between the body surface 2A and the contact surface 300A, δf is the surface roughness of this material, and c is a constant. Since the heat resistance $R_t$ of the contact heat resistant area thus varies depending on various conditions, the conditions are preferably selected in the present embodiment so that the heat resistance $R_t$ of the contact heat resistant area is minimized and that gaps do not form between the body surface 2A and the contact surface 300A. Coating the contact section between the body surface 2A and the contact surface 300A with oil, for example, to improve the state of contact is one possible method of reducing the heat resistance $R_t$ of the contact heat resistant area.

$$\frac{1}{Rt} = \frac{9.70 \times 10^3}{4\sqrt{\delta_1^2 + \delta_2^2}} \cdot \frac{P}{H} \cdot \frac{\lambda_1 \lambda_2}{\lambda_1 + \lambda_2} + \frac{10^6 \lambda_f}{0.25c(\delta_1 + \delta_2) + \delta_f} \quad (3)$$

Since the heat flux Q is constant in each area, the heat flux $Q_{u1}$ in the thermometer main body 3 and the heat flux $Q_{s+t}$ in the portion from the deep area in the human body 2 to the body surface 2A are equal ($Q_{u1}=Q_{s+t}$). Therefore, Eq. (1) and Eq. (2) are modified to give Eq. (4), and the temperature $T_{core}$ of the deep area is determined by Eq. (4).

$$Tcore = \frac{Rs + Rt}{Ru0} \cdot (Tb1 - Tb2) + Tb1 \quad (4)$$

The heat resistance $R_s+R_t$ in the portion from the deep area in the human body 2 to the body surface 2A is an unknown value. In view of this, obtaining the second body-surface temperature $T_{b3}$ and the second intermediate temperature $T_{b4}$ from the body-surface sensor 31B and the intermediate sensor 32B in the temperature measuring device 3B in the same manner as in the temperature measuring device 3A allows the temperature $T_{core}$ of the deep area to be determined as shown by Eq. (5) below.

$$Tcore = \frac{Rs + Rt}{Ru0} \cdot (Tb3 - Tb4) + Tb3 \quad (5)$$

Since the heat resistance $R_{u1}$ of the thermal insulating material 38A and the heat resistance $R_{u2}$ of the thermal insulating material 38B are set to different values, there is a change in the slope of the temperature (T) in relation to the heat resistance (R) of the temperature measuring device 3A and temperature measuring device 3B (see FIG. 4). In other words, two different relational expressions for the heat resistance and the temperature are obtained.

Eliminating the heat resistance $(R_s+R_t)/R_{u0}$ from Eq. (4) and Eq. (5) allows the temperature $T_{core}$ of the deep area to be determined by Eq. (6) below. Here, the heat resistance $(R_s+R_t)$ is the same for the temperature measuring device 3A and the temperature measuring device 3B. Therefore, when portions equivalent to the casing of the thermometer main body 3 are present between the body-surface sensors 31A and 31B and the body surface 2A, these portions of the casing have the same heat resistance.

$$T_{core} = \frac{\{Tb3 \cdot (Tb1 - Tb2) - \alpha \cdot Tb1 \cdot (Tb3 - Tb4)\}}{\{(Tb1 - Tb2) - \alpha \cdot (Tb3 - Tb4)\}} \quad (6)$$

Therefore, Eq. (6) is stored as an arithmetic formula for the temperature $T_{core}$ of the deep area in the deep-area temperature calculating device 441.

The first body-surface temperature $T_{b1}$, the second body-surface temperature $T_{b3}$, the first intermediate temperature $T_{b2}$, and the second intermediate temperature $T_{b4}$ sent from the thermometer main body 3 are stored in the storage unit 45. The temperature $T_{core}$ of the deep area in the human body 2 calculated by the deep-area temperature calculating device 441 is also stored.

The storage unit 45 is configured to be capable of storing temperature information pertaining to multiple human bodies 2, and the temperature $T_{core}$ of the deep areas and the like are stored for each human body 2. Also, the storage unit 45 is capable of storing the measurement positions of the first body-surface temperature $T_{b1}$, second body-surface temperature $T_{b3}$, and other parameters measured when the temperature $T_{core}$ of a deep area is calculated. In addition to the temperature information, the storage unit 45 may also be made to store the name of the person to be measured (human body 2, infant), his or her age, the date of the measurement, and other such measurement information, for example. In this case, this measurement information may be input from the operating unit 43.

Figure 5:
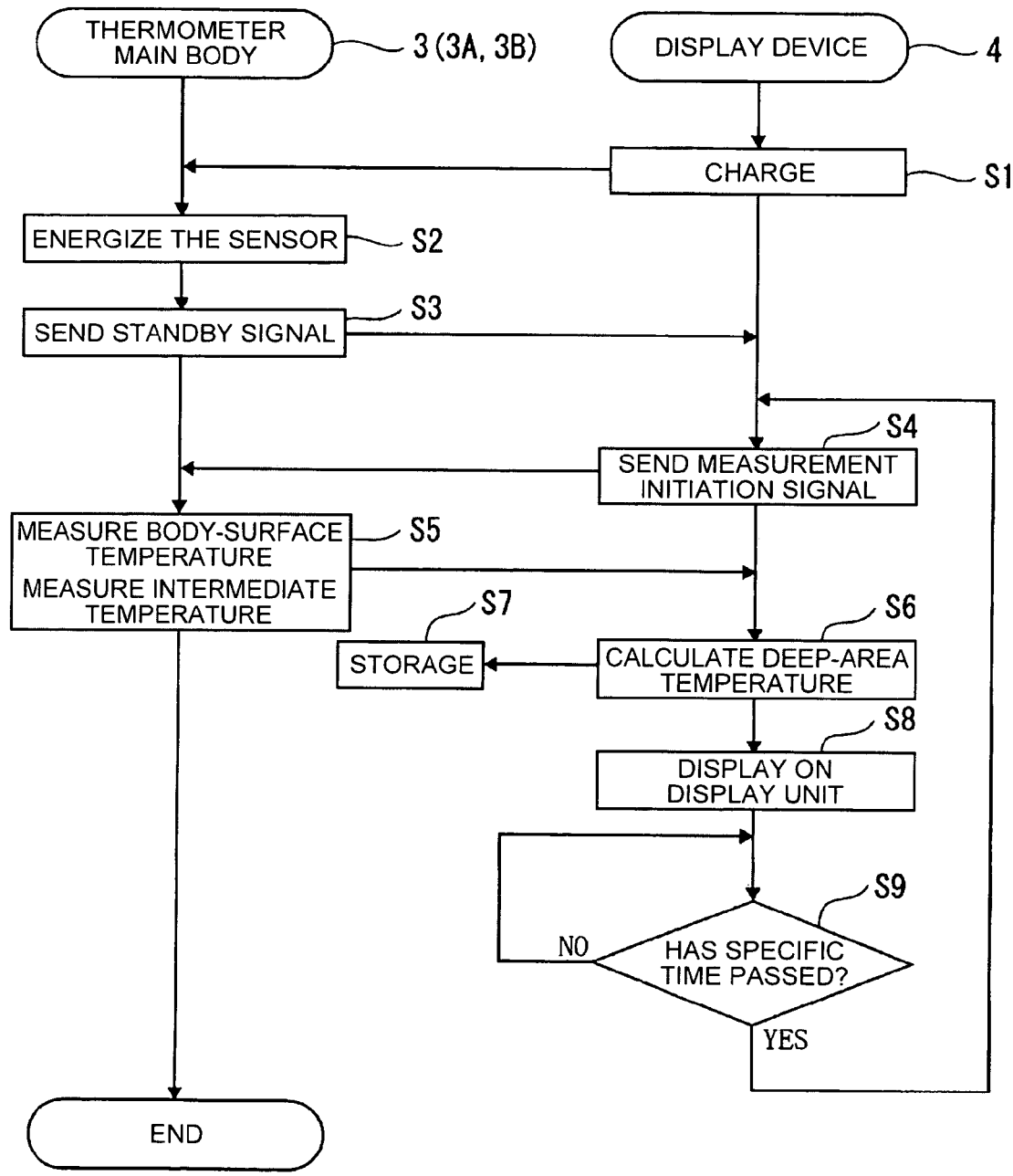
FIG. 5 is a view of a flowchart showing the operation of the thermometer of the first embodiment.

The thermometer 1 operates in the following manner. FIG. 5 shows a flowchart depicting the operation of the thermometer 1 in the present embodiment.

The thermometer main body 3 is attached to the human body 2 (the chest of the infant in the present embodiment), and the operator 5 of the thermometer 1 who is holding the infant attaches the display device 4 to the arm. Once the operator 5 turns on the switch of the display device 4 by operating the operating unit 43 of the display device 4, the transceiver device 41 sends radio waves to the thermometer main body 3 (the temperature measuring device 3A and temperature measuring device 3B). The thermometer main body 3 is charged by creating electromotive force in the antenna coils 36A and 36B with electromagnetic induction caused by these radio waves (step S1). The thermometer main body 3 is energized by this electromotive force (step S2), and the body-surface sensors 31A and 31B and intermediate sensors 32A and 32B are also energized. When these sensors 31A, 31B, 32A, and 32B are energized, the thermometer main body 3 sends a standby signal to the display device 4 from the transceiver devices 35A and 35B (step S3).

When the control device 44 of the display device 4 receives this standby signal, a temperature measurement command signal is sent from the transceiver device 41 (step S4). The thermometer main body 3 receives this temperature measurement command signal, drives the body-surface sensors 31A and 31B and the intermediate sensors 32A and 32B, and measures the first body-surface temperature $T_{b1}$ and second body-surface temperature $T_{b3}$ in the body surface 2A, and the first intermediate temperature $T_{b2}$ and second intermediate temperature $T_{b4}$ in the interfaces 301A and 301B (step S5, first temperature measuring step and second temperature measuring step). The information about the body-surface temperatures $T_{b1}$ and $T_{b3}$ and the intermediate temperatures $T_{b2}$ and $T_{b4}$ is converted from analog signals to digital signals by the A/D converters 34A and 34B, and is sent to the display device 4 by the transceiver devices 35A and 35B. The body-surface temperatures $T_{b1}$ and $T_{b3}$ and intermediate temperatures $T_{b2}$ and $T_{b4}$ are preferably measured after a specific time has passed so that the transfer of heat from the inside of the human body 2 to the body surface 2A reaches a steady (equilibrium) state.

In the deep-area temperature calculating device 441 of the control device 44, the temperature $T_{core}$ of the deep area is calculated by Eq. (6) from the body-surface temperatures $T_{b1}$ and $T_{b3}$ and intermediate temperatures $T_{b2}$ and $T_{b4}$ sent from the thermometer main body 3 (step S6, deep-area temperature calculating step). The control device 44 stores the temperature $T_{core}$ in the storage unit 45 (step S7), and displays the temperature $T_{core}$ on the display unit 42 (step S8). The operator 5 confirms the temperature $T_{core}$ on the display unit 42 of the wristwatch-type display device 4 while holding the infant.

The control device 44 counts the passage of time after the body-surface temperatures $T_{b1}$ and $T_{b3}$ are measured with an internal timer, and observes whether a specific time has passed (step S9). If the elapsed time is equal to or greater than the specific time, the process returns to step S4, the control device 44 sends a measurement initiation signal to the thermometer main body 3, and the body-surface temperatures $T_{b1}$ and $T_{b3}$ and intermediate temperatures $T_{b2}$ and $T_{b4}$ are measured.

Thus, the body-surface temperatures $T_{b1}$ and $T_{b3}$ and the intermediate temperatures $T_{b2}$ and $T_{b4}$ are measured, and the temperature $T_{core}$ of the deep area is calculated and stored in the storage unit 45 at specific time intervals.

According to the first embodiment, the following effects are achieved.

(1) The temperature $T_{core}$ of a deep area in the human body 2 can be calculated using the deep-area temperature calculating device 441 by obtaining the first body-surface temperature $T_{b1}$ and first intermediate temperature $T_{b2}$ from the temperature measuring device 3A and obtaining the second body-surface temperature $T_{b3}$ and the second intermediate temperature $T_{b4}$ from the temperature measuring device 3B. The body-surface temperatures $T_{b1}$ and $T_{b3}$ and intermediate temperatures $T_{b2}$ and $T_{b4}$ in two temperature distributions (heat fluxes) can be measured by using two temperature measuring devices 3A and 3B with different overall heat resistances, and the temperature $T_{core}$ of a deep area can therefore be calculated from only the actually measured temperature values. Therefore, the temperature $T_{core}$ of a deep area can be measured in accordance with the actual temperature distribution to a greater extent than in the prior art, in which the heat resistance $R_s$ from a deep area in the human body 2 to the surface layer is assumed to be a fixed value. As a result, a more accurate temperature $T_{core}$ of a deep area is obtained, and the measuring precision of the thermometer 1 can be improved.

Also, the overall heat resistance is varied by assuming that the heat resistance $R_{u0}$ between the body-surface temperature measuring position and the intermediate temperature measuring position is a common value and varying the heat resistance $R_{u1}$ and $R_{u2}$ between the intermediate temperature measuring position and the outside air. Therefore, the heat resistance $R_{u0}$ between the body-surface temperature measuring position and the intermediate temperature measuring position does not change merely due to changes in the overall heat resistance even if the clothing or bedding is in contact with the outer side of the thermometer main body 3, and the effects of such disturbance on the measurement can be reduced.

Furthermore, since the deep-area temperature calculating device 441 can calculate the temperature $T_{core}$ of a deep area in the human body 2 by utilizing the fact that the heat flux from the deep area in the human body 2 to the outside air is constant, the configuration of the thermometer 1 can be simplified because there is no need for a heater or other such heating device to be used to cancel the heat flow as in a conventional thermometer. This further facilitates size reduction of the thermometer 1. Since there is no need for a conventional heating device, power conservation in the thermometer 1 can be facilitated, and the safety and handling of the thermometer 1 can be improved because the thermometer 1 can be safely attached to the body surface 2A for a long period of time.

(2) Since the deep-area temperature calculating device 441 operates by using Eq. (6) as an arithmetic formula, obtaining the first body-surface temperature $T_{b1}$, the first intermediate temperature $T_{b2}$, the second body-surface temperature $T_{b3}$, and the second intermediate temperature $T_{b4}$ allows the temperature $T_{core}$ of the deep area to be calculated by directly substituting these values. The heat resistance $R_s+R_t$ in the portion from the deep area in the human body 2 to the body surface 2A can be eliminated from the calculations by measuring the body-surface temperatures $T_{b1}$ and $T_{b3}$ and the intermediate temperatures $T_{b2}$ and $T_{b4}$ at two locations. Therefore, there is no need to use the heat resistance $R_s+R_t$, the calculation process can be simplified, and the calculation process can also be accelerated. Accordingly, the responsiveness of the thermometer 1 can be improved. Also, there is no need to measure the temperature of the deep area in advance with a known thermometer or the like.

(3) Since the thermometer main body 3 is configured to be capable of being integrally attached to the skin of the human body 2, there is no need to hold the thermometer 1 for a fixed time period in the same way as when measuring the underarm temperature or oral temperature in conventional practice. Therefore, the handling of the thermometer main body 3 can be improved. Also, since the thermometer main body 3 is configured to be capable of being integrally attached, the thermometer main body 3 provides satisfactory contact with the skin even if moved slightly when used on an infant, toddler, or child, and accurate temperature can therefore be measured. Furthermore, the temperature $T_{core}$ of a deep area can be measured even when clothing or bedding is in contact with the thermometer main body 3. Therefore, the temperature can be measured easily and reliably even when the operator wishes to observe the continuous change in temperature over a long period of time.

For example, when a female operator measures her basal body temperature, there are many restrictions on the method for measuring body temperature, such as that the measurement must be taken in a tranquil state immediately after waking, which is troublesome for measuring body temperature. However, if the body temperature is measured with the thermometer 1 of the present embodiment, the temperature can be continuously measured while the thermometer 1 is attached to the body surface 2A. Therefore, if the operator retires while the thermometer main body 3 is still attached, the basal body temperature can be automatically measured during rest, and the measurement of the basal body temperature can be already completed when the operator awakens. Therefore, since the complications with body temperature measurement can be eliminated, it is possible to prevent cases in which the user forgets to measure body temperature at home or prior to traveling, and an accurate basal body temperature can be reliably measured.

Also, the thermometer 1 of the present embodiment can constantly measure the temperature of the human body 2, and is therefore suitable for monitoring changes in the body temperature of hospital patients, for example.

(4) Since the thermometer main body 3 and the display device 4 are configured as separate units and are capable of communication by way of the transceiver devices 35A, 35B, and 41, the number of components mounted on the thermometer main body 3 in contact with the human body 2 can be reduced to a minimum, and size and weight reduction in the thermometer main body 3 can be facilitated. Consequently, it is not a burden to leave the thermometer main body 3 attached for a long period of time, and the portability of the thermometer main body 3 can therefore be improved. Also, providing the control device 44 that includes the deep-area temperature calculating device 441 to the side of the display device 4 makes it possible to further facilitate weight and size reduction in the thermometer main body 3.

Since the transceiver devices 35A, 35B, and 41 are configured to be capable of wireless communication by means of the antenna coils 36A, 36B, and 46, wires or the like do not cause a hindrance, and the handling of the thermometer 1 can be improved.

Furthermore, since the display device 4 is formed into a wristwatch design, the operator 5 can view the display unit 42 worn on the arm. Therefore, the display of the body temperature can be confirmed while holding the infant whose body temperature is to be measured, as in the present embodiment, and the operability of the thermometer 1 can be improved.

(5) Electromotive force can be created in the antenna coils 36A and 36B of the thermometer main body 3 by electromagnetic induction through transmission of radio waves from the antenna coil 46 of the display device 4. The thermometer main body 3 is driven by this electromotive force, and therefore there is no need for a battery or other such power source in the thermometer main body 3, and weight and size reduction can be further facilitated in the thermometer main body 3.

(6) Since the storage unit 45 can store the temperature $T_{core}$ of a deep area and other such information for a plurality of human bodies 2, the thermometer 1 can be alternately used among multiple people, and the convenience of the thermometer 1 can be improved. The previous temperature $T_{core}$ of the deep area of the subject can thereby be read from the storage unit 45 when the thermometer 1 is used by multiple people, and the thermometer 1 is therefore suitable to monitor body temperature over a long period of time.

(7) The thermal insulating material 37 between the body surface 2A and the interfaces 301A and 301B have a common heat resistance value, and therefore thermal insulating materials of the same material with the same thickness can be used, and a simple integrated structure can be employed. Also, the distance L between the temperature measuring device 3A and the temperature measuring device 3B can be kept fixed, and mounting of the devices can be simplified.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

ALTERNATE EMBODIMENTS

Alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

Hereinbelow, a second preferred embodiment of the present invention will be described with reference to the diagrams.

Figure 6:
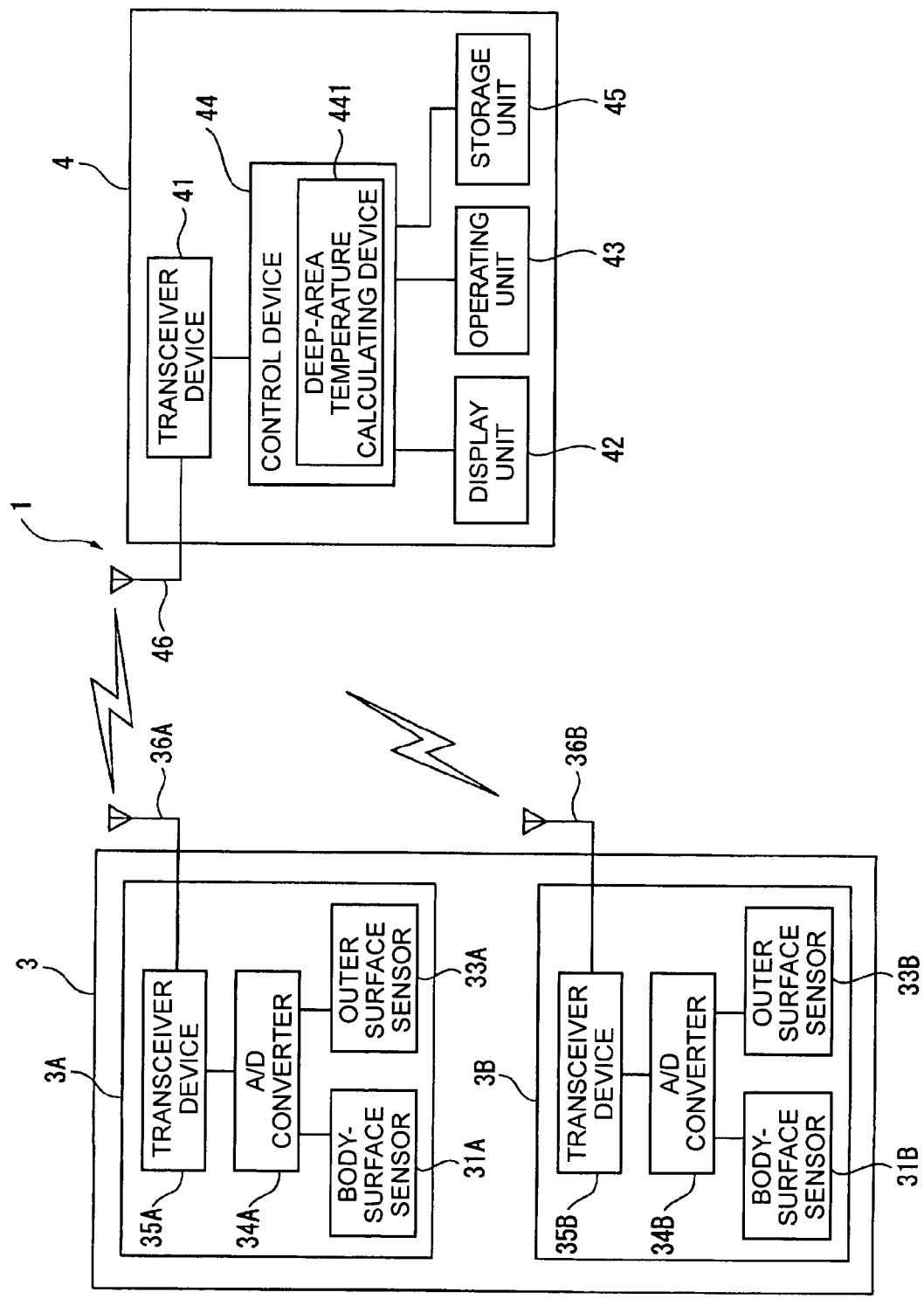
FIG. 6 is a view of a block diagram showing a thermometer according to a second preferred embodiment of the present invention.

FIG. 6 shows a block diagram of the thermometer 1 according to the second embodiment of the present invention. This thermometer 1 includes a thermometer main body 3 that comes into contact with the body surface 2A (see FIG. 8) of the human body 2 (see FIG. 8) as the organism, and a display device 4 provided separately from the thermometer main body 3.

Figure 7:
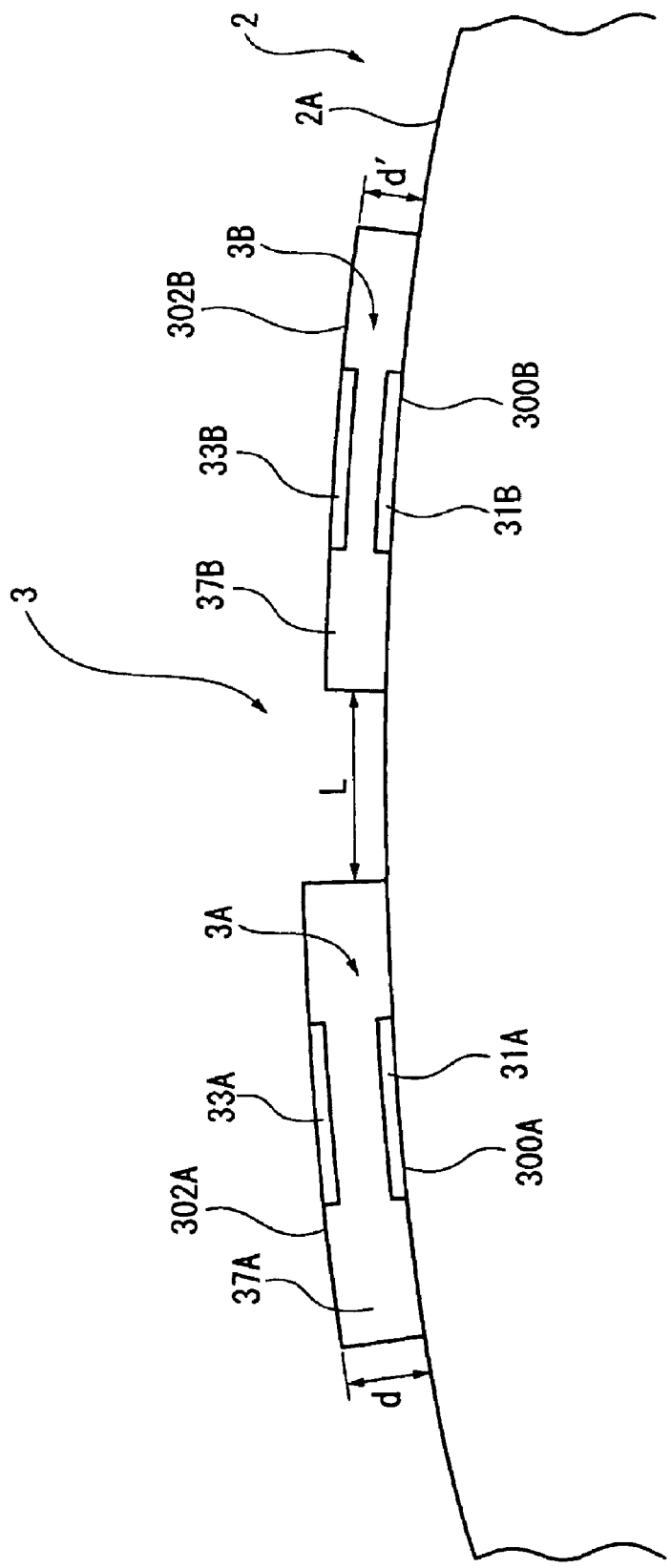
FIG. 7 is a view of a diagram showing a main body of the thermometer of the second embodiment.
Figure 8:
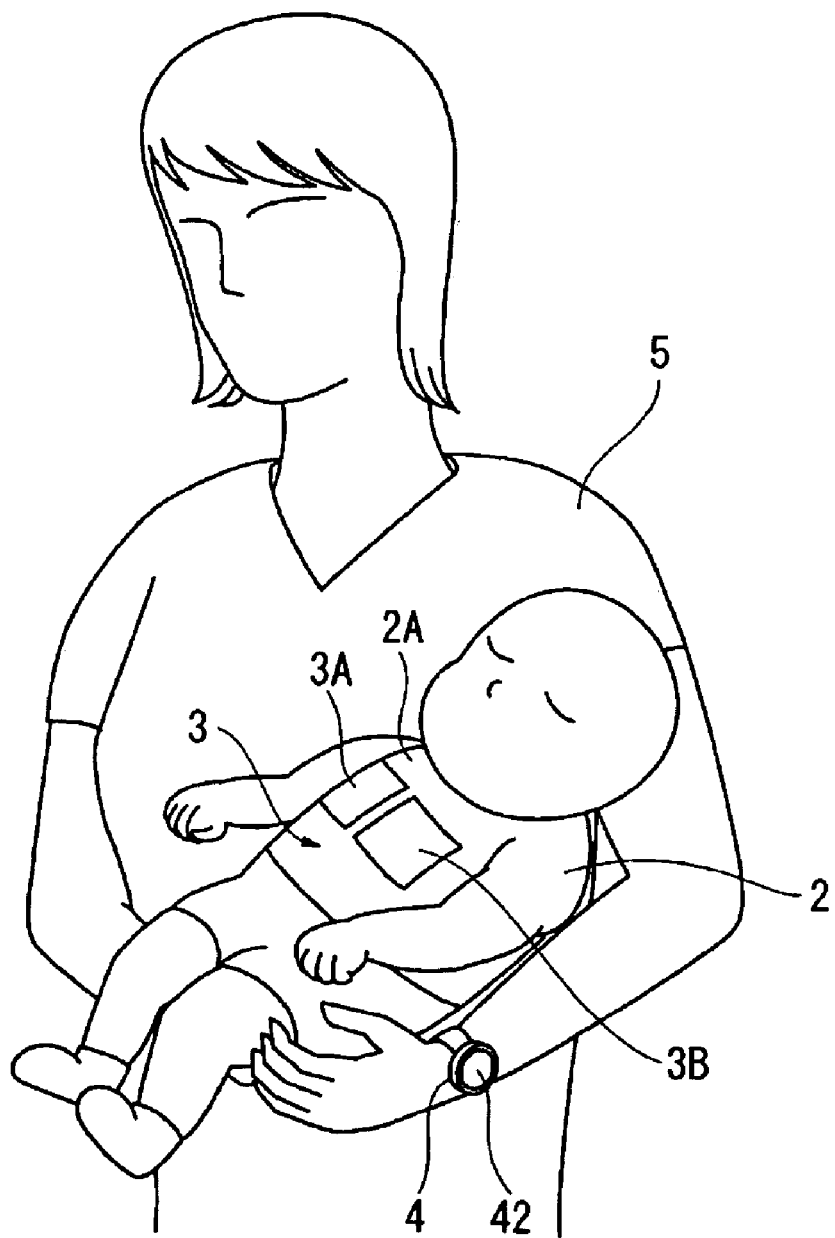
FIG. 8 is a view of a diagram showing the thermometer main body and a display device of the thermometer of the second embodiment.

FIG. 7 shows an enlarged view of the thermometer main body 3 mounted on the human body 2, and FIG. 8 shows a diagram of the thermometer main body 3 and display device 4 in the mounted state.

First, as shown in FIG. 7, the thermometer main body 3 includes two (a pair of) temperature measuring devices 3A and 3B as first and second temperature measuring devices. The temperature measuring device 3A includes a body-surface sensor 31A, an outer surface 33A, and thermal insulating material 37A. The body-surface sensor 31A is a first base temperature measuring unit that measures the temperature of the body surface 2A as the first base temperature. The sensor 31A has a contact surface 300A that comes into contact with the body surface 2A. an outer surface sensor 33A is a first reference temperature measuring unit that measures the temperature of an outer surface 302A as the first reference temperature. The sensor 33A has an outer surface 302A exposed to the air outside of the temperature measuring device 3A. The thermal insulating material 37A is a first thermal insulating material that is placed between the body-surface sensor 31A and the outer surface sensor 33A.

Also, the temperature measuring device 3B is provided separately from the temperature measuring device 3A. The temperature measuring device 3B includes a body-surface sensor 31B, an outer surface sensor 33B, and thermal insulating material 37B. The body-surface sensor 31B is a second base temperature measuring unit that measures the temperature of the body surface 2A as the second base temperature, with the sensor 31B having a contact surface 300B that comes into contact with the body surface 2A at a different position from the contact position of the temperature measuring device 3A. The outer surface sensor 33B is a second reference temperature measuring unit that measures the temperature of an outer surface 302B as the second reference temperature, with the sensor 33B having an outer surface 302B exposed to the air outside of the temperature measuring device 3B. The thermal insulating material 37B is a second thermal insulating material placed between the body-surface sensor 31B and the outer surface sensor 33B.

The thermal insulating material 37A of the temperature measuring device 3A and the thermal insulating material 37B of the temperature measuring device 3B are configured from material with the same thermal conductivity λ and the same cross section. The heat resistance of the thermal insulating material 37A and the heat resistance of the thermal insulating material 37B are set to different values, with the thickness of the respective thermal insulating materials as d and d'. Therefore, the heat resistance ratio α is expressed by d/d'. In other words, the thermal insulating material 37A and thermal insulating material 37B fulfill the role of devices for adjusting the heat flux by thickness variations.

The thermal insulating material 37A and thermal insulating material 37B may be configured from different materials from the heat flux adjusting device, in which case the heat resistances of the thermal insulating materials must be measured in advance. If the thermal insulating materials are the same material, as is the case with the present embodiment, the thickness ratio may be known. Furthermore, if the thermal insulating materials are identical, the difference in contact heat resistance on the body surface between the temperature measuring device 3A and the temperature measuring device 3B is small because the thermal conductivity λ is the same.

The thermometer main body 3 which is composed of these temperature measuring devices 3A and 3B, is attached to the chest of an infant (human body 2), similar to the first embodiment. The position where the thermometer main body 3 is attached is preferably on the forehead, the back of the neck, the chest, the back, or another such area where the skin temperature on the human body 2 is not susceptible to the effects of outside air, and the body-surface temperature can be measured relatively easily. Also, the thermal insulating materials 37A and 37B are preferably large enough so that the heat fluxes from the deep area of the human body 2 through the body surface 2A and thermal insulating materials 37A and 37B to the outer surfaces 302A and 302B can be approximated to constant in a stationary state when the temperature measuring devices 3A and 3B are attached to the body surface 2A. In other words, the dimensions of the thermal insulating materials 37A and 37B are preferably selected so that when the movement of heat is in a state of equilibrium, it is possible to ignore the movement of heat in a direction substantially perpendicular to the direction joining the deep area of the human body 2 to the position of the body surface 2A to which the temperature measuring devices 3A and 3B are attached, that is, in the direction running along the body surface 2A. In this case, the movement of heat from the deep area of the human body 2 to the body surface 2A can be considered to be uniaxial, and the heat flux can be approximated to be moving in one direction.

The temperature measuring device 3A and the temperature measuring device 3B are disposed at a specific distance L from each other, similar to the first embodiment.

The body-surface sensors 31A and 31B and the outer surface sensors 33A and 33B can be sensors that convert the temperature of the body surface 2A or the temperatures of the outer surfaces 302A and 302B into resistance, or sensors that convert temperature to voltage. The sensors described in the first embodiment can be used to convert temperature to resistance.

As shown in FIG. 6, the temperature measuring devices 3A and 3B also include the A/D converters 34A and 34B and the transceiver devices 35A and 35B, in addition to the body-surface sensors 31A and 31B and the outer surface sensors 33A and 33B.

The A/D converters 34A and 34B convert the analog signals of heat resistance or voltage converted by the body-surface sensors 31A and 31B and the outer surface sensors 33A and 33B into digital signals, and output the digital signals to the transceiver devices 35A and 35B. Alternatively, an RF encoder that utilizes CR oscillation may be used instead of the A/D converters 34A and 34B.

The display device 4 is configured to be portable in a wristwatch style, and is designed to be attached by the operator 5 holding the infant on whom the thermometer main body 3 is to be attached, as shown in FIG. 8. The display device 4 includes a transceiver device 41 to exchange signals with the thermometer main body 3, a display unit 42 to display the results of measuring body temperature, an operating unit 43 to operate the display device 4 from the exterior, a control device 44 to control the operation of the display device 4, and a storage unit 45 to store information obtained from the transceiver device 41 and the control device 44, as shown in FIG. 6.

The transceiver devices 35A and 35B, the transceiver device 41, the display unit 42, and the operating unit 43 are similar to those in the first embodiment, and descriptions thereof are therefore omitted.

The control device 44 includes a deep-area temperature calculating device 441 that calculates the temperature of deep areas in the human body 2 on the basis of a first body-surface temperature (first base temperature) and second body-surface temperature (second base temperature) from the body-surface sensors 31A and 31B, and on the basis of a first intermediate temperature (first reference temperature) and second intermediate temperature (second reference temperature) from the outer surface sensors 33A and 33B.

The deep-area temperature calculating device 441 calculates the temperature $T_{core}$ of deep areas in the human body 2 using the first body-surface temperature $T_{b1}$ obtained by the body-surface sensor 31A, the first intermediate temperature $T_{b2}$ obtained by the outer surface sensor 33A, the second body-surface temperature $T_{b3}$ obtained by the body-surface sensor 31B, the second intermediate temperature $T_{b4}$ obtained by the outer surface sensor 33B, and the ratio α between the first heat resistance $R_{u1}$ of the temperature measuring device 3A and the second heat resistance $R_{u2}$ of the temperature measuring device 3B.

Figure 9:
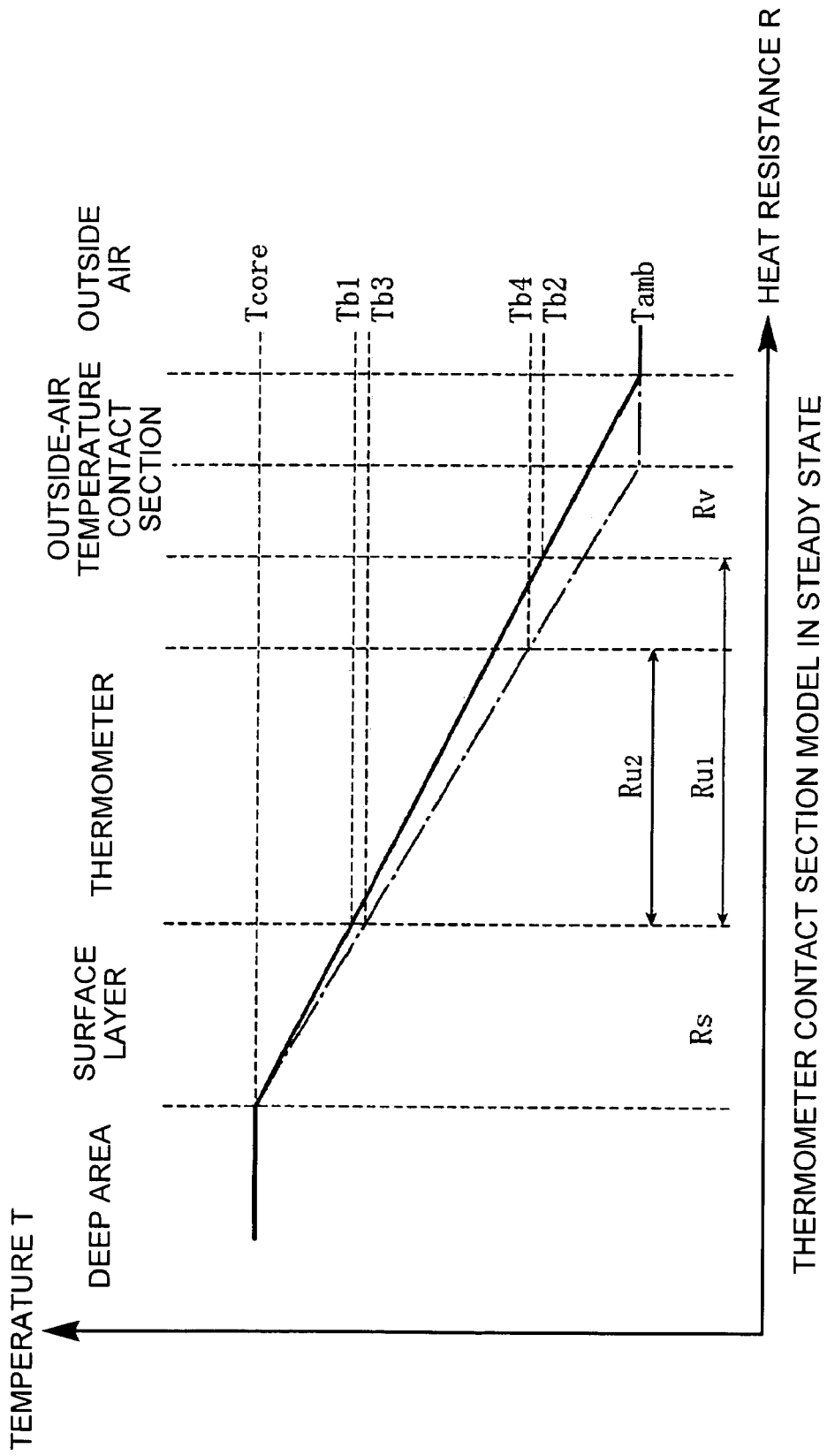
FIG. 9 is a view of a diagram showing a temperature distribution model of the thermometer and an organism of the second embodiment.

FIG. 9 shows a model of the temperature distribution from the deep areas in the human body 2 to the outside air through the body surface 2A and the thermometer main body 3. The temperature distribution models for the temperature measuring device 3A and the temperature measuring device 3B are the same, and therefore only a temperature distribution model for the temperature measuring device 3A is shown in FIG. 9.

As shown in FIG. 9, in the model of temperature transmission from a deep area in the human body 2 to the outside air, the temperature $T_{core}$ in the deep are of the human body 2 is substantially constant. In the surface layer on the outer side of the deep area, the body temperature decreases due to the heat resistance of the skin and to the influence of the outside-air temperature. In practice, microscopic gaps form between the body surface 2A and the temperature measuring device 3A, and the temperature therefore decreases in the contact heat resistant area due to heat radiation in these gaps. Accordingly, when the temperature of the body surface 2A is actually measured by the temperature measuring device 3A, the first body-surface temperature $T_{b1}$ that has decreased due to this contact heat resistant area is measured as a result.

Since heat resistance (first heat resistance $R_{u1}$) exists in the temperature measuring device 3A as such, a reduction in temperature also occurs in the temperature measuring device 3A, and the first outer-surface temperature $T_{b2}$ is established on the outer surface 302A of the temperature measuring device 3A. The first outer-surface temperature $T_{b2}$ is measured by the outer surface sensor 33A as a result. Furthermore, because heat is radiated in the outside-air temperature contact section between the outer surface 302A of the temperature measuring device 3A and the outside air, the temperature further decreases and ultimately reaches the outside-air temperature $T_{amb}$.

The slope of the temperature distribution graph corresponds to the heat flux Q, wherein the horizontal axis is heat resistance and the vertical axis is temperature. In a steady state, the heat flux Q in all areas is constant, and therefore the slope of the graph in FIG. 9 is also constant. At this time, if the first body-surface temperature $T_{b1}$ and the first outer-surface temperature $T_{b2}$ of the temperature measuring device 3A are known, the heat flux $Q_{u1}$ from the surface of the temperature measuring device 3A on the body-surface sensor 31A side to the outer surface 302A can be calculated from Eq. (7) below by using the first heat resistance $R_{u1}$.

$$Qu1 = \frac{Tb1 - Tb2}{Ru1} \qquad (7)$$

The heat flux $Q_{s+t}$ in the portion that contains both the surface layer and the contact heat resistant area, that is, in the portion from the deep area in the human body 2 to the body surface 2A (in practice, the portion from the deep area to the contact surface 300A), is expressed in Eq. (8) below by using the temperature $T_{core}$ of the deep are in the human body 2 and the heat resistance $R_s + R_t$ of the portion from the deep area in the human body 2 to the body surface 2A.

$$Qs + t = \frac{Tcore - Tb1}{Rs + Rt} \qquad (8)$$

The heat resistance $R_t$ of the contact heat resistant area depends on the properties of the material in the contact heat resistant area, similar to the first embodiment, and also varies depending on the heat resistance of the thermometer 1 (thermal insulating materials 37A and 37B) in contact with the body surface 2A.

Since the heat flux Q is constant in each area, the heat flux $Q_{u1}$ in the thermometer main body 3 and the heat flux $Q_{s+t}$ in the portion from the deep area in the human body 2 to the body surface 2A are equal ($Q_{u1} = Q_{s+t}$). Therefore, Eq. (7) and Eq. (8) are modified to give Eq. (9) below, and the temperature $T_{core}$ of the deep area is determined by Eq. (9).

$$Tcore = \frac{Rs + Rt}{Ru1} \cdot (Tb1 - Tb2) + Tb1 \qquad (9)$$

The heat resistance $R_s + R_t$ in the portion from the deep area in the human body 2 to the body surface 2A is an unknown value. In view of this, obtaining the second body-surface temperature $T_{b3}$ and the second outer-surface temperature $T_{b4}$ in the temperature measuring device 3B from the body-surface sensor 31B and the outer surface sensor 33B in the same manner as in the temperature measuring device 3A allows the temperature $T_{core}$ of the deep area to be determined as shown by Eq. (10) below.

$$Tcore = \frac{Rs + Rt}{Ru2} \cdot (Tb3 - Tb4) + Tb3 \qquad (10)$$

Since the ratio α between the first heat resistance $R_{u1}$ of the temperature measuring device 3A and the second heat resistance $R_{u2}$ of the temperature measuring device 3B is known, eliminating the heat resistance $R_s + R_t$ from Eq. (9) and Eq. (10) allows the temperature $T_{core}$ of the deep area to be determined by Eq. (11) below by using the ratio α.

$$Tcore = \frac{Tb3 \cdot (Tb1 - Tb2) - \alpha \cdot Tb1 \cdot (Tb3 - Tb4)}{(Tb1 - Tb2) - \alpha \cdot (Tb3 - Tb4)} \qquad (11)$$

Therefore, Eq. (11) is stored as an arithmetic formula for the temperature $T_{core}$ of the deep area in the deep-area temperature calculating device 441.

The content stored in the storage unit 45 is the same as in the first embodiment, and descriptions thereof are therefore omitted.

The thermometer 1 operates as follows.

Figure 10:
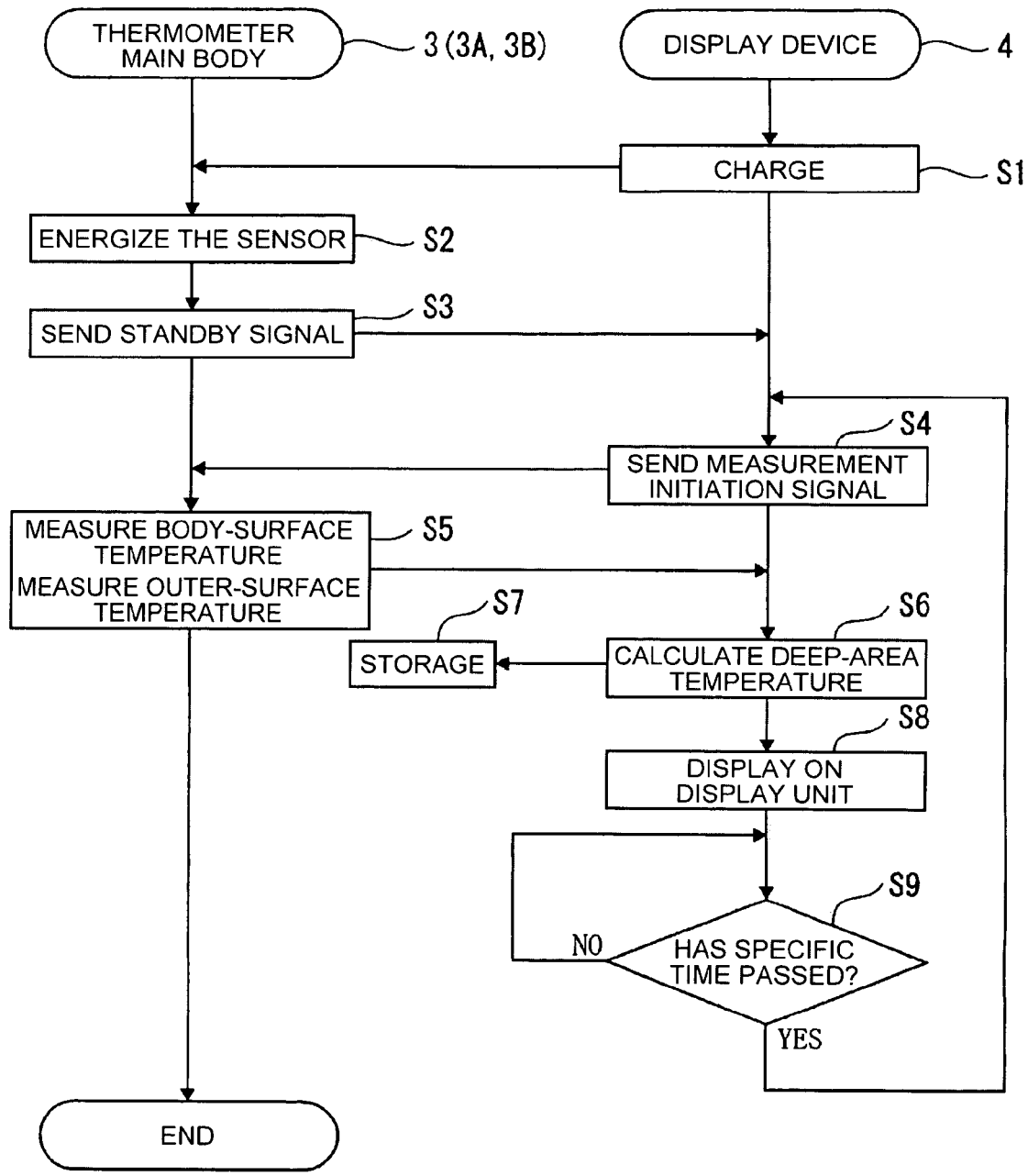
FIG. 10 is a view of a flowchart depicting the operation of the thermometer of the second embodiment.

FIG. 10 shows a flow chart depicting the operation of the thermometer 1 in the present embodiment.

The thermometer main body 3 is attached to the human body 2 (the chest of the infant in the present embodiment), and the operator 5 of the thermometer 1 who is holding the infant attaches the display device 4 to his or her arm. Once the operator 5 turns on the switch of the display device 4 by operating the operating unit 43 of the display device 4, the transceiver device 41 sends radio waves to the thermometer main body 3 (the temperature measuring device 3A and temperature measuring device 3B). The thermometer main body 3 is charged by creating electromotive force in the antenna coils 36A and 36B with the electromagnetic induction caused by these radio waves (step S1). The thermometer main body 3 is energized by this electromotive force (step S2), and the body-surface sensors 31A and 31B and outer surface sensors 33A and 33B are also energized. When these sensors 31A, 31B, 33A, and 33B are energized, the thermometer main body 3 sends a standby signal to the display device 4 from the transceiver devices 35A and 35B (step S3).

When the control device 44 of the display device 4 receives this standby signal, a temperature measurement command signal is sent from the transceiver device 41 (step S4). The thermometer main body 3 receives this temperature measurement command signal, drives the body-surface sensors 31A and 31B and the outer surface sensors 33A and 33B, and measures the first body-surface temperature $T_{b1}$ and second body-surface temperature $T_{b3}$ in the body surface 2A, and the first outer-surface temperature $T_{b2}$ and second outer-surface temperature $T_{b4}$ in the outer surfaces 302A and 302B (step S5, first temperature measuring step and second temperature measuring step). The information about the body-surface temperatures $T_{b1}$ and $T_{b3}$ and the outer-surface temperatures $T_{b2}$ and $T_{b4}$ is converted from analog signals to digital signals by the A/D converters 34A and 34B, and is sent to the display device 4 by the transceiver devices 35A and 35B. The body-surface temperatures $T_{b1}$ and $T_{b3}$ and outer-surface temperatures $T_{b2}$ and $T_{b4}$ are preferably measured after a specific time has passed so that the transfer of heat from the inside of the human body 2 to the body surface 2A reaches a steady (equilibrium) state.

In the deep-area temperature calculating device 441 of the control device 44, the temperature $T_{core}$ of the deep area is calculated by Eq. (11) from the body-surface temperatures $T_{b1}$ and $T_{b3}$ and outer-surface temperatures $T_{b2}$ and $T_{b4}$ sent from the thermometer main body 3 (step S6, deep-area temperature calculating step). The control device 44 stores the temperature $T_{core}$ in the storage unit 45 (step S7), and displays the temperature $T_{core}$ on the display unit 42 (step S8). The operator 5 confirms the temperature $T_{core}$ on the display unit 42 of the wristwatch-type display device 4 while holding the infant.

The control device 44 counts the passage of time after the body-surface temperatures $T_{b1}$ and $T_{b3}$ are measured with an internal timer, and observes whether a specific time has passed (step S9). If the elapsed time is equal to or greater than the specific time, the process returns to step S4, the control device 44 sends a measurement initiation signal to the thermometer main body 3, and the body-surface temperatures $T_{b1}$ and $T_{b3}$ and intermediate temperatures $T_{b2}$ and $T_{b4}$ are measured.

Thus, the body-surface temperatures $T_{b1}$ and $T_{b3}$ and the outer-surface temperatures $T_{b2}$ and $T_{b4}$ are measured, and the temperature $T_{core}$ of the deep area is calculated and stored in the storage unit 45 at specific time intervals.

According to the second embodiment, the following effects are achieved in addition to the effects in the first embodiment.

(8) The heat fluxes in the temperature measuring device 3A and the temperature measuring device 3B can be adjusted by varying the heat resistances of the thermal insulating material 37A and the thermal insulating material 37B. Therefore, the heat flux adjusting device is configured from the thermal insulating material 37A and the thermal insulating material 37B and does not need to be provided separately, and the structure can be simplified.

(9) Since the thermal insulating material 37A and the thermal insulating material 37B differ only in thickness, the thickness ratio thereof corresponds to the ratio α of the heat resistance between the body-surface sensor 31A and outer surface sensor 33A, and the heat resistance between the body-surface sensor 31B and outer surface sensor 33B.

Therefore, the temperature of the deep area of the organism can be calculated using the thickness ratio.

Third Embodiment

Figure 11:
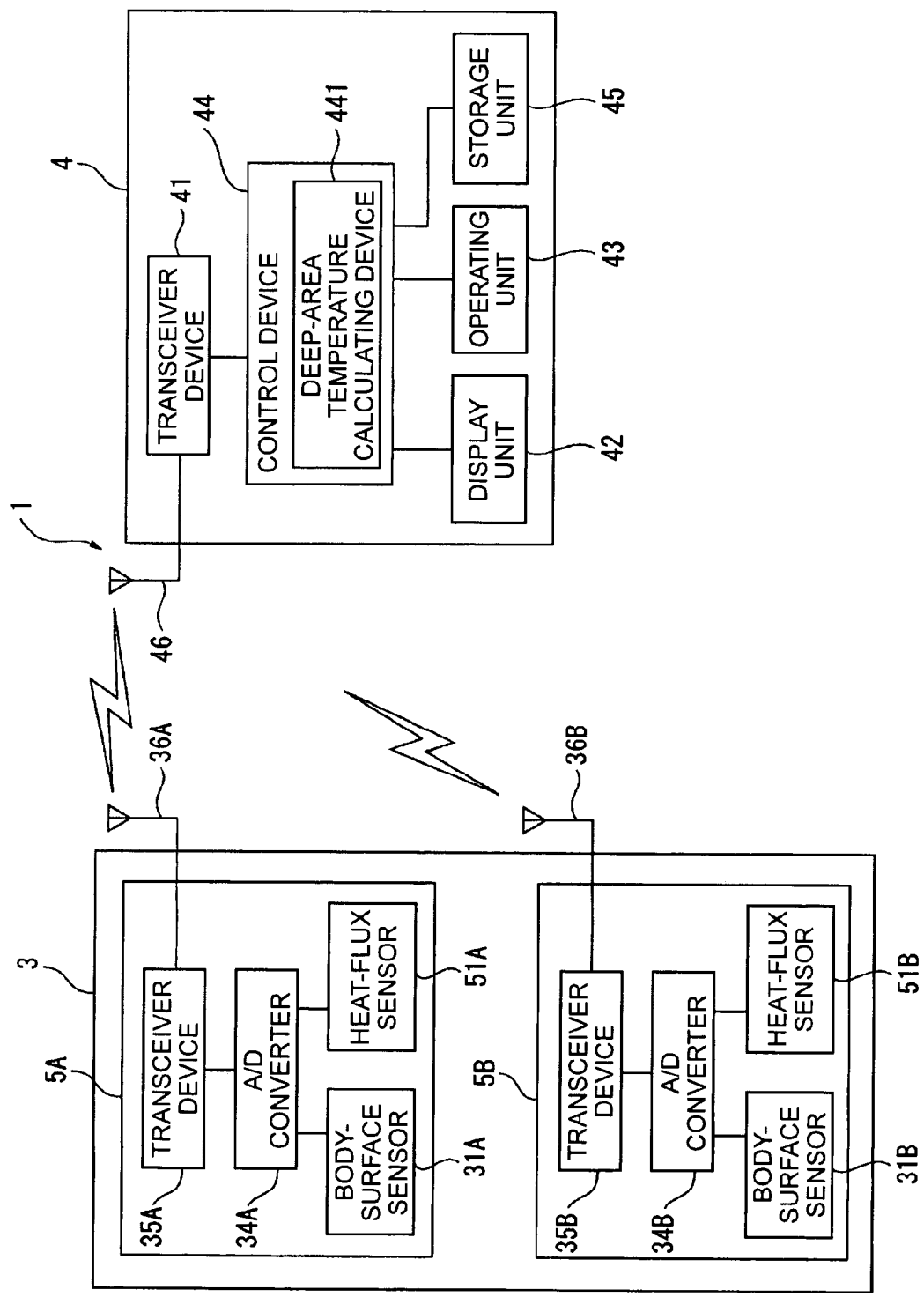
FIG. 11 is a view of a block diagram showing a thermometer according to a third preferred embodiment of the present invention.

FIG. 11 shows a block diagram of a thermometer 1 according to a third preferred embodiment of the present invention. As shown in FIG. 11, the thermometer main body 3 includes heat flux measuring units 5A and 5B as part of the first and second temperature measuring units. These heat flux measuring units 5A and 5B are not provided with the intermediate sensors 32A and 32B or the outer surface sensors 33A and 33B as in the previous embodiments, but are rather respectively provided, with a heat-flux sensor 51A as a first heat flux measuring unit, and a heat-flux sensor 51B as a second heat flux measuring unit. With these heat-flux sensors 51A and 51B, the heat flux measuring units 5A and 5B are brought into contact with the body surface 2A to measure the heat fluxes in the thermometer 1. The heat-flux sensors 51A and 51B are embedded in thermal insulating materials having different heat resistances (first heat resistance and second heat resistance) from the body surface 2A to a specific section (up to the outer surface 302A, for example), and the heat-flux sensors 51A and 51B measure the heat fluxes $Q_{u1}$ and $Q_{u2}$ of this specific section.

Either of Eq. (12) and Eq. (13) below is stored in the deep-area temperature calculating device 441.

$$Tcore = \frac{Qu1}{Qu1 - Qu2} \cdot (Tb3 - Tb1) + Tb1 \qquad (12)$$

$$Tcore = \frac{Qu2}{Qu1 - Qu2} \cdot (Tb3 - Tb1) + Tb3 \qquad (13)$$

In the thermometer 1 with this configuration, the first heat flux measuring step is conducted so that the first body-surface temperature $T_{b1}$ is measured by the body-surface sensor 31A and the first heat flux $Q_{u1}$ is measured by the heat flux measuring unit 5A, and the second heat flux measuring step is conducted so that the second body-surface temperature $T_{b3}$ is measured by the body-surface sensor 31B and the second heat flux $Q_{u2}$ is measured by the heat flux measuring unit 5B. Then, when these measured values are sent to the display device 4, in the deep-area temperature calculating step, the deep-area temperature calculating device 441 calculates the temperature $T_{core}$ of the deep area on the basis of the first body-surface temperature $T_{b1}$, the first heat flux $Q_{u1}$, the second body-surface temperature $T_{b3}$, and the second heat flux $Q_{u2}$.

According to the third embodiment, the following effects are achieved.

(10) In the thermometer 1 with this configuration, the temperature $T_{core}$ of the deep area of the organism can be calculated from the actual measured values in the same manner as in the previous embodiments, and therefore a more accurate body temperature can be measured.

As shown in Eq. (12) and Eq. (13), the arithmetic formula for the temperature $T_{core}$ of the deep area does not include heat resistance. Therefore, the heat resistances of specific sections in which the heat-flux sensors 51A and 51B measure the heat fluxes do not need to be known and can be different values. In other words, these heat resistances do not need to be set with high precision, and thermal insulating materials with different heat resistances can be used. Therefore, material selection and production are made easier, and the structure of the thermometer 1 is simplified.

Fourth Embodiment

Next, a fourth preferred embodiment of the present invention will be described.

Figure 12:
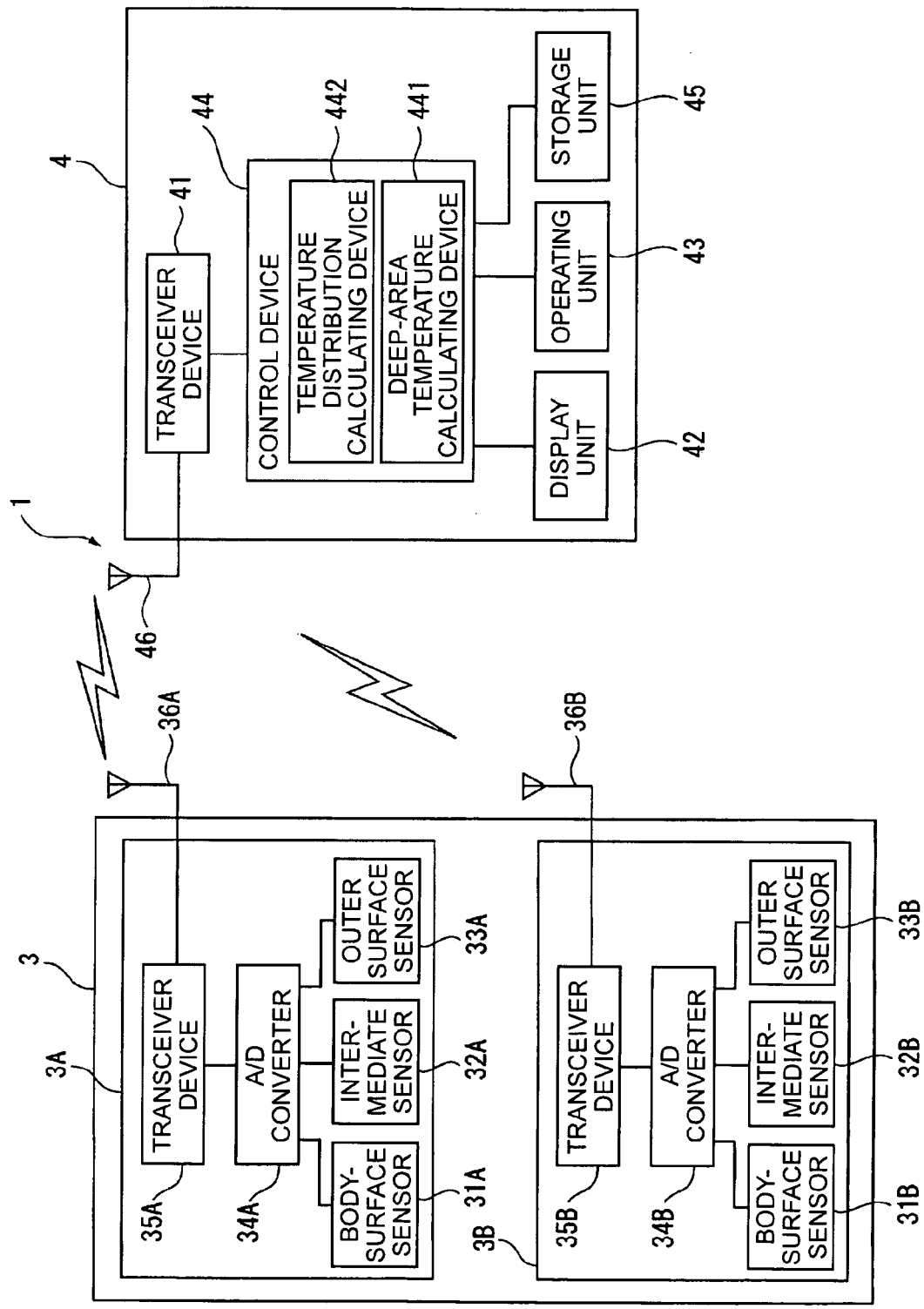
FIG. 12 is a view of a block diagram showing a thermometer according to a fourth preferred embodiment of the present invention.
Figure 13:
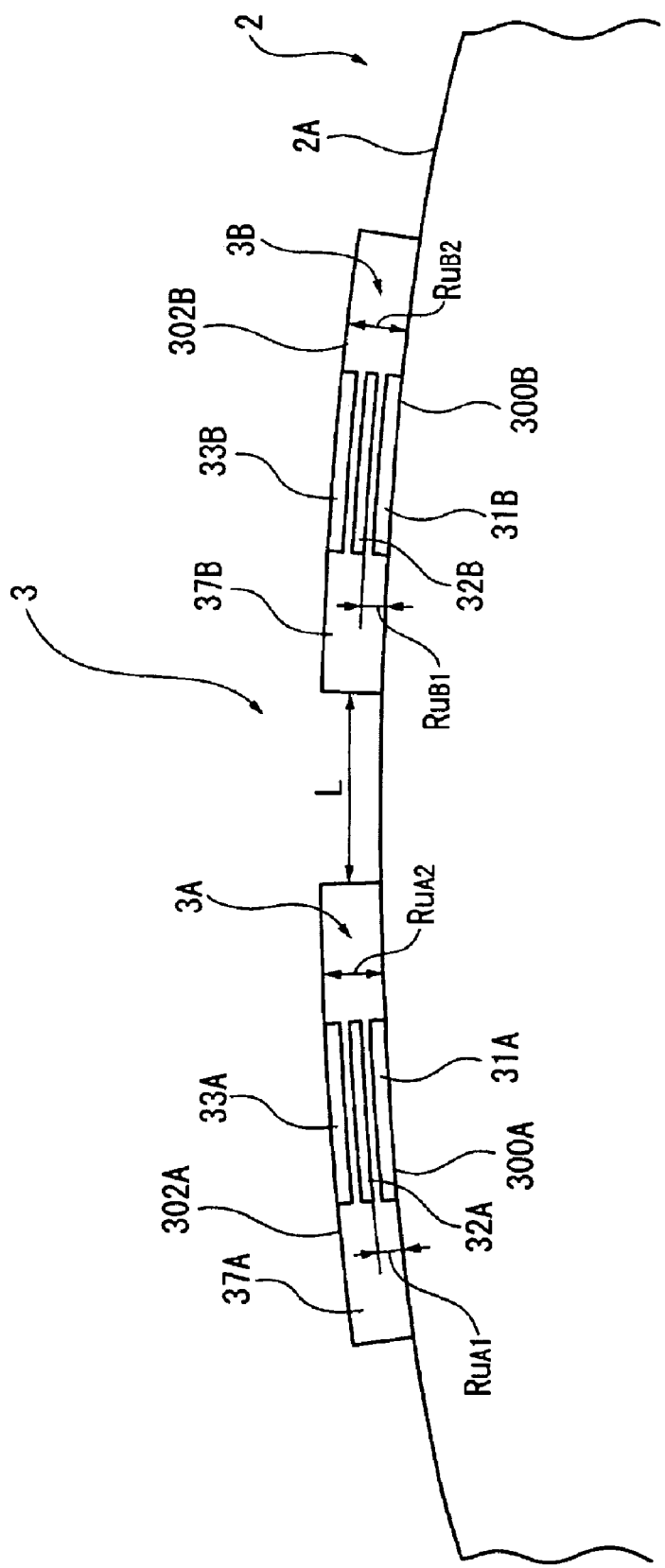
FIG. 13 is a view of a diagram showing the thermometer of the fourth embodiment.

FIG. 12 shows a block diagram of the thermometer 1 according to the fourth embodiment of the present invention. FIG. 13 shows an enlarged view of the thermometer main body 3 mounted on the human body 2. As shown in FIGS. 12 and 13, the thermometer main body 3 includes two (a pair of) temperature measuring devices, the temperature measuring device 3A as the first temperature measuring device and the temperature measuring device 3B as the second temperature measuring device.

The temperature measuring device 3A includes a body-surface sensor 31A, and outer surface sensor 33A, and intermediate sensor 32A, and a thermal insulating material 37A. The body-surface sensor 31A is a first temperature measuring unit that measures the temperature of the body surface 2A as the first body temperature, with the sensor 31A having a contact surface 300A that comes into contact with the body surface 2A. The outer surface sensor 33A is a first measuring unit that measures the temperature of the outer surface 302A as the first outer-surface temperature, with the sensor 33A having an outer surface 302A exposed to the air outside of the temperature measuring device 3A. The intermediate sensor 32A is placed in the middle between the body-surface sensor 31A and the outer surface sensor 33A as a first measuring unit to measure the temperature of the position thereof as a first intermediate temperature. The sensors 31A, 33A, and 32A are mounted and fixed in place on the thermal insulating material 37A.

The temperature measuring device 3B is provided separately from the temperature measuring device 3A. The temperature measuring device 3B includes a body-surface sensor 31B, an outer surface sensor 33B, an intermediate sensor 32B, and a thermal insulating material 37B. The body-surface sensor 31B is a second temperature measuring unit that measures the temperature of the second body surface 2A as the second body temperature at a different position from the contact position of the temperature measuring device 3A, with the sensor 31B having a contact surface 300B that comes into contact with the body surface 2A. The outer surface sensor 33B is a second measuring unit that measures the temperature of the outer surface 302B as the second outer-surface temperature, with the sensor 33B having an outer surface 302B exposed to the air outside of the temperature measuring device 3B. The intermediate sensor 32B is placed in the middle between the body-surface sensor 31B and the outer surface sensor 33B as a second measuring unit to measure the temperature of the position thereof as a second intermediate temperature. The sensors 31B, 33B, and 32B are mounted and fixed in place on the thermal insulating material 37B.

The thermometer main body 3 composed of these temperature measuring devices 3A and 3B is configured to be attached to the body surface 2A with an adequate amount of contact pressure, similar to the first embodiment.

The temperature measuring device 3A and temperature measuring device 3B are disposed at a specific distance L from each other, similar to the first embodiment.

The thermal insulating material 37A of the temperature measuring device 3A and the thermal insulating material 37B of the temperature measuring device 3B are configured from different materials, and the heat resistance $R_{uA2}$ of the thermal insulating material 37A and the heat resistance $R_{uB2}$ of the thermal insulating material 37B are thereby set to different values. The distance from the contact surfaces 300A and 300B to the intermediate sensors 32A and 32B is set, whereby the heat resistances from the contact surfaces 300A and 300B to the intermediate sensors 32A and 32B are made to assume specific preset values. In the present embodiment, the heat resistances of the intermediate sensors 32A and 32B are respectively set to a heat resistance $R_{uA1}$ and a heat resistance $R_{uB1}$.

In the fourth embodiment, the control device 44 includes a temperature distribution calculating device 442 and a deep-area temperature calculating device 441.

Figure 14:
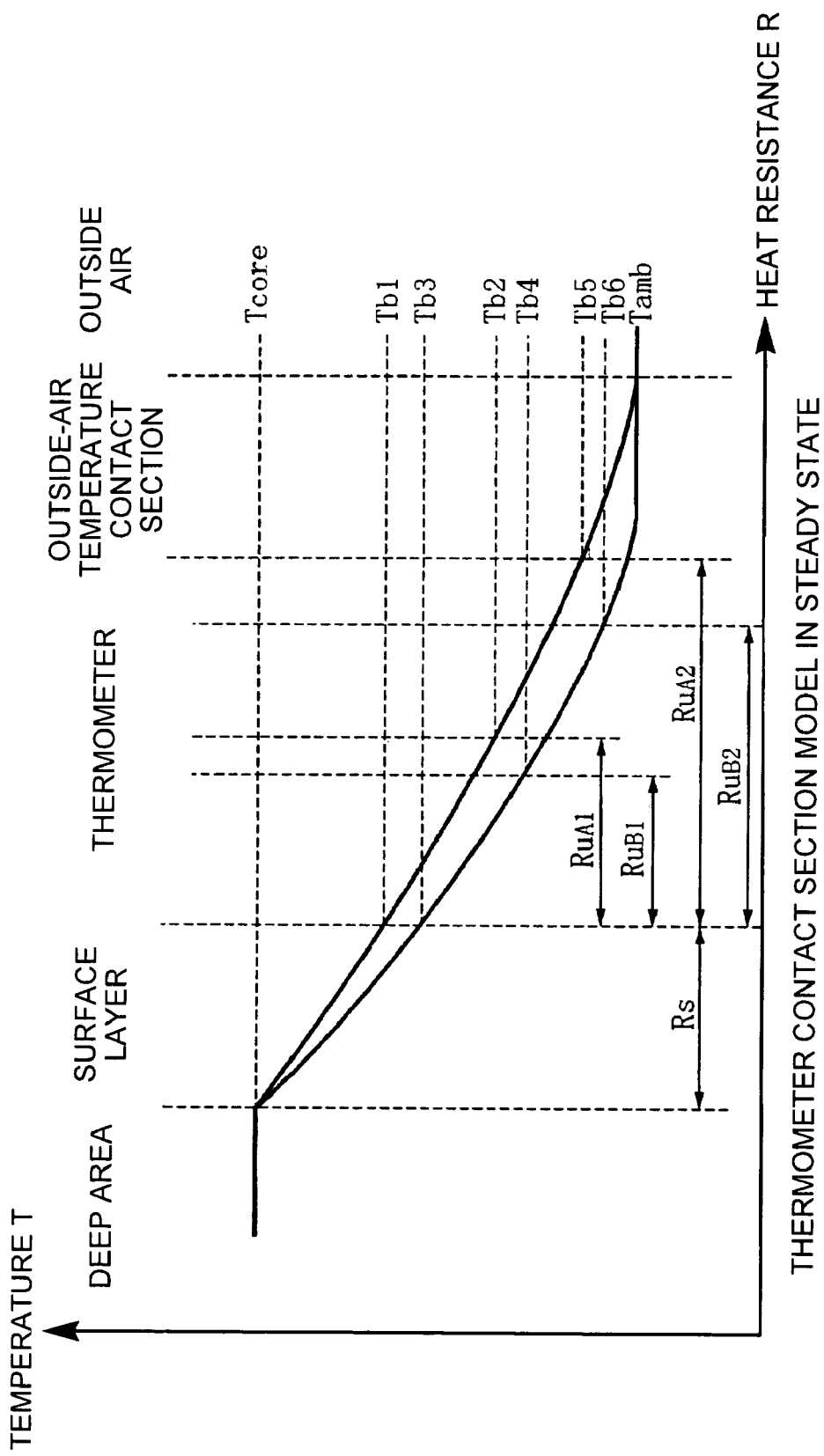
FIG. 14 is a view of a diagram showing a temperature distribution model of the thermometer and an organism of the fourth embodiment.

FIG. 14 shows a temperature distribution model for the temperature measuring devices 3A and 3B. As shown in FIG. 14, since the heat resistance of the temperature measuring device 3A and the heat resistance of the temperature measuring device 3B are different, the heat fluxes from the deep area of the human body 2 to the outside area are also different, and therefore the temperature distributions T (R) are different as well.

In the temperature measuring device 3A, the temperature distribution calculating device 442 uses Eq. (14) of the seventh embodiment to calculate the first temperature distribution $T_A(R)$ from the body-surface temperature $T_{b1}$ at heat resistance (R=0), the intermediate temperature $T_{b2}$ at heat resistance (R=$R_{uA1}$), and the outer-surface temperature $T_{b5}$ at heat resistance (R=$R_{uA2}$). In the temperature measuring device 3B, the temperature distribution calculating device 442 calculates the second temperature distribution $T_B(R)$ from the body-surface temperature $T_{b3}$ at heat resistance (R=0), the intermediate temperature $T_{b4}$ at heat resistance (R=$R_{uB1}$), and the outer-surface temperature $T_{b6}$ at heat resistance (R=$R_{uB2}$) in the same manner.

The deep-area temperature calculating device 441 calculates the temperature $T_{core}$ of the deep area by plotting the temperature distribution $T_A(R)$ and the temperature distribution $T_B(R)$, and determining their point of intersection.

Therefore, in the fourth embodiment, since the temperature $T_{core}$ of the deep area of the human body 2 is determined from the temperature distribution $T_A(R)$ and the temperature distribution $T_B(R)$, there is no need for a preparatory temperature measuring step in which the temperature of the deep area is measured in advance with a known thermometer. In other words, in the thermometer 1 of the fourth embodiment, when the temperature measurement command signal is sent to the thermometer main body 3 from the control device 44, the temperature information from the sensors 31A, 32A, 33A, 31B, 32B, and 33B is sent to the control device 44. The temperature distribution calculating device 442 calculates the temperature distribution $T_A(R)$ and the temperature distribution $T_B(R)$ from this temperature information. The deep-area temperature calculating device 441 then calculates the temperature $T_{core}$ of the deep area from the temperature distribution $T_A(R)$ and the temperature distribution $T_B(R)$.

According to the fourth embodiment, the following effects are achieved.

(11) Since the thermometer 1 is provided with two temperature measuring devices 3A and 3B, the temperature $T_{core}$ of a deep area can be calculated by the deep-area temperature calculating device 441 using the temperature distribution $T_A(R)$ and the temperature distribution $T_B(R)$ obtained by the temperature distribution calculating device 442. In other words, since there is no need to calculate the surface-layer heat resistance $R_s$, the configuration of the control device 44 can be simplified and the calculation process can be accelerated. Therefore, the responsiveness of the thermometer 1 can be improved.

Also, since the thermometer 1 is provided with two temperature measuring devices 3A and 3B, the temperature of the deep area can be directly calculated using the temperature distribution $T_A(R)$ and the temperature distribution $T_B(R)$, and therefore there is no need to measure the temperature of the deep area in advance with a known thermometer in order to determine the surface-layer heat resistance $R_s$, nor is there a need for a preparatory step for body temperature measurement. Consequently, the body temperature measuring time of the thermometer 1 can be shortened, and the handling of the thermometer 1 can be improved.

Fifth Embodiment

Next, a fifth preferred embodiment of the present invention will be described. The fifth embodiment is similar to the fourth embodiment except that the first measuring unit and second measuring unit in the fourth embodiment have a common heat resistance.

Figure 15:
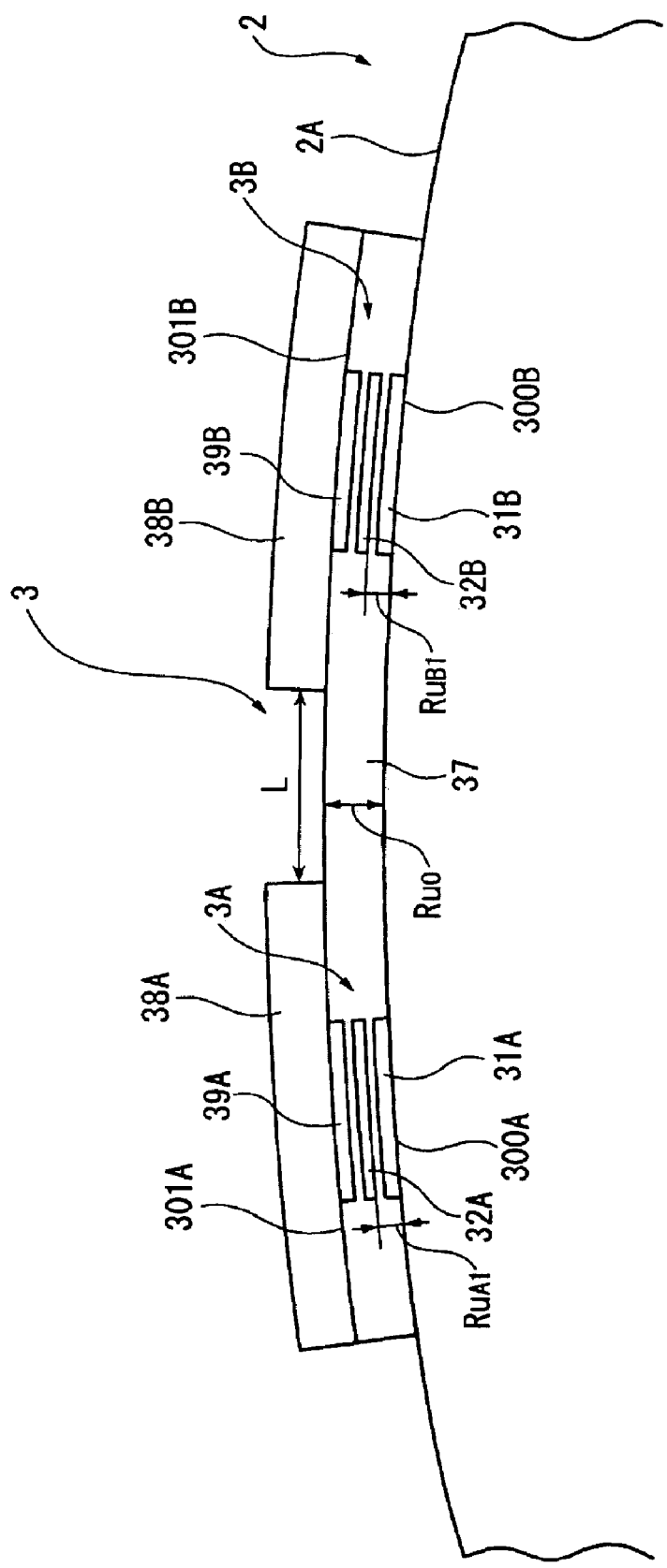
FIG. 15 is a view of a diagram showing a thermometer main body according to a fifth preferred embodiment of the present invention.

The thermometer main body 3 of the fifth embodiment is shown in FIG. 15. In FIG. 15, the thermometer main body 3 includes temperature measuring devices 3A and 3B, similar to the fourth embodiment.

The temperature measuring device 3A includes a thermal insulating material 37 having a contact surface 300A that comes into contact with the body surface 2A of the human body 2, and a thermal insulating material 38A as a first thermal insulating material provided between the thermal insulating material 37 and the outside air. The temperature measuring device 3B includes a thermal insulating material 37 having a contact surface 300B that comes into contact with the body surface 2A at a different position from the contact position of the temperature measuring device 3A, and a thermal insulating material 38B as a second thermal insulating material provided between the thermal insulating material 37 and the outside air. Specifically, the thermal insulating materials 37 are common between the temperature measuring device 3A and temperature measuring device 3B, and therefore have a common heat resistance $R_{u0}$.

The temperature measuring device 3A includes a body-surface sensor 31A that comes into contact with the body surface 2A and measures the temperature of the body surface 2A, an interface sensor 39A to measure the temperature of the interface 301A between the thermal insulating material 37 and the thermal insulating material 38A, and an intermediate sensor 32A provided between the body-surface sensor 31A and the interface sensor 39A. Also, the temperature measuring device 3B includes, similar to the temperature measuring device 3A, a body-surface sensor 31B, an interface sensor 39B to measure the temperature of the interface 301B between the thermal insulating material 37 and the thermal insulating material 38B, and an intermediate sensor 32B.

The heat resistances from the body surface 2A to the intermediate sensors 32A and 32B are known, and are respectively set to heat resistance $R_{uA1}$ and heat resistance $R_{uB1}$. In the present embodiment, the heat resistances $R_{uA1}$ and $R_{uB1}$ are set to the same value ($R_{uA1}=R_{uB1}$) by equalizing the distances of the intermediate sensors 32A and 32B from the body surface 2A.

The heat resistances of the thermal insulating material 38A and thermal insulating material 38B are set to different values, and therefore the temperature measuring devices 3A and 3B have different overall heat resistances, but the heat resistances to the body-surface sensors 31A and 31B, the heat resistances to the intermediate sensors 32A and 32B, and the heat resistances to the interface sensors 39A and 39B are all set to be equal.

In the fifth embodiment, similar to the fourth embodiment, the temperature distribution calculating device 442 calculates the temperature distribution $T_A(R)$ and the temperature distribution $T_B(R)$, and the deep-area temperature calculating device 441 calculates the temperature $T_{core}$ of the deep area from the temperature distribution $T_A(R)$ and temperature distribution $T_B(R)$. At this time, since the temperature measuring devices 3A and 3B have different overall heat resistances, the heat fluxes passing through their interiors are different, and the temperature distribution $T_A(R)$ and temperature distribution $T_B(R)$ are also different. However, since the heat resistance (R=0) to the body-surface sensors 31A and 31B, the heat resistance ($R=R_{uA1}=R_{uB1}$) to the intermediate sensors 32A and 32B, and the heat resistance ($R=R_{u2}$) to the interface sensors 39A and 39B are set to be equal, these common heat resistances are eliminated from the calculation when the deep-area temperature calculating device 441 calculates the temperature of the deep area, and therefore the temperature $T_{core}$ of the deep area can be calculated without using these heat resistances. In other words, the temperature $T_{core}$ of the deep area is measured solely from the body-surface temperatures $T_{b1}$ and $T_{b3}$ measured by the body-surface sensors 31A and 31B, the intermediate temperatures $T_{b2}$ and $T_{b4}$ measured by the intermediate sensors 32A and 32B, and the interface temperatures $T_{b5}$ and $T_{b6}$ measured by the interface sensors 39A and 39B.

According to the fifth embodiment, the following effects are achieved in addition to the same effects as in (11) of the fourth embodiment.

(12) Since the temperature measuring devices 3A and 3B are disposed on a common thermal insulating material 37, the handling of the thermometer 1 can be improved because the temperature measuring devices 3A and 3B can be configured integrally.

Although the temperature measuring devices 3A and 3B have different overall heat resistances, the heat resistances at the positions of the body-surface sensors 31A and 31B, the heat resistances at the positions of the intermediate sensors 32A and 32B, and the heat resistances at the positions of the interface sensors 39A and 39B made equal to each other, and therefore these heat resistances are eliminated from the calculation of the temperature of the deep area in the deep-area temperature calculating device 441. Therefore, the calculation process in the deep-area temperature calculating device 441 is simplified, and the calculation process is performed in less time.

Also, since heat resistances are not needed when calculating the temperature of the deep area, providing the temperature measuring devices 3A and 3B with different overall heat resistances and equalizing the heat resistances at the positions of the body-surface sensors 31A and 31B, the heat resistances at the positions of the intermediate sensors 32A and 32B, and the heat resistances at the positions of the interface sensors 39A and 39B will dispense with the need to manage strictly the set values of these parameters. Therefore, the manufacturing management of the thermometer 1 can be simplified because there is no need to manage strictly the heat resistances during the manufacture of the thermometer 1.

Also, when clothing is worn over the thermometer 1 and caused to come into contact with the thermometer 1, or when the thermometer 1 is attached and caused to come into contact with bedding when the user lies down, for example, the heat resistances of the temperature measuring devices 3A and 3B change, but the temperature of the deep area can still be accurately measured as long as the total heat resistances of the temperature measuring devices 3A and 3B are different. Therefore, the restrictions on position or clothing while the thermometer 1 is attached can be reduced, and the handling of the thermometer 1 can be improved.

Sixth Embodiment

A sixth preferred embodiment of the present invention will now be described.

Figure 16:
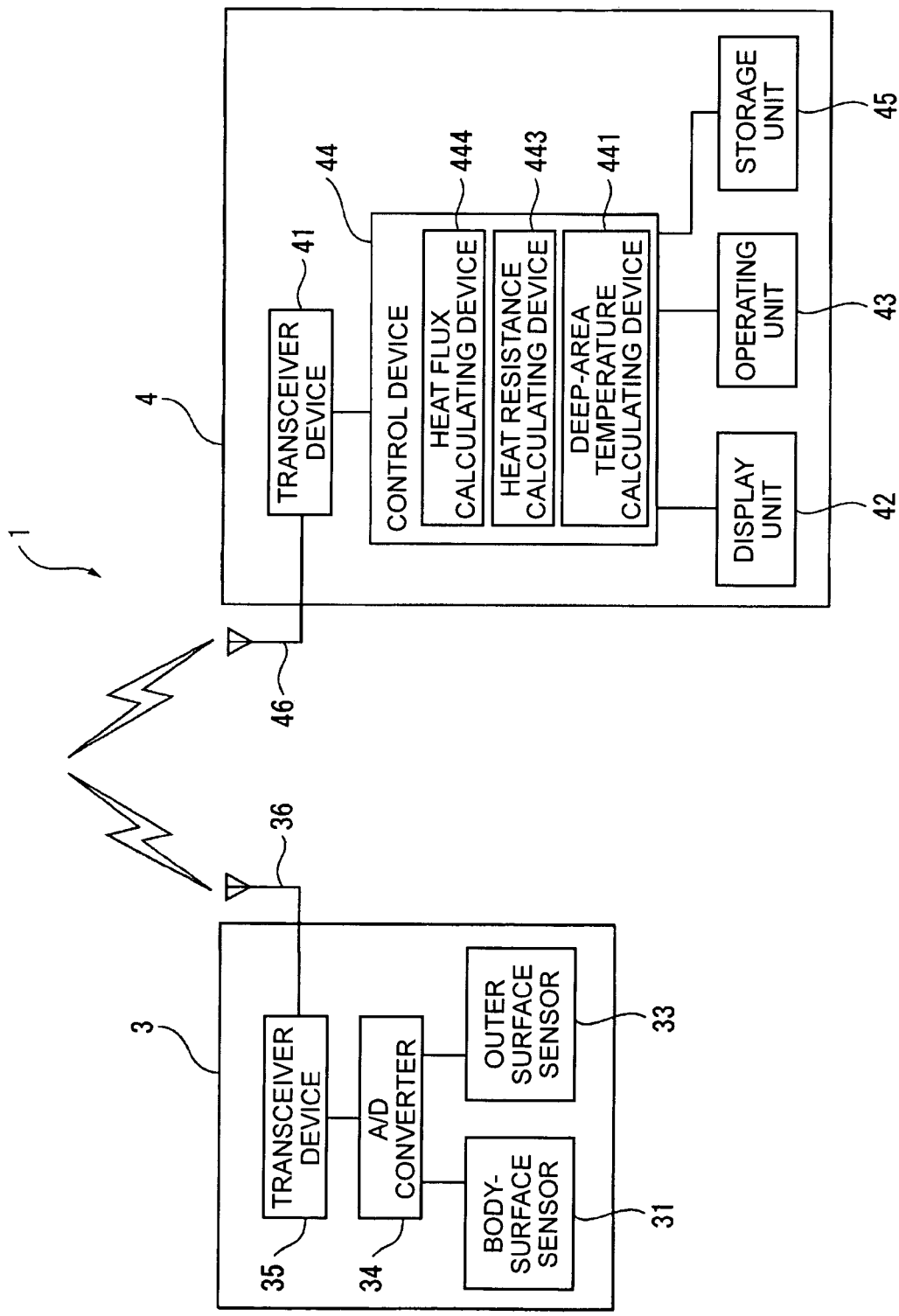
FIG. 16 is a view of a block diagram showing a thermometer according to a sixth preferred embodiment of the present invention.

FIG. 16 shows a block diagram of the thermometer 1 according to the present embodiment. This thermometer 1 includes a thermometer main body 3 that comes into contact with a body surface on the human body 2 (see FIG. 17) as the organism, and a display device 4 provided separately from the thermometer main body 3.

Figure 17:
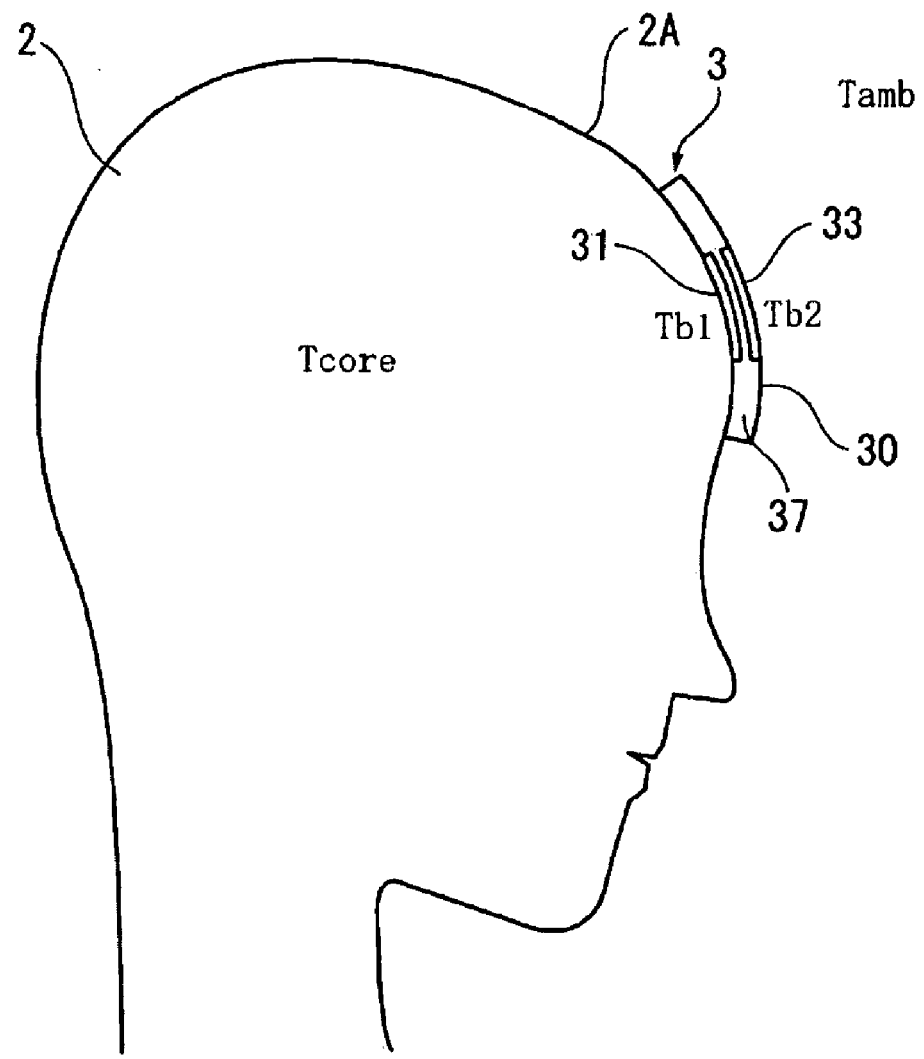
FIG. 17 is a view of a diagram showing a main body of the thermometer of the sixth embodiment.
Figure 18:
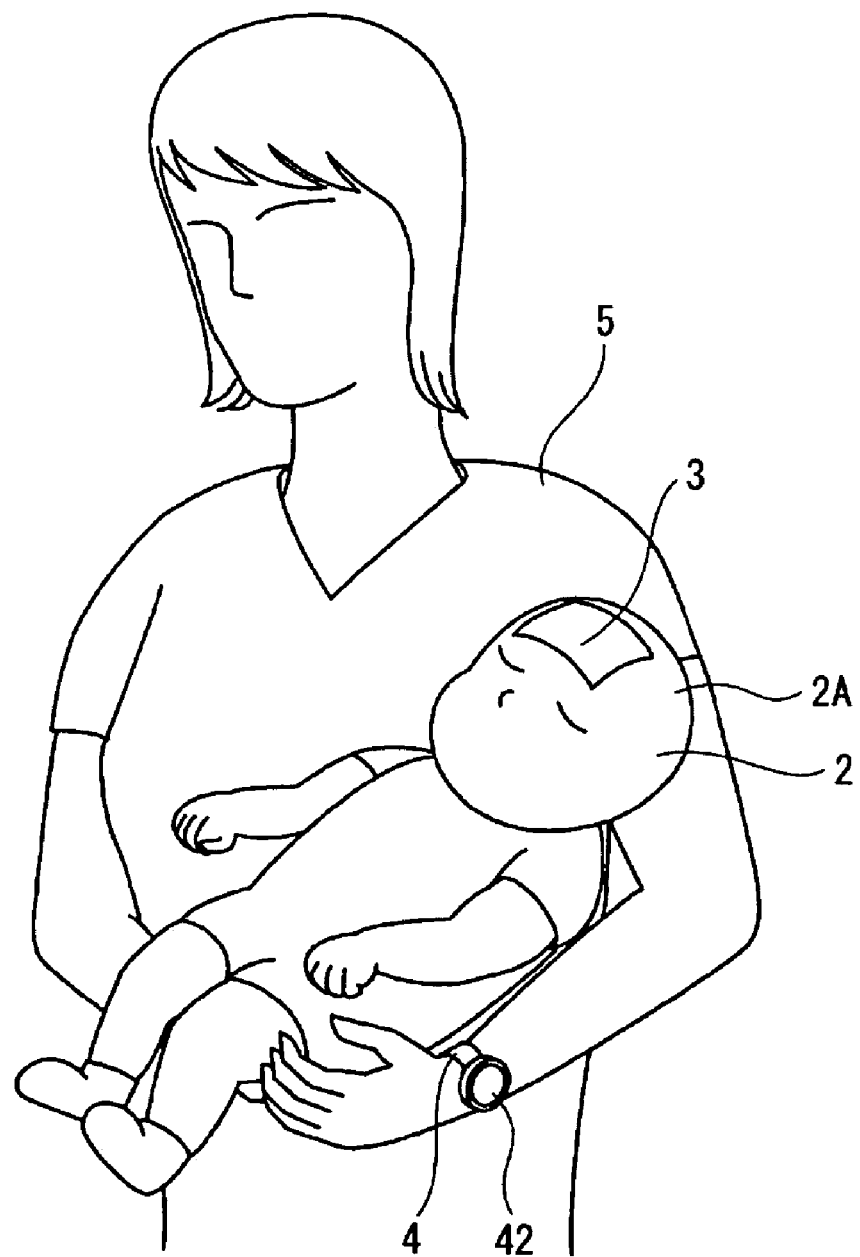
FIG. 18 is a view of a diagram showing a main body and a display device of the thermometer of the sixth embodiment.

FIG. 17 shows a drawing of the thermometer main body 3 mounted on the human body 2, and FIG. 18 shows a drawing of the thermometer main body 3 and display device 4 in the mounted state.

First, as shown in FIG. 17, the thermometer main body 3 includes a body-surface sensor 31, an outer surface sensor 33, and a thermal insulating material 37. The body-surface sensor 31 is a base temperature measuring unit that comes into contact with the body surface 2A of the human body 2 and determines the temperature of the body surface 2A. The outer surface sensor 33 is a reference temperature measuring unit that has an outer surface 30 exposed to the air outside of the thermometer main body 3 and that determines the temperature of the outer surface 30. The thermal insulating material 37 is located between the body-surface sensor 31 and the outer surface sensor 33. This thermometer main body 3 is capable of being attached to the human body 2 by the surface on the side of the body-surface sensor 31 with an adhesive or the like, and the thermometer main body 3 is configured so that it can be attached with an adequate amount of contact pressure to the body surface 2A with this adhesive. In the present embodiment, the thermometer main body 3 is attached to the forehead of an infant (human body 2).

The position where the thermometer main body 3 is attached is preferably on the forehead, the back of the neck, the chest, the back, or another such area where the skin temperature on the human body is not susceptible to the effects of outside air, and the body-surface temperature can be measured relatively easily. Also, the thermal insulating material 37 is preferably large enough so that the heat flux from the deep area of the human body 2 through the body surface 2A and the thermal insulating material 37 to the outer surface 30 can be approximated to be constant in a steady state when the thermometer main body 3 is attached to the body surface 2A. For example, one possibility is for the thermal insulating material 37 to be formed into a substantially rectangular shape with length and width dimensions of 10 cm or greater. In this case, it is possible to ignore the movement of heat in a direction substantially perpendicular to the direction joining the deep area of the human body 2 to the position of the body surface 2A on which the thermometer main body 3 is attached, that is, in the direction running along the body surface 2A. The movement of heat from the deep area of the human body 2 to the body surface 2A can be considered to be uniaxial, and the heat flux can be approximated to be moving in one direction.

The body-surface sensor 31 and the outer surface sensor 33 can be the same as those described in the first embodiment.

As shown in FIG. 16, the thermometer main body 3 also includes an A/D converter 34 and a transceiver device 35, in addition to the body-surface sensor 31 and the outer surface sensor 33. The A/D converter 34 converts the analog signals of heat resistance or voltage converted by the body-surface sensor 31 and the outer surface sensor 33 into digital signals, and outputs the digital signals to the transceiver device 35.

The transceiver device 35 includes an antenna coil 36 and sends the signals of temperature (resistance and voltage) converted to digital signals by the A/D converter 34 to the display device 4 by radio waves.

The display device 4 is configured to be portable in a wristwatch style, and is designed to be attached by the operator 5 holding the infant on whom the thermometer main body 3 is to be attached, as shown in FIG. 18. The display device 4 includes a transceiver device 41 to exchange signals with the thermometer main body 3, a display unit 42 to display the results of measuring body temperature, an operating unit 43 to operate the display device 4 from the exterior, a control device 44 to control the operation of the display device 4, and a storage unit (storage device) 45 to store information obtained from the transceiver device 41 and the control device 44, as shown in FIG. 16.

The transceiver device 41 includes an antenna coil 46 and exchanges radio waves with the antenna coil 36 of the thermometer main body 3. The antenna coil 46 generates electromotive force in the antenna coil 36 through electromagnetic induction by transmitting radio waves to the antenna coil 36, and charges the thermometer main body 3. Therefore, the thermometer main body 3 is driven by this electromotive force, and there is no need for an internal battery or other such power source.

The display unit 42 and the operating unit 43 are similar to those in the first embodiment, and descriptions thereof are therefore omitted.

The control device 44 includes a heat flux calculating device 444, a heat resistance calculating device 443, and a deep-area temperature calculating device1 The heat flux calculating device 444 that calculates the heat flux from the body surface 2A to the outer surface 30 on the basis of the body-surface temperature from the body-surface sensor 31 and the outer-surface temperature from the outer surface sensor 33. The heat resistance calculating device 443 calculates the heat resistance of the area that extends from the deep area of the human body 2 to the body surface 2A on the basis of the calculated heat flux. The deep-area temperature calculating device 441 calculates the temperature of a deep area in the human body 2 on the basis of the heat resistance calculated by the heat resistance calculating device 443.

The heat flux calculating device 444 calculates the heat flux $Q_u$ passing between the body surface 2A and the outer surface 30 from the body-surface temperature $T_{b1}$ measured by the body-surface sensor 31 and the outer-surface temperature $T_{b2}$ measured by the outer surface sensor 33.

Figure 19:
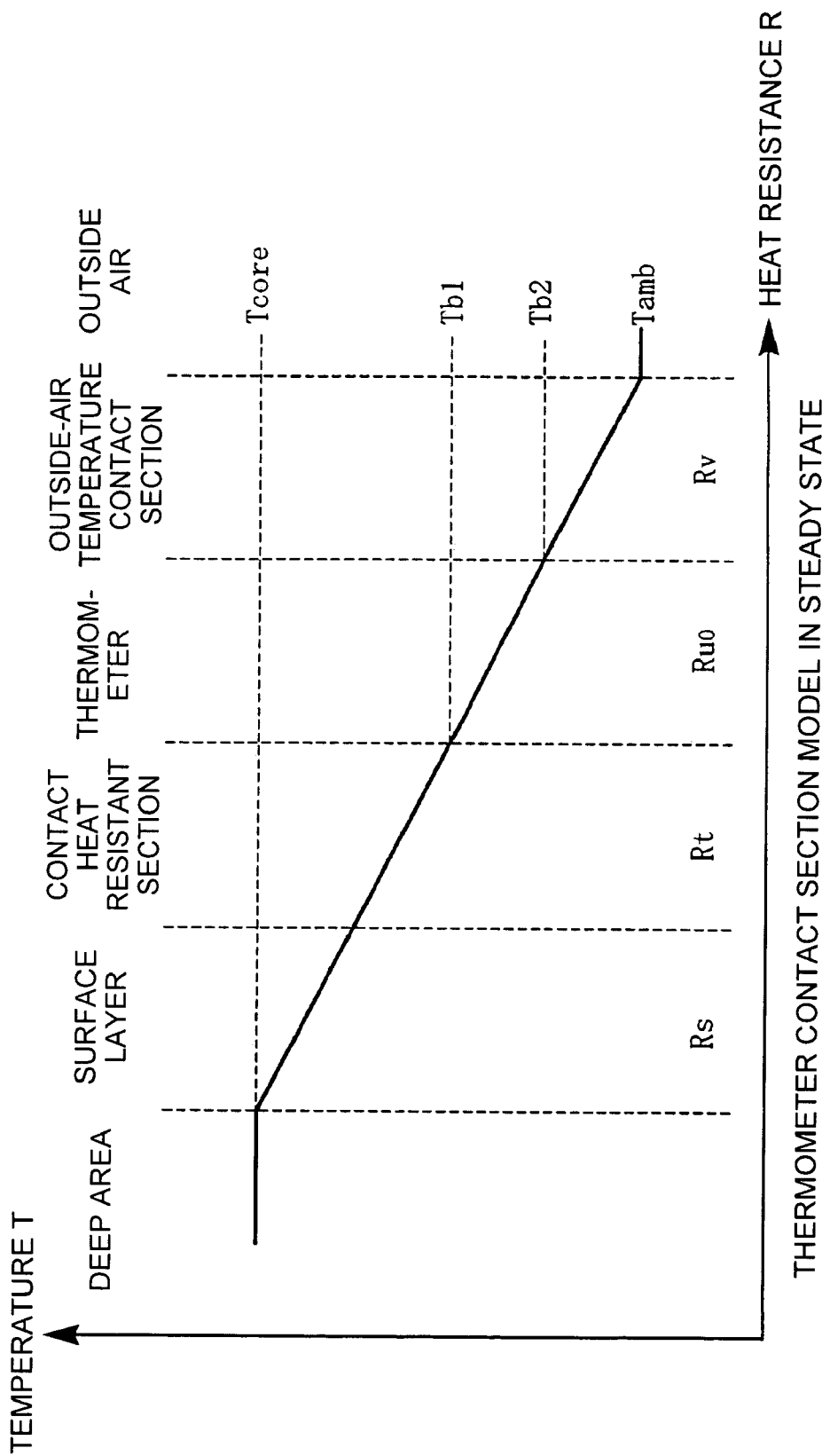
FIG. 19 is a view of a diagram showing a temperature distribution model of the thermometer and an organism of the sixth embodiment.

FIG. 19 shows a model of the temperature distribution from a deep area of the human body 2 through the body surface 2A and the thermometer main body 3 to the outside air. As shown in FIG. 19, in the model of temperature transmission from the deep area of the human body 2 to the outside air, the temperature $T_{core}$ of the deep area of the human body 2 is substantially constant. In the surface layer farther out than the deep area, the body temperature drops due to the effects of the heat resistance of the skin and the outside-air temperature. Microscopic gaps form between the body surface 2A and the thermometer main body 3, and the temperature therefore decreases in the contact heat resistant area due to heat radiation in these gaps. When the temperature of the body surface 2A is actually measured by the thermometer main body 3, the body-surface temperature $T_{b1}$ that has decreased due to this contact heat resistant area is measured as a result.

Since heat resistance exists in the thermometer main body 3 as such, a reduction in temperature also occurs in the thermometer main body 3, and temperature $T_{b2}$ is established on the outer surface 30 of the thermometer main body 3. This temperature $T_{b2}$ is measured by the outer surface sensor 33. Furthermore, the temperature decreases because heat is radiated in the outside-air temperature contact section between the outer surface 30 of the thermometer main body 3 and the outside air, and the temperature ultimately reaches the outside-air temperature $T_{amb}$.

The slope of the temperature distribution graph corresponds to the heat flux Q, wherein the horizontal axis is heat resistance and the vertical axis is temperature. In a steady state, the heat flux Q in all areas is constant, and therefore the slope of the graph in FIG. 19 is also constant. At this time, since the heat resistance $R_{u0}$ of the thermometer main body 3 is known to be nearly equal to the heat resistance of the thermal insulating material 37, the heat flux $Q_{u1}$ can be calculated by the following formula if the body-surface temperature $T_{b1}$ of the thermometer main body 3 and the outer-surface temperature $T_{b2}$ are known.

$$Qu = \frac{T_{b1} - T_{b2}}{R_{u0}}$$

The heat resistance calculating device 443 uses the heat flux $Q_u$ determined by the above-mentioned mathematical formula 1 to calculate the heat resistance $R_s+R_t$ in the area that extends from the deep area of the human body 2 to the body surface 2A in the following manner.

The heat flux $Q_{s+t}$ in the area containing both the surface layer and the contact heat resistance section, that is, the area that extends from the deep area of the human body 2 to the body surface 2A, is expressed by the following formula using the temperature $T_{core}$ of the deep area of the human body 2 and the heat resistance $R_s+R_t$.

$$Q_{s+t} = \frac{T_{core} - T_{b1}}{R_s + R_t}$$

Since the heat flux Q is constant in all areas, the heat flux $Q_u$ in the interior of the thermometer main body 3 and the heat flux $Q_{s+t}$ in the area that extends from the deep area of the human body 2 to the body surface 2A are equal. Therefore, these formulas can be rewritten as follows.

As shown in this formula, if the for-calculation body-surface temperature $T_{0,b1}$ to calculate the heat resistance measured by the body-surface sensor 31, the for-calculation outer-surface temperature $T_{0,b2}$ to calculate the heat resistance measured by the outer surface sensor 33, and the for-calculation deep area body temperature $T_{0,core}$ of the deep area for calculating heat resistance are known, then the surface-layer heat resistance $R_s+R_t$ of the area that extends from the deep area all the way to the body surface 2A can be determined.

$$R_s + R_t = \frac{T_{0,core} - T_{0,b1}}{T_{0,b1} - T_{0,b2}} \cdot R_{u0} \left( R_s + R_t = \frac{T_{0,core} - T_{0,b1}}{Q_u} \right)$$

When the body temperature of the human body 2 is actually measured, the deep-area temperature calculating device 441 uses the surface-layer heat resistance $R_s+R_t$ calculated by the heat resistance calculating device 443 to calculate the temperature $T_{core}$ of the deep area by the following formula from the body-surface temperature $T_{b1}$ obtained by the body-surface sensor 31 and the outer-surface temperature $T_{b2}$ obtained by the outer surface sensor 33.

$$T_{core} = T_{b1} + \frac{R_s + R_t}{R_{u0}} \cdot (T_{b1} - T_{b2})$$

The body-surface temperature $T_{b1}$ and the outer-surface temperature $T_{b2}$ sent from the thermometer main body 3 are stored in the storage unit 45. The surface-layer heat resistance $R_s+R_t$ of the area that extends from the deep area of the human body 2 to the body surface 2A calculated by the heat resistance calculating device 443, and the temperature $T_{core}$ of the deep area of the human body 2 calculated by the deep-area temperature calculating device 441 are also stored.

The storage unit 45 is configured to be capable of storing temperature information about multiple human bodies 2, and the surface-layer heat resistance $R_s+R_t$ and the temperature $T_{core}$ of the deep area and the like are stored for each human body 2. Also, the storage unit 45 is capable of storing the measurement positions of the for-calculation body-surface temperature $T_{0,b1}$ and the for-calculation reference temperature $T_{0,b2}$ that are measured when the surface-layer heat resistance $R_s+R_t$ is calculated. In addition to the aforementioned temperature information, the storage unit 45 may also be made to store the name of the person to be measured (human body 2, infant), his or her age, the date of the measurement, and other such measurement information, for example. In this case, this measurement information may be input from the operating unit 43.

The thermometer 1 operates in the following manner.

Figure 20:
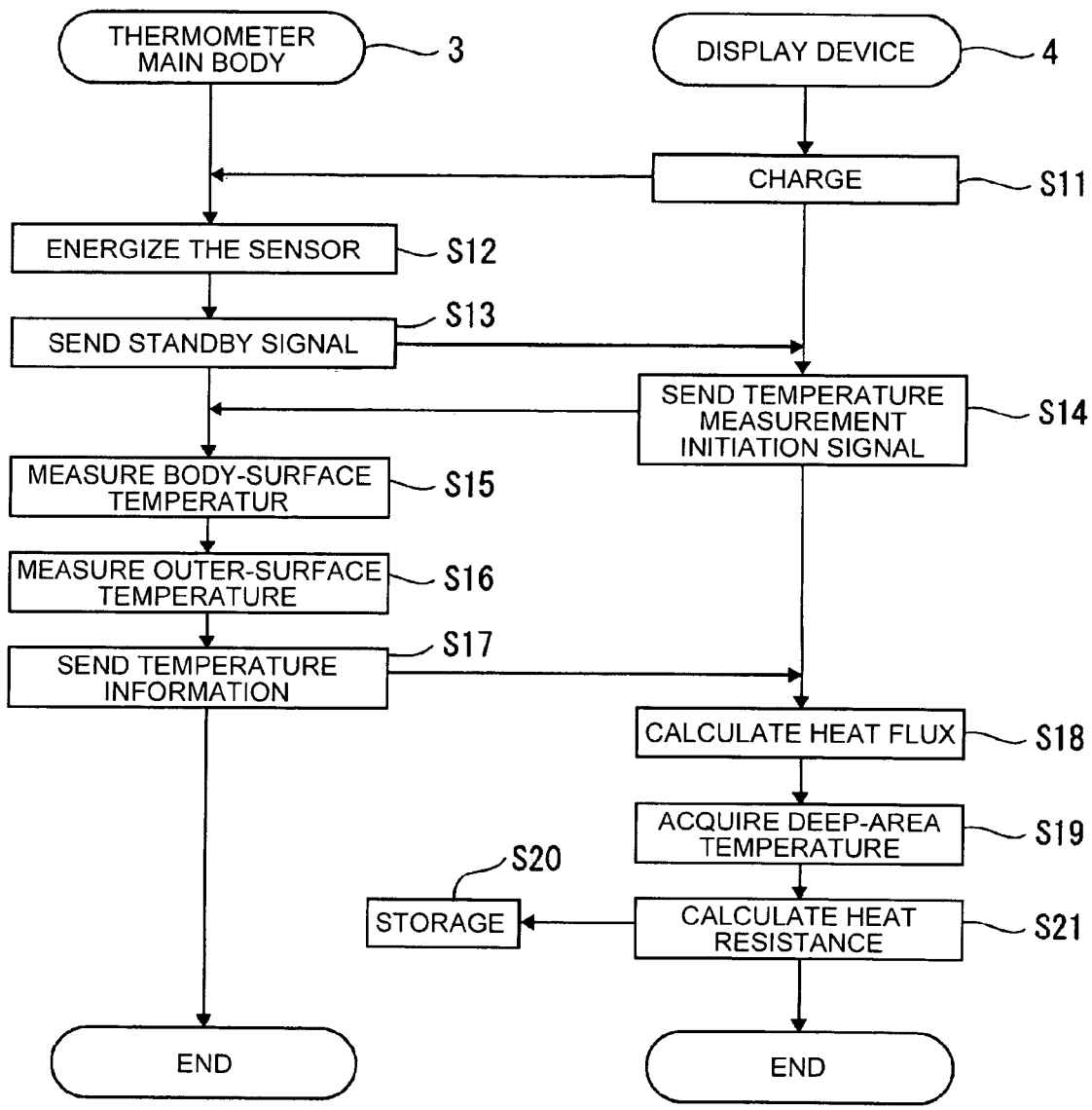
FIG. 20 is a view of a flowchart depicting an operation of the thermometer of the sixth embodiment.

FIG. 20 shows a flowchart depicting the operation of the thermometer 1 in the present embodiment. As shown in FIG. 20, when the body temperature of the human body 2 is measured with the thermometer 1, a body temperature measuring preparatory step is first performed so that the surface-layer heat resistance $R_s+R_t$ from the deep area in the human body 2 to the body surface 2A is calculated.

The thermometer main body 3 is attached to the human body 2 (the forehead of the infant in the present embodiment), and the operator 5 of the thermometer 1 who is holding the infant attaches the display device 4 to the arm. When the operator 5 turns on the switch of the display device 4 by operating the operating unit 43 of the display device 4, the transceiver device 41 sends radio waves to the thermometer main body 3. The thermometer main body 3 is charged by creating electromotive force in the antenna coil 36 with the electromagnetic induction caused by these radio waves (step S11). The thermometer main body 3 is energized by this electromotive force (step S12), and the body-surface sensor 31 and outer surface sensor 33 are also energized. When these sensors 31 and 33 are energized, the thermometer main body 3 sends a standby signal to the display device 4 from the transceiver device 35 (step S13).

When the control device 44 of the display device 4 receives this standby signal, a temperature measurement command signal is sent from the transceiver device 41 (step S14). The thermometer main body 3 receives this temperature measurement command signal, drives the body-surface sensor 31 and the outer surface sensor 33, and measures the for-calculation body-surface temperature $T_{0,b1}$ of the body surface 2A and the for-calculation outside-air temperature $T_{0,b2}$ of the outer surface 30 (step S15 and step S16, heat resistance calculation temperature measuring step). The temperature information about the for-calculation body-surface temperature $T_{0,b1}$ and the for-calculation outside-air temperature $T_{0,b2}$ is converted from analog signals to digital signals by the A/D converter 34, and is sent to the display device 4 by the transceiver device 35 (step S17). The for-calculation body-surface temperature $T_{0,b1}$ and the for-calculation outside-air temperature $T_{0,b2}$ are preferably measured after a specific time has passed so that the transfer of heat from the deep area of the human body 2 to the body surface 2A reaches a steady state.

It is necessary to determine whether the control device 44 calculates the surface-layer heat resistance $R_s+R_t$ or the temperature of the deep area by using the temperature information obtained from the body-surface sensor 31 and the outer surface sensor 33. Therefore, the control device 44 is provided with a selection device (not shown). This selection device displays a selection screen on the display unit 42, for example, to selecte either a "body temperature measurement preparation mode" or a "body temperature measurement mode," and may be configured so that the operator 5 can select either of the modes by operating the operating unit 43. The operator 5 herein selects the temperature measurement preparatory mode and instructs the control device 44 to calculate the surface-layer heat resistance $R_s+R_t$ by using the temperature information. The control device 44 of the display device 4 calculates the heat flux $Q_{s+r}$ with the heat flux calculating device 444 on the basis of the for-calculation body-surface temperature $T_{0,b1}$ and the for-calculation outer-surface temperature $T_{0,b2}$ sent from the thermometer main body 3.

Next, the display device 4 displays a screen to request input of the for-calculation deep area body temperature $T_{0,core}$, which is the temperature of the deep area for calculating the heat resistance, on the display unit 42. The operator 5 inputs the measured for-calculation deep area body temperature $T_{0,core}$ by operating the operating unit 43. The display device 4 thereby acquires the for-calculation deep area body temperature $T_{0,core}$ (step S19). The for-calculation deep area body temperature $T_{0,core}$ may be measured with a known thermometer that measures underarm temperature, oral temperature, or the like.

The heat resistance calculating device 443 of the control device 44 calculates the surface-layer heat resistance $R_s+R_t$ from the deep area of the human body 2 to the body surface 2A with Eq. (3) from the acquired for-calculation deep area body temperature $T_{0,core}$ and the heat flux $Q_{s+r}$ calculated by the heat flux calculating device 444 (step S20, heat resistance calculating step). The control device 44 stores the calculated surface-layer heat resistance $R_s+R_t$ in the storage unit 45 (step S21, storage step), and completes body temperature measurement preparation.

Next, the operation of the thermometer 1 in the body temperature measurement step will be described for a case in which the body temperature of the human body 2 is actually measured in a continuous manner.

Figure 21:
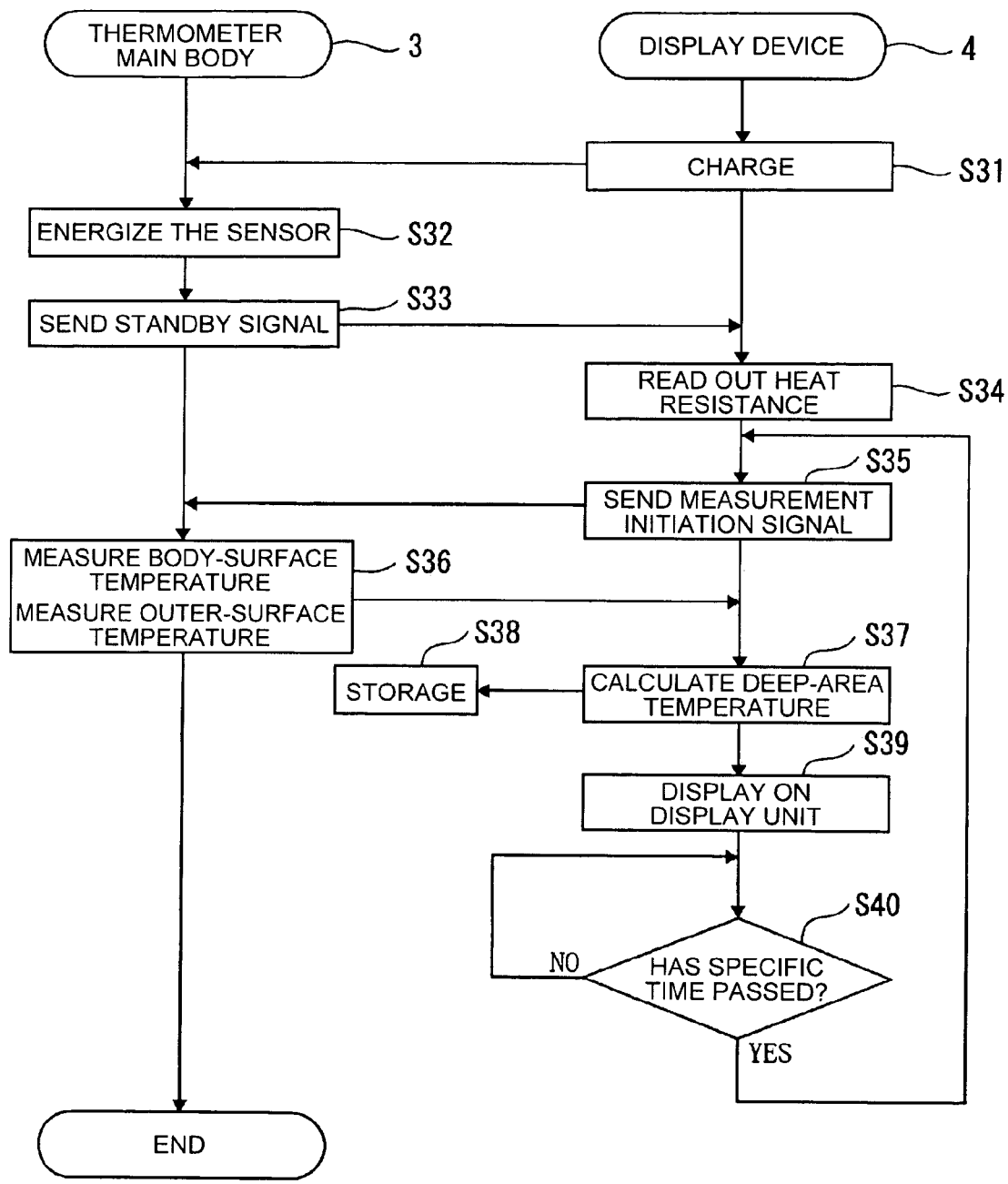
FIG. 21 is a view of a flowchart depicting another operation of the thermometer of the sixth embodiment.

FIG. 21 is a flowchart showing the operation of the thermometer 1. In FIG. 21, when the body temperature of the human body 2 is measured by the thermometer 1, similar to step S11 previously described, the thermometer main body 3 is first charged through electromagnetic induction in the antenna coil 36 by radio waves from the antenna coil 46 of the display device 4 (step S31). When the sensors 31 and 33 of the thermometer main body 3 are energized (step S32), the thermometer main body 3 sends a standby signal to the display device 4 (step S33). The display device 4 thereby determines whether the thermometer main body 3 has completed preparations to measure the body temperature, and reads out the surface-layer heat resistance $R_s+R_t$ of the human body 2 from the storage unit 45 (step S34). A body temperature measurement initiation signal is then sent to the thermometer main body 3 via the transceiver device 41 (step S35).

The thermometer main body 3 receives the measurement initiation signal from the display device 4, and initiates measurement of the body-surface temperature $T_{b1}$ of the body surface 2A with the body-surface sensor 31, and measurement of the outer-surface temperature $T_{b2}$ with the outer surface sensor 33 (step S36, temperature measurement step). The temperature values $T_{b1}$ and $T_{b2}$ determined by the body-surface sensor 31 are converted to digital signals by the A/D converter 34 and are then sent to the display device 4 by the transceiver device 35.

In order for the control device 44 to calculate the body temperature of a deep area by using the temperature information from the body-surface sensor 31 and outer surface sensor 33, the "body temperature measurement mode" must be selected with the aforementioned selection device.

The deep-area temperature calculating device 441 of the control device 44 calculates the temperature $T_{core}$ of the deep area with the aforementioned formula shown in the present embodiment from the body-surface temperature $T_{b1}$ and the outer-surface temperature $T_{b2}$ sent from the thermometer main body 3 (step S37, deep area temperature calculation step). The control device 44 stores the temperature $T_{core}$ in the storage unit 45 (step S38), and displays the temperature $T_{core}$ on the display unit 42 (step S39). The operator 5 can confirm the temperature $T_{core}$ on the display unit 42 of the wristwatch-type display device 4 while holding the infant.

The control device 44 counts the passage of time after the body-surface temperature $T_{b1}$ is measured with an internal timer, and observes whether a specific time has passed (step S40). If the elapsed time is equal to or greater than the specific time, the process returns to step S35, the control device 44 sends a measurement initiation signal to the thermometer main body 3, and the body-surface temperature $T_{b1}$ and outer-surface temperature $T_{b2}$ are measured.

Thus, the body-surface temperature $T_{b1}$ and the outer-surface temperature $T_{b2}$ are measured, and the temperature $T_{core}$ of the deep area is calculated and stored in the storage unit 45 at specific time intervals.

Since the surface-layer heat resistance $R_s+R_t$ changes only slightly except, for example, in special circumstances such as a sudden change in the type of human body 2, the heat flux $Q_{s+r}$ may be calculated by the heat flux calculating device 444 and the surface-layer heat resistance $R_s+R_t$ may be calculated by the heat resistance calculating device 443 the first time body temperature measurement is begun. When there is a change in the heat transfer characteristics of the human body 2, such as a sudden change in body type, the temperature data $T_{0,core}$ of the deep area may be acquired again, and the body-surface temperature $T_{b1}$ and outer-surface temperature $T_{b2}$ may be measured to calculate the heat flux $Q_{s+r}$ and the surface-layer heat resistance $R_s+R_t$.

Also, since there is little variation in the surface-layer heat resistance $R_s+R_t$ particular to the human body 2, when the thermometer 1 is used again, the surface-layer heat resistance $R_s+R_t$ previously calculated can be used, and therefore the time until body temperature measurement initiation is started can be shortened for the second and subsequent measurements. In this case, if the surface-layer heat resistances $R_s+R_t$ for multiple human bodies 2 are stored in the storage unit 45, the surface-layer heat resistances $R_s+R_t$ previously calculated can be read out and used again by operating the operating unit 43. In this case, an organism selection may be made to specify the human body 2 with the aid of the operating unit 43 whenever the body temperature measurement step is performed.

According to the sixth embodiment, the following effects are achieved in addition to the effects (3) and (5) in the first embodiment.

(13) Since the heat resistance calculating device 443 calculates the surface-layer heat resistance $R_s+R_t$ on the basis of the for-calculation body-surface temperature $T_{0,b1}$ of the human body 2, the for-calculation outer-surface temperature $T_{0,b2}$, the known heat resistance $R_{u0}$ of the thermal insulating material 37, and the for-calculation deep area body temperature $T_{0,core}$, a surface-layer heat resistance $R_s+R_t$ corresponding to the heat transfer characteristics of the human body 2 can be obtained. Since the deep-area temperature calculating device 441 calculates the temperature $T_{core}$ of the deep area on the basis of the surface-layer heat resistance $R_s+R_t$, the body temperature $T_{core}$ of the deep area can be accurately calculated according to the heat transfer characteristics of the human body 2 without being affected by the differences in the type of human body 2 or the like.

Also, since the heat resistance calculating device 443 calculates the heat resistance $R_s+R_t$ of the human body 2 by utilizing the fact that the heat flux from a deep area of the human body 2 to the outside air is constant, the configuration of the thermometer 1 can be simplified because there is no need for a heater or other such heating device to be used to cancel out the heat flow as in a conventional thermometer. Size reduction in the thermometer 1 can thereby be further facilitated. Since there is no need for a conventional heating device, reduced power consumption in the thermometer 1 can be facilitated, and the safety and handling of the thermometer 1 can be improved because the thermometer 1 can be safely attached to the body surface 2A for a long period of time.

(14) Since the thermometer main body 3 and the display device 4 are configured separately and are configured to be capable of communicating through the transceiver devices 35 and 41, the number of components installed in the thermometer main body 3 that comes into contact with the human body 2 can be reduced to a minimum, and weight and size reduction of the thermometer main body 3 can be facilitated. Consequently, it is not a burden to leave the thermometer main body 3 attached for a long period of time, and the portability of the thermometer main body 3 can therefore be improved. The weight and size reduction of the thermometer main body 3 can also be further facilitated by providing the display device 4 with the control device 44 having a heat resistance calculating device 443 and a deep-area temperature calculating device 441.

Since the transceiver devices 35 and 41 are configured for wireless communication through the antenna coils 36 and 46, there is no hindrance with wires, and the handling of the thermometer 1 can be improved.

Furthermore, since the display device 4 is formed in wristwatch-style, the operator 5 can view the display unit 42 while worn on the wrist. Therefore, the operability of the thermometer 1 can be improved because the body temperature display can be confirmed while holding the infant whose body temperature is to be measured, as in the present embodiment.

(15) Since the surface-layer heat resistance $R_s+R_t$ is stored in the storage unit 45, the stored surface-layer heat resistance $R_s+R_t$ can be read out and used in the body temperature measuring step. Therefore, there is no need to perform continuously the body temperature measurement preparatory step and the body temperature measuring step, and the surface-layer heat resistance $R_s+R_t$ can be calculated in advance. As a result, the handling of the thermometer 1 can be improved and the measuring time in the body temperature measuring step can be shortened. Also, since the storage unit 45 can store the surface-layer heat resistance $R_s+R_t$ of multiple human bodies 2, the thermometer 1 can be used alternately among multiple people, and the convenience of the thermometer 1 can be improved.

Seventh Embodiment

Figure 22:
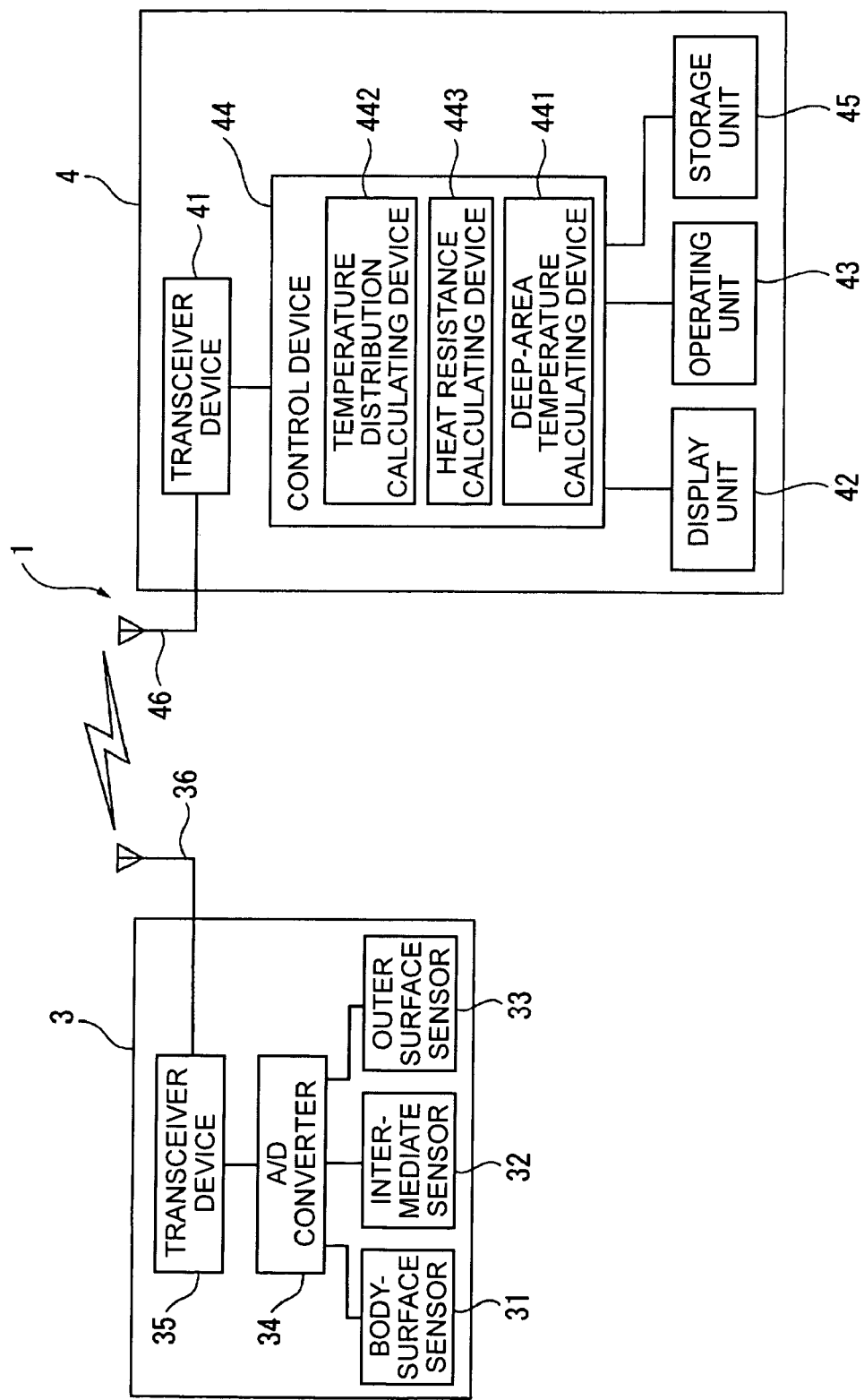
FIG. 22 is a view of a block diagram showing a thermometer according to a seventh preferred embodiment of the present invention.

FIG. 22 shows a block diagram of the thermometer 1 according to the present embodiment. This thermometer 1 includes a thermometer main body 3 as a temperature measuring device that comes into contact with a body surface on the human body 2 (see FIG. 23) as the organism, and a display device 4 provided separately from the thermometer main body 3.

Figure 23:
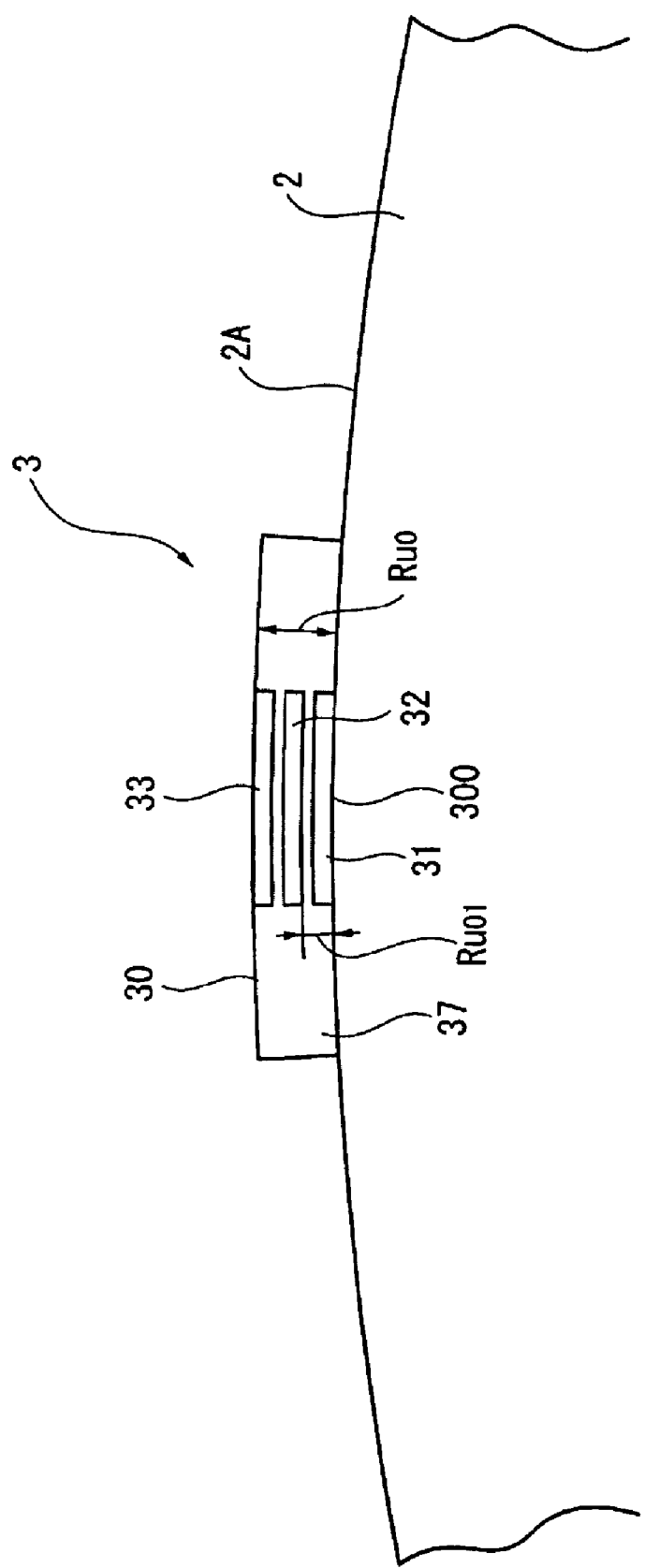
FIG. 23 is a view of a diagram showing a main body of the thermometer of the seventh embodiment.
Figure 24:
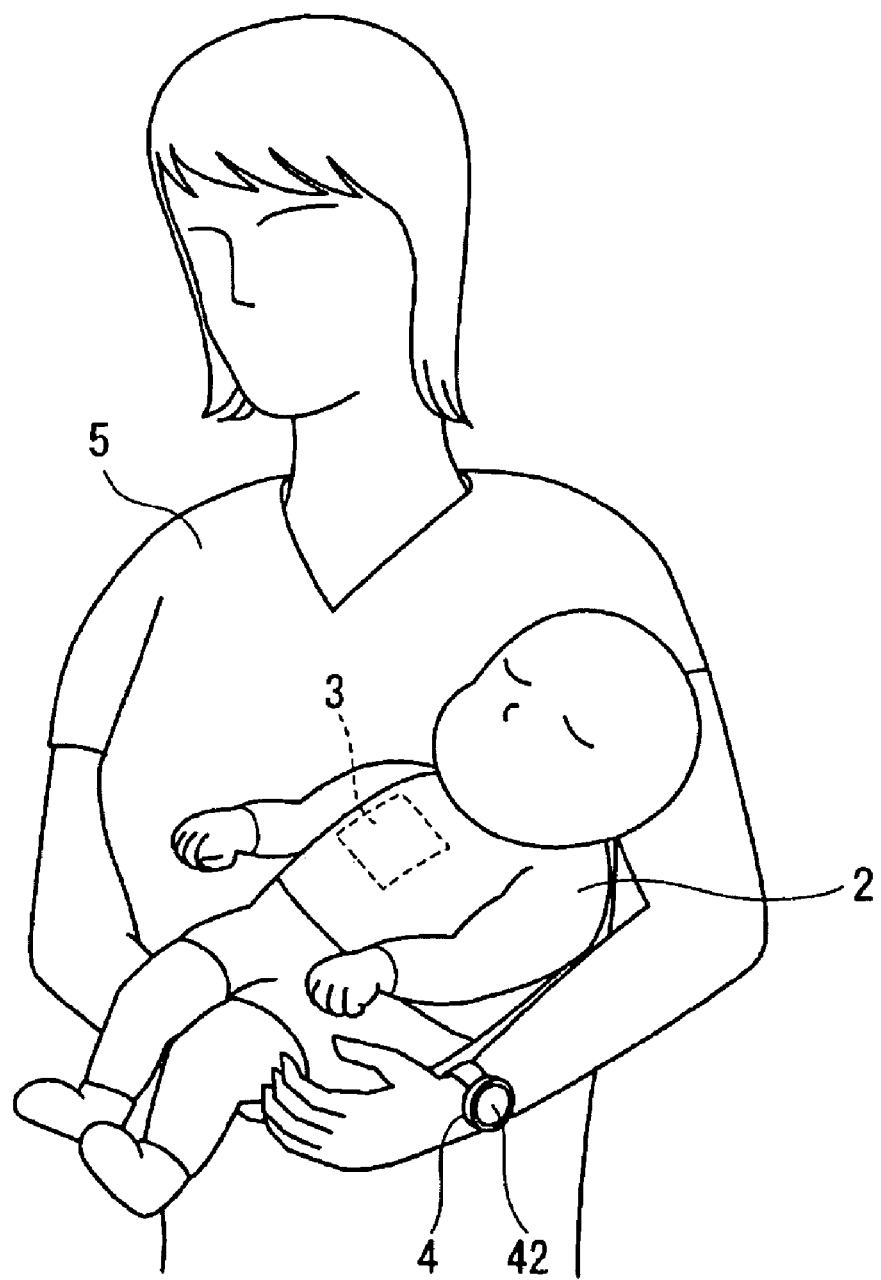
FIG. 24 is a view of a diagram showing the main body and a display device of the thermometer of the seventh embodiment.

FIG. 23 shows a diagram of the thermometer main body 3 mounted on the human body 2, and FIG. 24 shows a drawing of the thermometer main body 3 and the display device 4 in the mounted state.

First, as shown in FIG. 23, the thermometer main body 3 includes a body-surface sensor 31, an outer surface sensor 33, and an intermediate sensor 32. The body-surface sensor 31 is a base temperature measuring unit having a contact surface 300 that comes into contact with the body surface 2A of the human body 2 to determine the temperature of the body surface 2A. The outer surface sensor 33 is a measuring unit that has an outer surface 30 exposed to the air outside of the thermometer main body 3 and that determines the temperature of the outer surface 30. The intermediate sensor 32 is a measuring unit disposed at an intermediate position between the body-surface sensor 31 and the outer surface sensor 33. The body-surface sensor 31, the intermediate sensor 32, and the outer surface sensor 33 are mounted and fixed in place on or in an thermal insulating material 37. This thermometer main body 3 is capable of being attached to the human body 2 along the surface on the side of the body-surface sensor 31 with an adhesive or the like, and the thermometer main body 3 is configured so that it can be attached with an adequate amount of contact pressure to the body surface 2A with this adhesive.

It is preferable that the attachment position of the thermometer main body 3 be disposed on the forehead, the back of the neck, the chest, the back or another such location where the skin temperature of the human body is not susceptible to the effects of the outside air, and where the body-surface temperature can be measured in a relatively stable manner. In the present embodiment, the thermometer main body 3 is attached to the chest of an infant (human body) 2.

Also, the thermal insulating material 37 is preferably large enough so that the heat flux from the deep area of the human body 2 through the body surface 2A and the thermal insulating material 37 to the outer surface 30 is stable and not susceptible to the effects of the external environment when the thermometer main body 3 is attached to the body surface 2A. For example, one possibility is for the thermal insulating material 37 to be formed into a substantially rectangular shape with length and width dimensions of 10 cm or greater.

The heat resistance $R_{u0}$ of the thermal insulating material 37 is set to a specific value by selecting an appropriate material, and therefore the heat resistance from the contact surface 300 to the outer surface sensor 33 is substantially equal to the heat resistance of the thermal insulating material 37 and assumes the value of heat resistance $R_{u0}$. Also, the heat resistance from the contact surface 300 to the intermediate sensor 32 is a specific value that can be set depending on the distance from the contact surface 300 to the position where the intermediate sensor 32 is provided, and is set to heat resistance $R_{u01}$ in the present embodiment.

The body-surface sensor 31, the outer surface sensor 33, and the intermediate sensor 32 can be the sensors to convert temperature to resistance, or the sensors for converting temperature to voltage shown in the first embodiment.

The thermometer main body 3 also includes an A/D converter 34 and a transceiver device 35 as shown in FIG. 22, in addition to the body-surface sensor 31, the outer surface sensor 33, and the intermediate sensor 32.

The A/D converter 34 converts the analog signals of heat resistance or voltage converted by the body-surface sensor 31, the outer surface sensor 33, and the intermediate sensor 32 into digital signals, and outputs the digital signals to the transceiver device 35. Alternatively, an RF encoder that utilizes CR oscillation may be used instead of the A/D converter 34.

The transceiver device 35 includes an antenna coil 36 and sends the signals of temperature (resistance and voltage) converted to digital signals by the A/D converter 34 to the display device 4 by radio waves.

The display device 4 is configured to be portable in a wristwatch style, and is designed to be attached by the operator 5 holding the infant on whom the thermometer main body 3 is to be attached, as shown in FIG. 24. The display device 4 includes a transceiver device 41 to exchange signals with the thermometer main body 3, a display unit 42 to display the results of measuring body temperature, an operating unit 43 to operate the display device 4 from the exterior, a control device 44 to control the operation of the display device 4, and a storage unit (storage device) 45 to store information obtained from the transceiver device 41 and the control device 44, as shown in FIG. 22.

The transceiver device 41 is similar to the device in the sixth embodiment, and descriptions thereof are therefore omitted. Also, the display unit 42 and the operating unit 43 are similar to those in the first embodiment, and descriptions thereof are omitted.

The control device 44 includes a temperature distribution calculating device 442, a heat resistance calculating device 443, and a deep-area temperature calculating device 441. The temperature distribution calculating device 442 calculates the relationship between heat resistance and temperature as a temperature distribution on the basis of the body-surface temperature from the body-surface sensor 31, the intermediate temperature from the intermediate sensor 32, and the outer-surface temperature from the outer surface sensor 33. The heat resistance calculating device 443 calculates the surface-layer heat resistance from the deep area of the human body 2 to the body surface 2A by using the body-surface temperature, the intermediate temperature, the outer-surface temperature, and the for-calculation deep-area temperature measured by a known thermometer. The deep-area temperature calculating device 441 calculates the temperature of a deep area in the human body 2 using the surface-layer heat resistance calculated by the heat resistance calculating device 443.

Figure 25:
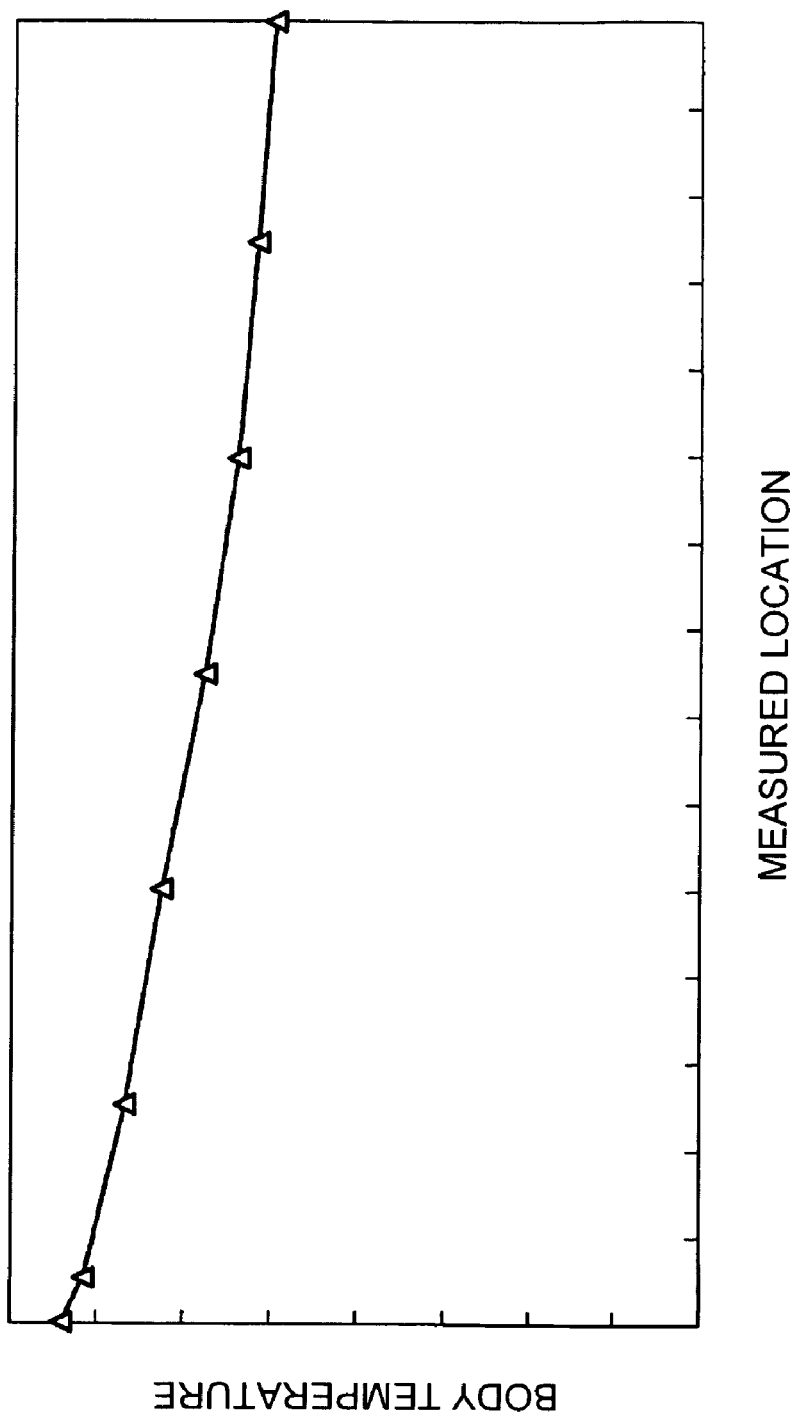
FIG. 25 is a view of a diagram showing the results of simulating the temperature distribution of the body temperature in the seventh embodiment.

FIG. 25 shows the results of simulating the temperature distribution of the body temperature in relation to the distance from the deep area of the human body 2 to the body surface 2A. As shown in FIG. 25, the change in temperature in relation to the distance from the deep area is more curved than linear. This is thought to be because the movement of heat from the deep area is actually three-dimensional due to moving in directions running along the body surface, and not one-dimensional from the deep area toward the body surface, and because of other reasons.

Figure 26:
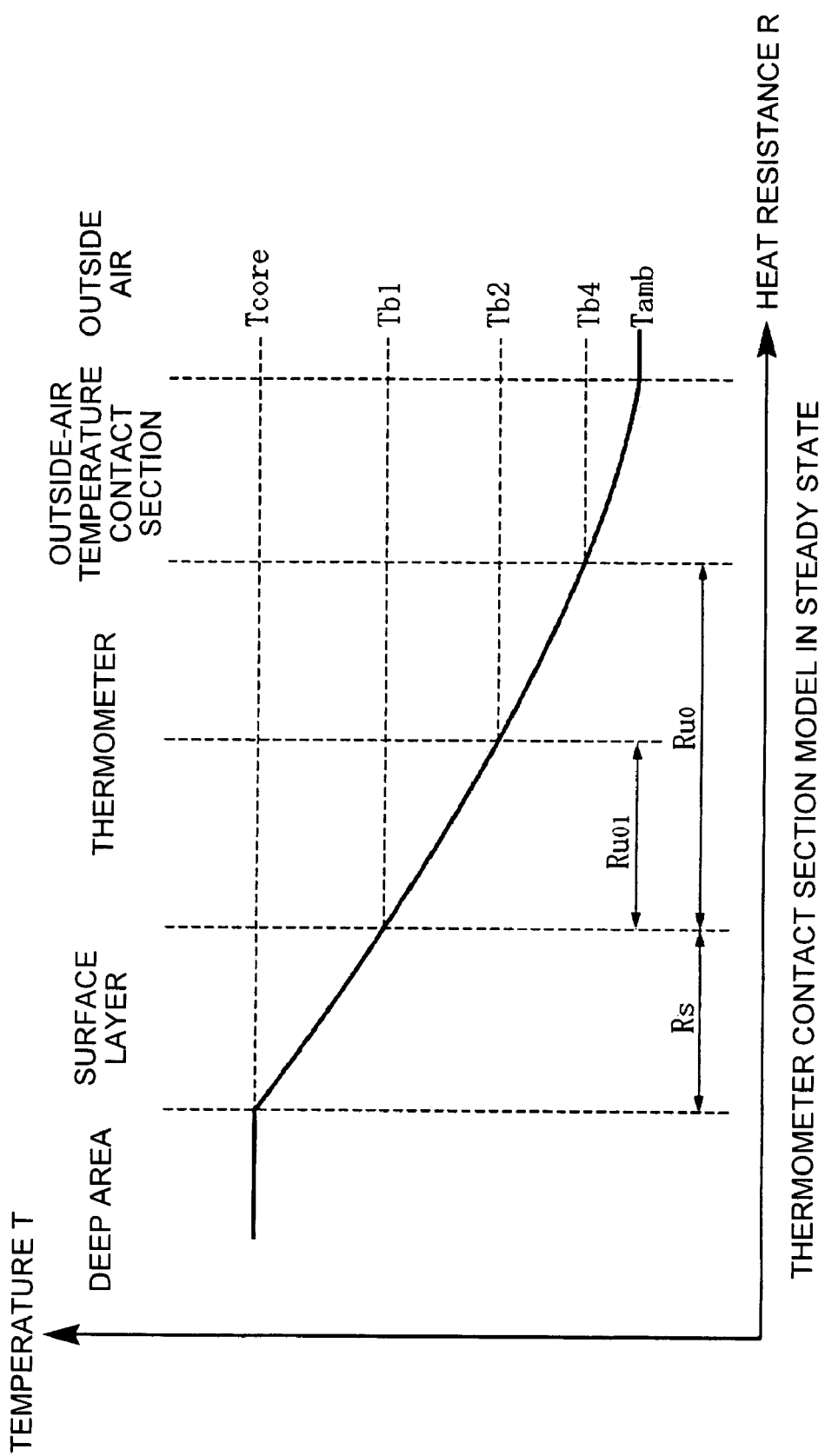
FIG. 26 is a view of a diagram showing a temperature distribution model of the thermometer and an organism of the seventh embodiment.

FIG. 26 shows a model of the temperature distribution from a deep area of the human body 2 through the body surface 2A and the thermometer main body 3 to the outside air. In FIG. 26, the horizontal axis is heat resistance, and the vertical axis is temperature (body temperature). As shown in FIG. 26, in the model of temperature transmission from the deep area of the human body 2 to the outside air, the temperature $T_{core}$ of the deep area of the human body 2 is substantially constant. In the surface layer farther out than the deep area, the body temperature drops due to the effects of the heat resistance of the skin and the outside-air temperature. Though not illustrated, microscopic gaps form between the body surface 2A and the thermometer main body 3, and the temperature therefore decreases in the contact heat resistant area due to heat radiation in these gaps. When the temperature of the body surface 2A is actually measured by the thermometer main body 3, the temperature $T_{b1}$ that has decreased due to this contact heat resistant area is measured as a result.

Since heat resistance exists in the thermometer main body 3 as such, a reduction in temperature also occurs in the thermometer main body 3, and temperature $T_{b2}$ is established on the outer surface 30 of the thermometer main body 3. Also, the temperature $T_{b2}$ is measured at the position of the intermediate sensor 32, and the temperature $T_{b4}$ is measured by the outer surface sensor 33. Furthermore, the temperature decreases because heat is radiated in the outside-air temperature contact section between the outer surface 30 of the thermometer main body 3 and the outside air, and the temperature ultimately reaches the outside-air temperature $T_{amb}$.

As shown in FIG. 25 above, the movement of heat from a deep area of the human body 2 to the body surface 2A is not one-dimensional, and the relationship between heat resistance and temperature in FIG. 26 is also curved.

The temperature distribution calculating device 442 determines the relationship between heat resistance R and temperature T as the temperature distribution T(R) in the human body 2 by curved approximation from the body-surface temperature $T_{b1}$ measured by the body-surface sensor 31, the intermediate temperature $T_{b2}$ measured by the intermediate sensor 32, and the outer-surface temperature $T_{b4}$ measured by the outer surface sensor 33.

Specifically, the temperature distribution T(R) is expressed by Eq. (14) below as a polynomial approximation formula for the heat resistance R.

$$\frac{1}{T(R)} = a + b \cdot \ln(R) + c \cdot \ln(R)^2 \tag{14}$$

The temperature distribution calculating device 442 determines the constants a, b, and c from a formula obtained by inputting the body-surface temperature $T_{b1}$ at the heat resistance (R=0) of the body surface 2A to Eq. (14), a formula obtained by inputting the intermediate temperature $T_{b2}$ at the heat resistance (R=$R_{u01}$) of the position of the intermediate sensor 32, and a formula obtained by inputting the outer-surface temperature $T_{b4}$ at the heat resistance (R=$R_{u0}$) of the outer surface 30; and determines the relationship (temperature distribution) T(R) of temperature T to heat resistance R.

The heat resistance calculating device 443 determines surface-layer heat resistance $R_s$ of the area that extends from the deep area all the way to the body surface 2A from the for-calculation body-surface temperature $T_{0,b1}$, the for-calculation intermediate temperature $T_{0,b2}$, and the for-calculation outer-surface temperature $T_{0,b4}$ measured to determine the surface-layer heat resistance $R_s$, by using the temperature distribution $T_0(R)$ to calculate the heat resistance calculated by the temperature distribution calculating device 442, and substituting the for-calculation deep area body temperature $T_{0,core}$ of the deep area of the human body 2 for calculating heat resistance into the temperature distribution $T_0(R)$.

When the body temperature of the human body 2 is actually measured, the deep-area temperature calculating device 441 calculates the temperature $T_{core}$ of the deep area by using the surface-layer heat resistance $R_s$ calculated by the heat resistance calculating device 443 and substituting the surface-layer heat resistance $R_s$ into the temperature distribution T(R) determined by the temperature distribution calculating device 442.

The body-surface temperature $T_{b1}$, the intermediate temperature $T_{b2}$, and the outer-surface temperature $T_{b4}$ sent from the thermometer main body 3 are stored in the storage unit 45. Also stored are the surface-layer heat resistance $R_s$ from the deep area of the human body 2 to the body surface 2A calculated by the heat resistance calculating device 443, and the temperature $T_{core}$ of the deep area of the human body 2 calculated by the deep-area temperature calculating device 441.

The storage unit 45 is configured to be capable of storing temperature information about multiple human bodies 2, and the surface-layer heat resistance $R_s$ and temperature $T_{core}$ of the deep area are stored for each human body 2. The storage unit 45 is also capable of storing the measurement positions of the for-calculation body-surface temperature $T_{0,b1}$, the for-calculation intermediate temperature $T_{0,b2}$, and the for-calculation outer-surface temperature $T_{0,b4}$ whenever the surface-layer heat resistance $R_s$ is calculated. In addition to the aforementioned temperature information, the storage unit 45 may also be made to store the name of the person to be measured (human body 2, infant), his or her age, the date of the measurement, and other such measurement information, for example. In this case, this measurement information may be input from the operating unit 43.

The thermometer 1 operates in the following manner.

Figure 27:
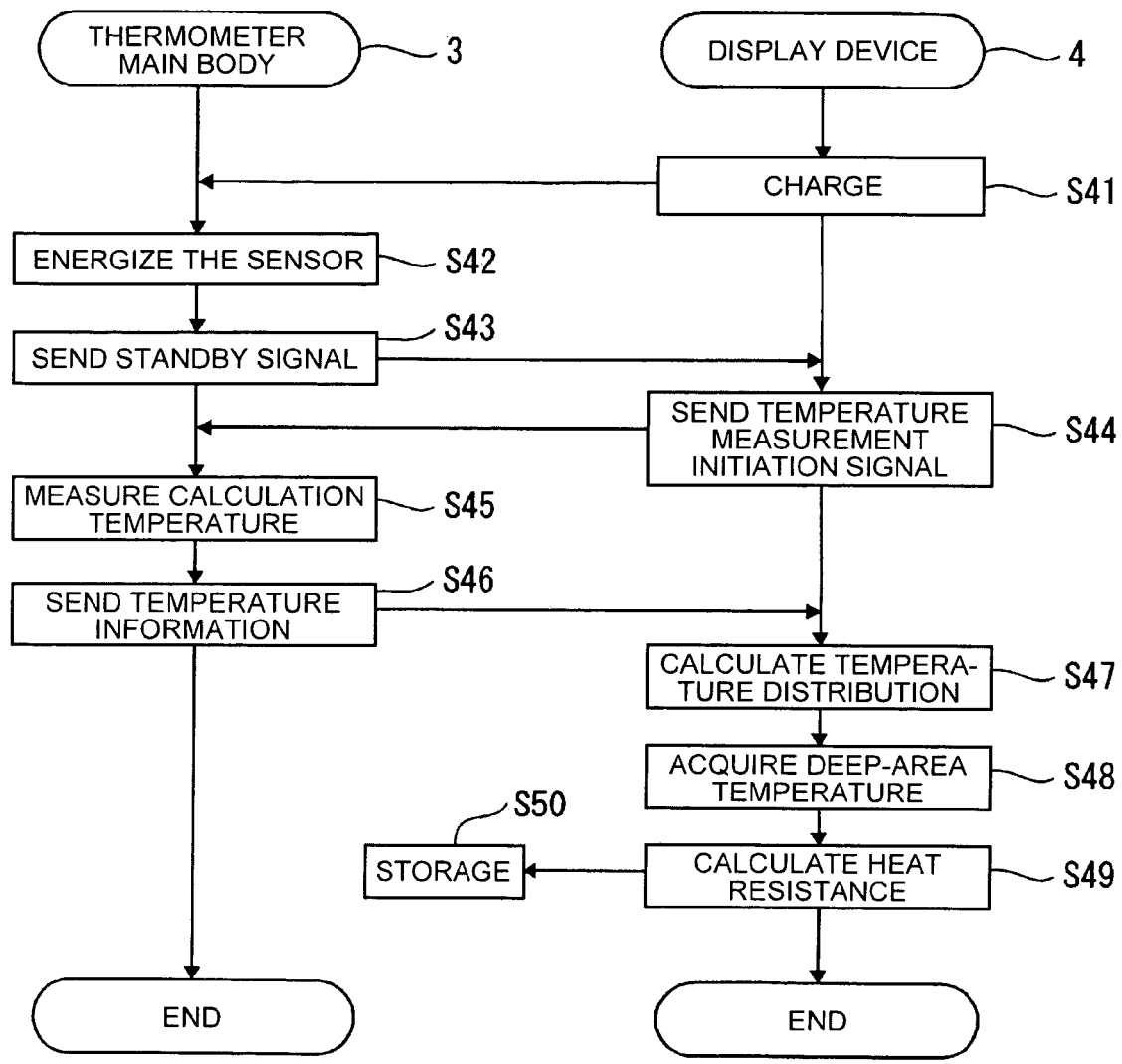
FIG. 27 is a view of a flowchart depicting an operation of the thermometer of the seventh embodiment.

FIG. 27 shows a flowchart depicting the operation of the thermometer 1 in the present embodiment. As shown in FIG. 27, when the body temperature of the human body 2 is measured with the thermometer 1, a body temperature measuring preparatory step is first performed so that the surface-layer heat resistance $R_s$ from the deep area in the human body 2 to the body surface 2A is calculated.

The thermometer main body 3 is attached to the human body 2 (the forehead of the infant in the present embodiment), and the operator 5 of the thermometer 1 who is holding the infant attaches the display device 4 to the arm. When the operator 5 turns on the switch of the display device 4 by operating the operating unit 43 of the display device 4, the transceiver device 41 sends radio waves to the thermometer main body 3. The thermometer main body 3 is charged by creating electromotive force in the antenna coil 36 with the electromagnetic induction caused by these radio waves (step S41). The thermometer main body 3 is energized by this electromotive force (step S42), and the body-surface sensor 31, intermediate sensor 32, and outer surface sensor 33 are also energized. When these sensors 31, 32, and 33 are energized, the thermometer main body 3 sends a standby signal to the display device 4 from the transceiver device 35 (step S43).

When the control device 44 of the display device 4 receives this standby signal, a temperature measurement command signal is sent from the transceiver device 41 (step S44). The thermometer main body 3 receives this temperature measurement command signal; operates the body-surface sensor 31, the intermediate sensor 32, and the outer surface sensor 33; and measures the for-calculation temperature of the surface-layer heat resistance $R_s$, the for-calculation body-surface temperature $T_{0,b1}$ of the body surface 2A, the for-calculation intermediate temperature $T_{0,b2}$ of the thermal insulating material 37, and the for-calculation outer-surface temperature $T_{0,b4}$ of the outer surface 30 (step S45, heat resistance calculation temperature measuring step). The temperature information about the for-calculation body-surface temperature $T_{0,b1}$, the for-calculation intermediate temperature $T_{0,b2}$, and the for-calculation outer-surface temperature $T_{0,b4}$ is converted from analog signals to digital signals by the A/D converter 34, and is sent to the display device 4 by the transceiver device 35 (step S46). The for-calculation body-surface temperature $T_{0,b1}$, the for-calculation intermediate temperature $T_{0,b2}$, and the for-calculation outer-surface temperature $T_{0,b4}$ are preferably measured after a specific time has passed so that the transfer of heat from the deep area of the human body 2 to the body surface 2A reaches a steady state.

It is necessary to determine whether the control device 44 calculates the surface-layer heat resistance $R_s$ or the temperature $T_{core}$ of the deep area using the temperature information obtained from the body-surface sensor 31, the intermediate sensor 32, and the outer surface sensor 33. Therefore, the control device 44 is provided with a selection device (not shown). This selection device displays a selection screen on the display unit 42, for example, to select either a "body temperature measurement preparation mode" or a "body temperature measurement mode," and may be configured so that the operator 5 can select either of the modes by operating the operating unit 43. The operator 5 herein selects the body temperature measurement preparatory mode and instructs the control device 44 to calculate the surface-layer heat resistance $R_s$ using the temperature information.

The control device 44 of the display device 4 calculates the temperature distribution $T_0(R)$ by determining the constants a, b, and c with the aid of the temperature distribution calculating device 442 on the basis of the for-calculation body-surface temperature $T_{0,b1}$, the for-calculation intermediate temperature $T_{0,b2}$, and the for-calculation outer-surface temperature $T_{0,b4}$ sent from the thermometer main body 3 (step S47, temperature distribution calculating step).

Next, the display device 4 displays a screen to request input of the for-calculation deep area body temperature $T_{0,core}$, which is the temperature of the deep area to calculate the heat resistance, on the display unit 42. The operator 5 inputs the measured for-calculation deep area body temperature $T_{0,core}$ by operating the operating unit 43. The display device 4 thereby acquires the for-calculation deep area body temperature $T_{0,core}$ (step S48). The for-calculation deep area body temperature $T_{0,core}$ may be measured with a known thermometer that measures underarm temperature, oral temperature, or the like, and the for-calculation body-surface temperature $T_{0,b1}$, the for-calculation intermediate temperature $T_{0,b2}$, and the for-calculation outer-surface temperature $T_{0,b4}$ must be measured at substantially the same time.

The heat resistance calculating device 443 of the control device 44 calculates the surface-layer heat resistance $R_s$ from the deep area of the human body 2 to the body surface 2A by substituting the acquired for-calculation deep area body temperature $T_{0,core}$ into the temperature distribution $T_0(R)$ calculated by the temperature distribution calculating device 442 (step S49, heat resistance calculating step). The control device 44 stores the calculated surface-layer heat resistance $R_s$ in the storage unit 45 (step S50), and completes body temperature measurement preparation.

Figure 28:
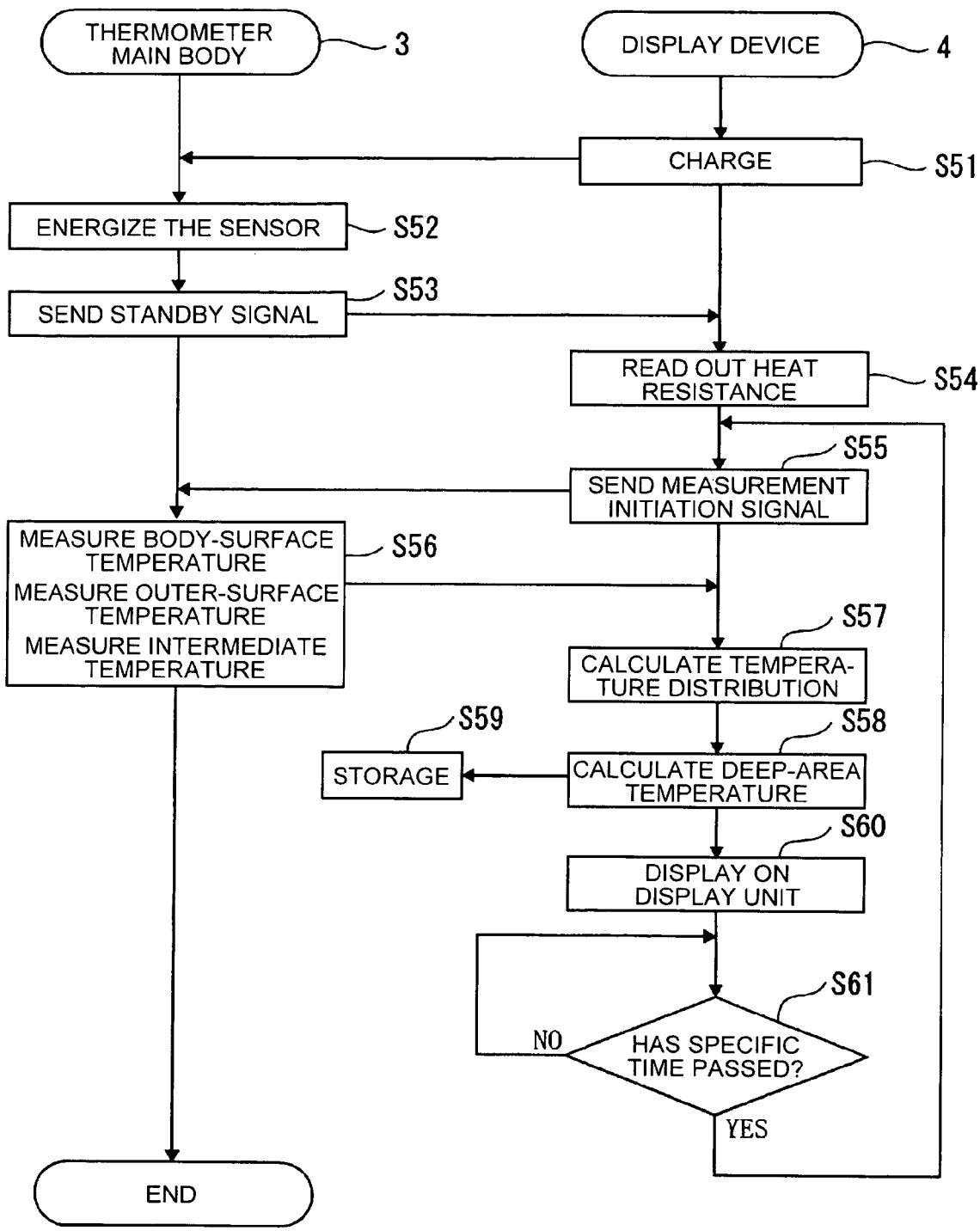
FIG. 28 is a view of a flowchart depicting another operation of the thermometer of the seventh embodiment.

Next, the operation of the thermometer 1 in the body temperature measurement step will be described for a case in which the body temperature of the human body 2 is actually measured in a continuous manner. FIG. 28 is a flowchart showing the operation of the thermometer 1. In FIG. 28, when the body temperature of the human body 2 is measured by the thermometer 1, first, similar to the previously described step S41, the thermometer main body 3 is charged through electromagnetic induction in the antenna coil 36 by radio waves from the antenna coil 46 of the display device 4 (step S51). When the sensors 31, 32, and 33 of the thermometer main body 3 are energized (step S52), the thermometer main body 3 sends a standby signal to the display device 4 (step S53). The display device 4 thereby determines whether the thermometer main body 3 has completed preparations to measure the body temperature, and reads out the surface-layer heat resistance $R_s$ of the human body 2 from the storage unit 45 (step S54). A body temperature measurement initiation signal is then sent to the thermometer main body 3 via the transceiver device 41 (step S55).

The thermometer main body 3 receives the measurement initiation signal from the display device 4, and initiates measurement of the body-surface temperature $T_{b1}$ of the body surface 2A with the body-surface sensor 31, measurement of the intermediate temperature $T_{b2}$ with the outer surface sensor 32, and measurement of the outer-surface temperature $T_{b4}$ with the outer surface sensor 33 (step S56, temperature measurement step). The temperature values $T_{b1}$, $T_{b2}$, and $T_{b4}$ determined by the sensors 31, 32, and 33 are converted to digital signals by the A/D converter 34 and are then sent to the display device 4 by the transceiver device 35.

In order for the control device 44 to calculate the body temperature of a deep area by using the temperature information from the body-surface sensor 31, the intermediate sensor 32, and the outer surface sensor 33, the "body temperature measurement mode" must be selected with the aforementioned selection device.

The temperature distribution calculating device 442 of the control device 44 calculates the temperature distribution T(R) from the body-surface temperature T, the intermediate temperature T, and the outer-surface temperature T sent from the thermometer main body 3 by the curve approximation of a polynomial approximation using Eq. (14) (step S57).

The deep-area temperature calculating device 441 of the control device 44 calculates the temperature $T_{core}$ of the deep area on the basis of the surface-layer heat resistance $R_s$ calculated by the heat resistance calculating device 443 and the temperature distribution T(R) calculated by the temperature distribution calculating device 442 (step S58, deep area temperature calculation step). The control device 44 stores the temperature $T_{core}$ in the storage unit 45 (step S59) and displays the temperature $T_{core}$ on the display unit 42 (step S60). The operator 5 can confirm the temperature $T_{core}$ on the display unit 42 of the wristwatch-type display device 4 while holding the infant.

The control device 44 counts the passage of time after the body-surface temperature $T_{b1}$, the intermediate temperature $T_{b2}$, and the outer-surface temperature $T_{b4}$ are measured with an internal timer, and observes whether a specific time has passed (step S61). If the elapsed time is equal to or greater than the specific time, the process returns to step S55, the control device 44 sends a measurement initiation signal to the thermometer main body 3, and the body-surface temperature $T_{b1}$, intermediate temperature $T_{b2}$, and outer-surface temperature $T_{b4}$ are measured. Thus, the body-surface temperature $T_{b1}$, the intermediate temperature $T_{b2}$, and the outer-surface temperature $T_{b4}$ are measured, and the temperature $T_{core}$ of the deep area is calculated and stored in the storage unit 45 at specific time intervals.

Since the surface-layer heat resistance $R_s$ changes only slightly except, for example, in special circumstances such as a sudden change in the type of human body 2, the temperature distribution $T_0(R)$ may be calculated by the temperature distribution calculating device 442 when the surface-layer heat resistance $R_s$ is calculated, and the surface-layer heat resistance $R_s$ may be calculated by the heat resistance calculating device 443 the first time body temperature measurement is begun. When there is a change in the heat transfer characteristics of the human body 2, such as a sudden change in body type, the temperature data $T_{0,core}$ of the deep area may be acquired again, and the for-calculation body-surface temperature $T_{0,b1}$, the for-calculation intermediate temperature $T_{0,b2}$, and the for-calculation outer-surface temperature $T_{0,b4}$ may be measured to calculate the temperature distribution T(R) and the surface-layer heat resistance $R_s$.

Also, since there is little variation in the surface-layer heat resistance $R_s$ particular to the human body 2, when the thermometer 1 is used again, the surface-layer heat resistance $R_s$ previously calculated can be used, and therefore the time until body temperature measurement initiation is started can be shortened for the second and subsequent measurements. In this case, if the surface-layer heat resistances $R_s$ for multiple human bodies 2 are stored in the storage unit 45, the surface-layer heat resistances $R_s$ previously calculated can be read out and used again by operating the operating unit 43. In this case, an organism selection may be made to specify the human body 2 with the aid of the operating unit 43 whenever the body temperature measurement step is performed.

According to the seventh embodiment, the following effects are achieved in addition to the effects (3), (4), and (5) in the first embodiment.

(16) Since the heat resistance calculating device 443 calculates the surface-layer heat resistance $R_s$ on the basis of the for-calculation deep area body temperature $T_{0,core}$ by using the temperature distribution T(R) from the deep area of the human body 2 to the body surface 2A, a surface-layer heat resistance $R_s$ corresponding to the heat transfer characteristics of the human body 2 can be obtained. Since the deep-area temperature calculating device 441 calculates the temperature $T_{core}$ of the deep area on the basis of the surface-layer heat resistance $R_s$, the body temperature $T_{core}$ of the deep area can be accurately calculated according to the heat transfer characteristics of the human body 2 without being affected by the differences in the type of human body 2 or the like.

Also, since the relationship between heat resistance and temperature from the deep area of the human body 2 to the outside air is calculated as the temperature distribution T(R), and the surface-layer heat resistance $R_s$ of the human body 2 is calculated using this temperature distribution T(R), the configuration of the thermometer 1 can be simplified because there is no need for a heater or other such heating device to be used for canceling out the heat flow as in a conventional thermometer. Size reduction in the thermometer 1 can thereby be further facilitated. Since there is no need for a conventional heating device, reduced power consumption in the thermometer 1 can be facilitated, and the safety and handling of the thermometer 1 can be improved because the thermometer 1 can be safely attached to the body surface 2A for a long period of time.

(17) Since the temperature is measured at three locations by the body-surface sensor 31, the intermediate sensor 32, and the outer surface sensor 33, and the temperature distribution T(R) is determined by curve approximation as a polynomial approximation formula, the actual movement of heat can be more accurately approximated than when the relationship between heat resistance and temperature is determined by linear approximation from two measured locations, for example. Therefore, the body temperature of the deep area of the human body 2 can be more accurately calculated. Since the temperature of the deep area of the human body 2 can be accurately calculated by measuring the temperature with the three sensors 31, 32, and 33 of the thermometer main body 3 attached to the body surface 2A of the human body 2, body temperature can be measured with a simple operation, and the handling of the thermometer 1 can be improved.

(18) Since the surface-layer heat resistance $R_s$ is stored in the storage unit 45, the stored surface-layer heat resistance $R_s$ can be read out in the body temperature measuring step. Therefore, there is no need to perform continuously the body temperature measurement preparatory step or the body temperature measurement step, and the surface-layer heat resistance $R_s$ can be calculated in advance. Therefore, the handling of the thermometer 1 can be improved, and the measuring time in the body temperature measurement step can be shortened. Also, the storage unit 45 can store the surface-layer heat resistances $R_s$ for multiple human bodies 2, the thermometer 1 can therefore be used alternately among multiple people, and the convenience of the thermometer 1 can be improved.

The present invention is not limited to the embodiments previously described, and the present invention includes modifications, improvements, and the like within a range in which the objectives of the present invention can be achieved.

Modification 1

In the first embodiment, the deep-area temperature calculating device is not limited to one that stores Eq. (6) as an arithmetic formula and calculates the temperature $T_{core}$ of the deep area directly from the first body-surface temperature $T_{b1}$, the first intermediate temperature $T_{b2}$, the second body-surface temperature $T_{b3}$, and the second intermediate temperature $T_{b4}$. For example, the device may be configured to determine the heat flux Q from the deep area of the human body to the outside air, and the heat resistance $R_s+R_t$ of the area that extends from the deep area of the human body to the body surface, and to calculate the temperature $T_{core}$ of the deep area using the heat flux Q and the heat resistance $R_s+R_t$.

Figure 29:
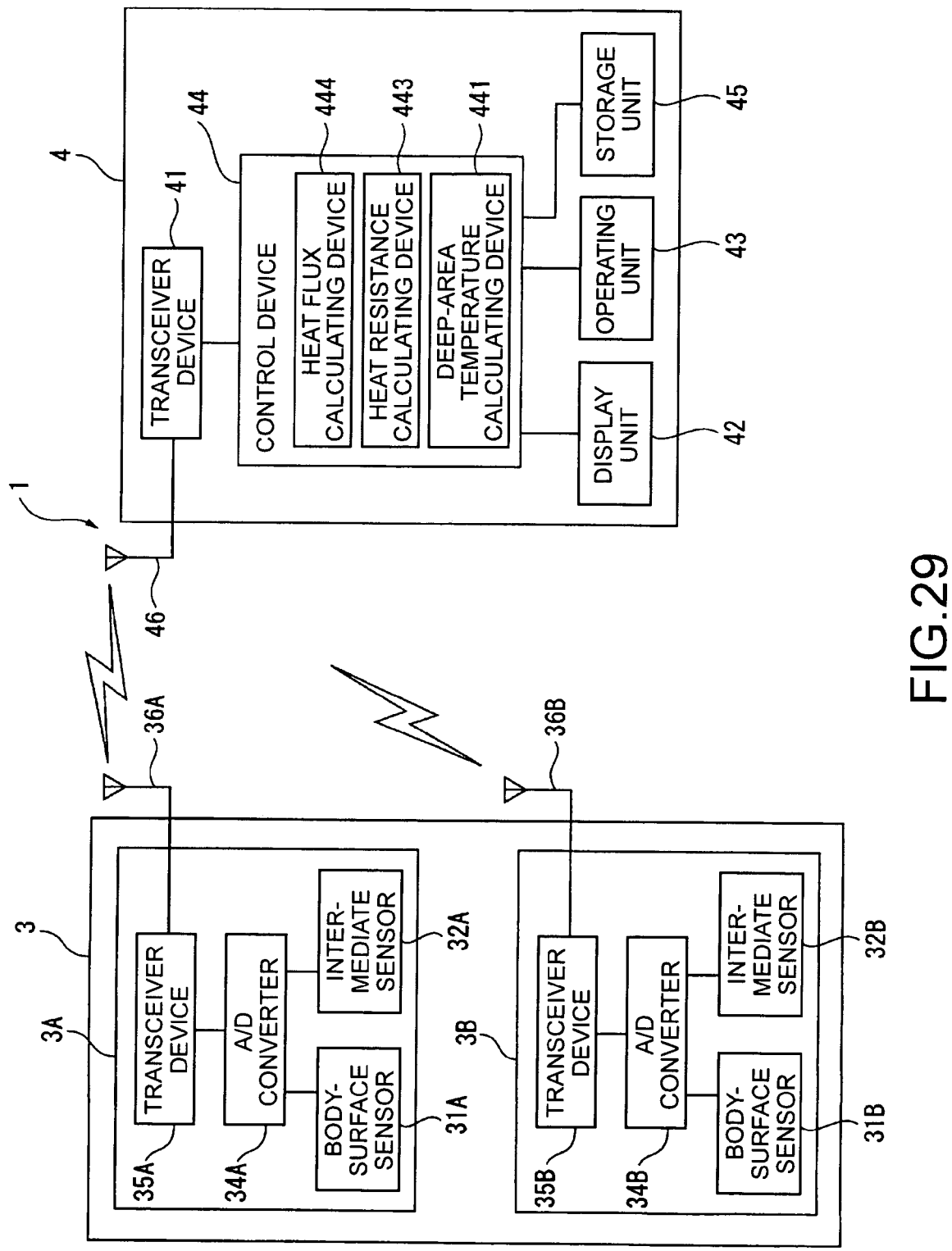
FIG. 29 is a view of a block diagram showing a thermometer according to a first modification.

FIG. 29 is a view of a block diagram showing a modification of the thermometer of the first embodiment of the present invention. As shown in FIG. 29, the control device 44, in addition to the deep-area temperature calculating device 441, also includes a heat flux calculating device 444 that calculates the heat fluxes $Q_{u1}$ and $Q_{u2}$ from the body surface 2A to the interfaces 301A and 301B on the basis of the body-surface temperature and the intermediate temperature, and a heat resistance calculating device 443 that calculates the surface-layer heat resistance $R_s+R_t$ of the area that extends from the deep area of the human body 2 to the body surface 2A on the basis of the heat fluxes $Q_{u1}$ and $Q_{u2}$ calculated by the heat flux calculating device 444. Also, the deep-area temperature calculating device 441 is configured to calculate the temperature $T_{core}$ of the deep area of the human body 2 on the basis of the heat resistance $R_s+R_t$ calculated by the heat resistance calculating device 443.

The heat flux calculating device 444 calculates heat fluxes $Q_{u1}$ and $Q_{u2}$ flowing between the body surface 2A and the interfaces 301A and 301B from the first body-surface temperature $T_{b1}$ and the second body-surface temperature $T_{b3}$ measured by the body-surface sensors 31A and 31B, and the first intermediate temperature $T_{b2}$ and the second intermediate temperature $T_{b4}$ measured by the intermediate sensors 32A and 32B.

Specifically, arithmetic formulas expressed by Eq. (1) above and Eq. (15) below are stored in the heat flux calculating device 444, and the heat fluxes $Q_{u1}$ and $Q_{u2}$ are calculated according to these arithmetic formulas.

$$Qu2 = \frac{Tb3 - Tb4}{Ru0} \quad (15)$$

From Eq. (4) and Eq. (5) of the first embodiment, the temperature $T_{core}$ of the deep area is expressed by Eq. (16) and Eq. (17) below.

$$T_{core}=Q_{u1}\cdot(R_s+R_t)+T_{b1} \quad (16)$$

$$T_{core}=Q_{u2}\cdot(R_s+R_t)+T_{b3} \quad (17)$$

The heat resistance $R_s+R_t$ in the area that extends from the deep area of the human body 2 to the body surface 2A is expressed by Eq. (18) below, from Eq. (16) and Eq. (17).

$$Rs + Rt = \frac{Tb3 - Tb1}{Qu1 - Qu2} \quad (18)$$

Therefore, Eq. (18) is stored in the heat resistance calculating device 443. Based on this arithmetic formula, the heat resistance calculating device 443 calculates the surface-layer heat resistance $R_s+R_t$ of the area that extends from the deep area of the human body 2 to the body surface 2A, using the determined heat fluxes $Q_{u1}$ and $Q_{u2}$.

Either Eq. (16) or Eq. (17) is stored in the deep-area temperature calculating device 441. When the temperature $T_{core}$ of the deep area of the human body 2 is actually calculated, the deep-area temperature calculating device 441 uses the surface-layer heat resistance $R_s+R_t$ calculated by the heat resistance calculating device 443 to calculate the temperature of the deep area from the body-surface temperature and the intermediate temperature used in the stored formula.

In other words, in cases in which, for example, Eq. (16) is stored in the deep-area temperature calculating device 441, the temperature $T_{core}$ of the deep area may be calculated using the heat resistance $R_{u0}$ as well as the first body-surface temperature $T_{b1}$ and the first intermediate temperature $T_{b2}$ obtained from the body-surface sensor 31A.

With such a structure of the control device 44, a surface-layer heat resistance $R_s+R_t$ corresponding to the heat transfer characteristics of the human body 2 can be obtained, and the temperature $T_{core}$ of the deep area can therefore be accurately calculated according to the heat transfer characteristics of the human body 2 without being affected by differences in the type of human body 2.

Since the surface-layer heat resistance $R_s+R_t$ changes only slightly except, for example, in special circumstances such as a sudden change in the type of human body 2, the heat flux $Q_{s+r}$ may be calculated by the heat flux calculating device 444 and the surface-layer heat resistance $R_s+R_t$ may be calculated by the heat resistance calculating device 443 the first time body temperature measurement is begun. In this case, for example, the calculated surface-layer heat resistance $R_s+R_t$ may be stored in the storage unit 45, and the surface-layer heat resistance $R_s+R_t$ may be read out from the storage unit 45 and used whenever the temperature of the deep area is calculated by the deep-area temperature calculating device 441 from the body-surface temperature and the intermediate temperature.

When there is a change in the heat transfer characteristics of the human body 2, such as a sudden change in the body type, the first body-surface temperature $T_{b1}$ and second body-surface temperature $T_{b3}$, as well as the first intermediate temperature $T_{b2}$ and second intermediate temperature $T_{b4}$ may be measured again by the body-surface sensors 31A and 31B and the intermediate sensors 32A and 32B to calculate the heat fluxes $Q_{u1}$ and $Q_{u2}$ and the surface-layer heat resistance $R_s+R_t$.

Also, since there is little variation in the surface-layer heat resistance $R_s+R_t$ particular to the human body 2, when the thermometer 1 is used again, the surface-layer heat resistance $R_s+R_t$ previously calculated can be used, and therefore the time until body temperature measurement initiation is started can be shortened for the second and subsequent measurements. In this case, if the surface-layer heat resistances $R_s+R_t$ for multiple human bodies 2 are stored in the storage unit 45, the surface-layer heat resistances $R_s+R_t$ previously calculated can be read out and used again by operating the operating unit 43. In this case, an organism selection may be made to specify the human body 2 with the aid of the operating unit 43 whenever the body temperature measurement step is performed.

The reference temperature measuring unit is not limited to a case in which the first reference temperature measuring unit and second reference temperature measuring unit constitute an intermediate temperature measuring device, and at least either of these may be configured as an intermediate temperature measuring device. Also, the reference temperature measuring unit is not limited to an intermediate temperature measuring device for measuring the intermediate temperature, and may be an outer-surface temperature measuring device for measuring the outer-surface temperature.

The body-surface temperature measuring devices and the reference temperature measuring units are not limited to two each, and three or more may be provided.

Modification 2

The deep-area temperature calculating device is not limited to one that stores Eq. (11) as an arithmetic formula in the manner adopted in the second embodiment and calculates the temperature $T_{core}$ of the deep area directly from the first body-surface temperature $T_{b1}$, the first outer-surface temperature $T_{b2}$, the second body-surface temperature $T_{b3}$, the second outer-surface temperature $T_{b4}$, and the ratio α between the first heat resistance $R_{u1}$ and the second heat resistance $R_{u2}$. For example, the device may be configured to determine the heat flux Q from the deep area of the human body to the outside air, and the heat resistance $R_s+R_t$ of the area that extends from the deep area of the human body to the body surface, and to calculate the temperature $T_{core}$ of the deep area using the heat flux Q and the heat resistance $R_s+R_t$.

Figure 30:
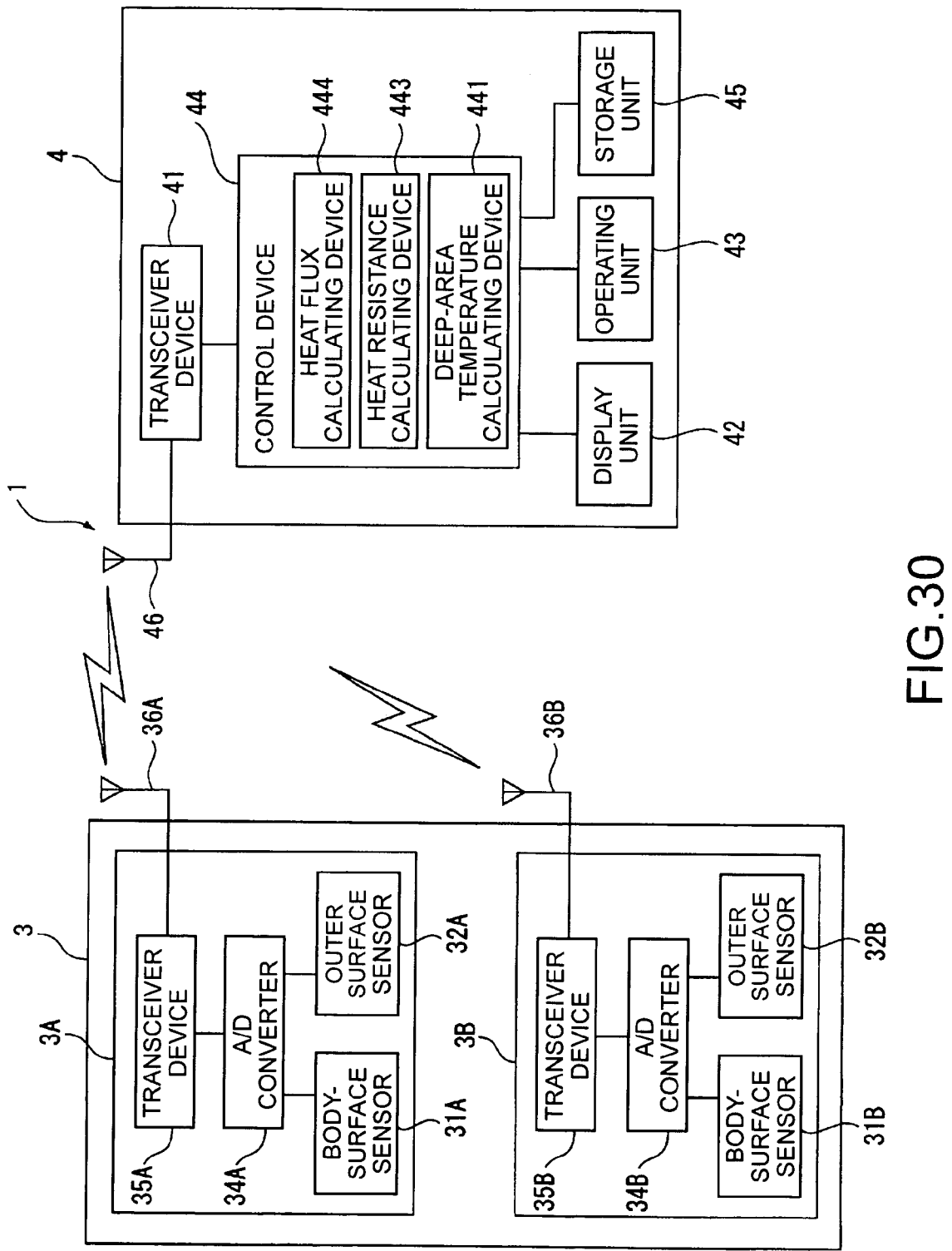
FIG. 30 is a view of a block diagram showing a thermometer according to a second modification.

FIG. 30 is a view of a block diagram of a modification of the thermometer of the present invention. As shown in FIG. 30, the control device 44, in addition to the deep-area temperature calculating device 441, also includes a heat flux calculating device 444 that calculates the heat fluxes $Q_{u1}$ and $Q_{u2}$ from the body surface 2A to the outer surfaces 302A and 302B on the basis of the body-surface temperature and the outer-surface temperature, and a heat resistance calculating device 443 that calculates the surface-layer heat resistance $R_s+R_t$ of the area that extends from the deep area of the human body 2 to the body surface 2A on the basis of the heat fluxes $Q_{u1}$ and $Q_{u2}$ calculated by the heat flux calculating device 444. Also, the deep-area temperature calculating device 441 is configured to calculate the temperature $T_{core}$ of the deep area of the human body 2 on the basis of the heat resistance $R_s+R_t$ calculated by the heat resistance calculating device 443.

The heat flux calculating device 444 calculates heat fluxes $Q_{u1}$ and $Q_{u2}$ flowing between the body surface 2A and the outer surfaces 302A and 302B, the calculation being based on the first body-surface temperature $T_{b1}$ and the second body-surface temperature $T_{b3}$ measured by the body-surface sensors 31A and 31B, and on the first outer-surface temperature $T_{b2}$ and the second outer-surface temperature $T_{b4}$ measured by the outer surface sensors 33A and 33B.

Specifically, arithmetic formulas expressed by Eq. (7) above and Eq. (19) below are stored in the heat flux calculating device 444, and the heat fluxes $Q_{u1}$ and $Q_{u2}$ are calculated using these arithmetic formulas.

$$Qu2 = \frac{Tb3 - Tb4}{Ru2} \quad (19)$$

From Eq. (9) and Eq. (10) of the second embodiment, the temperature $T_{core}$ of the deep area is expressed by Eq. (20) and Eq. (21) below.

$$T_{core} = Q_{u1} \cdot (R_s + R_t) + T_{b1} \quad (20)$$

$$T_{core} = Q_{u2} \cdot (R_s + R_t) + T_{b3} \quad (21)$$

The heat resistance $R_s+R_t$ in the area that extends from the deep area of the human body 2 to the body surface 2A is expressed by Eq. (22) below, from Eq. (20) and Eq. (21).

$$Rs + Rt = \frac{Tb3 - Tb1}{Qu1 - Qu2} \quad (22)$$

Therefore, Eq. (22) is stored in the heat resistance calculating device 443. Based on this arithmetic formula, the heat resistance calculating device 443 calculates the surface-layer heat resistance $R_s+R_t$ of the area that extends from the deep area of the human body 2 to the body surface 2A, using the calculated heat fluxes $Q_{u1}$ and $Q_{u2}$.

Either Eq. (20) or Eq. (21) is stored in the deep-area temperature calculating device 441. When the temperature $T_{core}$ of the deep area of the human body 2 is actually calculated, the deep-area temperature calculating device 441 uses the surface-layer heat resistance $R_s+R_t$ calculated by the heat resistance calculating device 443 to calculate the temperature of the deep area from the body-surface temperature obtained by the body-surface sensors 31A and 31B and from the outer-surface temperature obtained by the outer surface sensors 33A and 33B.

In other words, in cases in which, for example, Eq. (21) is stored in the deep-area temperature calculating device 441, the temperature $T_{core}$ of the deep area may be calculated using the first heat resistance $R_{u1}$ as well as the first body-surface temperature $T_{b1}$ and the first outer-surface temperature $T_{b2}$ obtained from the body-surface sensor 31A.

With such a structure of the control device 44, a surface-layer heat resistance $R_s+R_t$ corresponding to the heat transfer characteristics of the human body 2 can be obtained, and the temperature $T_{core}$ of the deep area can therefore be accurately calculated according to the heat transfer characteristics of the human body 2 without being affected by differences in the type of human body 2.

Since the surface-layer heat resistance $R_s+R_t$ change only slightly except, for example, in special circumstances such as a sudden change in the type of human body 2, the heat flux $Q_{s+r}$ may be calculated by the heat flux calculating device 444, and the surface-layer heat resistance $R_s+R_t$ may be calculated by the heat resistance calculating device 443 the first time body temperature measurement is begun. In this case, for example, the calculated surface-layer heat resistance $R_s+R_t$ may be stored in the storage unit 45, and the surface-layer heat resistance $R_s+R_t$ may be read out from the storage unit 45 and used whenever the temperature of the deep area is calculated by the deep-area temperature calculating device 441 from the body-surface temperature and the outer-surface temperature.

When there is a change in the heat transfer characteristics of the human body 2, such as a sudden change in the body type, the first body-surface temperature $T_{b1}$ and second body-surface temperature $T_{b3}$, as well as the first outer-surface temperature $T_{b2}$ and second outer-surface temperature $T_{b4}$ may be measured again by the body-surface sensors 31A and 31B and the outer surface sensors 33A and 33B to calculate the heat fluxes $Q_{u1}$ and $Q_{u2}$ and the surface-layer heat resistance $R_s+R_t$.

Also, since there is little variation in the surface-layer heat resistance $R_s+R_t$ particular to the human body 2, when the thermometer 1 is used again, the surface-layer heat resistance $R_s+R_t$ previously calculated can be used, and therefore the time until body temperature measurement initiation is started can be shortened for the second and subsequent measurements. In this case, if the surface-layer heat resistances $R_s+R_t$ for multiple human bodies 2 are stored in the storage unit 45, the surface-layer heat resistances $R_s+R_t$ previously calculated can be read out and used again by operating the operating unit 43. In this case, an organism selection may be made to specify the human body 2 with the aid of the operating unit 43 whenever the body temperature measurement step is performed.

Modification 3

In the sixth embodiment, the heat resistance calculating device is not limited to one that determines the surface-layer heat resistance by using the body-surface temperature and the outer-surface temperature, and may determine the heat resistance from the body-surface temperature and the outside-air temperature.

Figure 31:
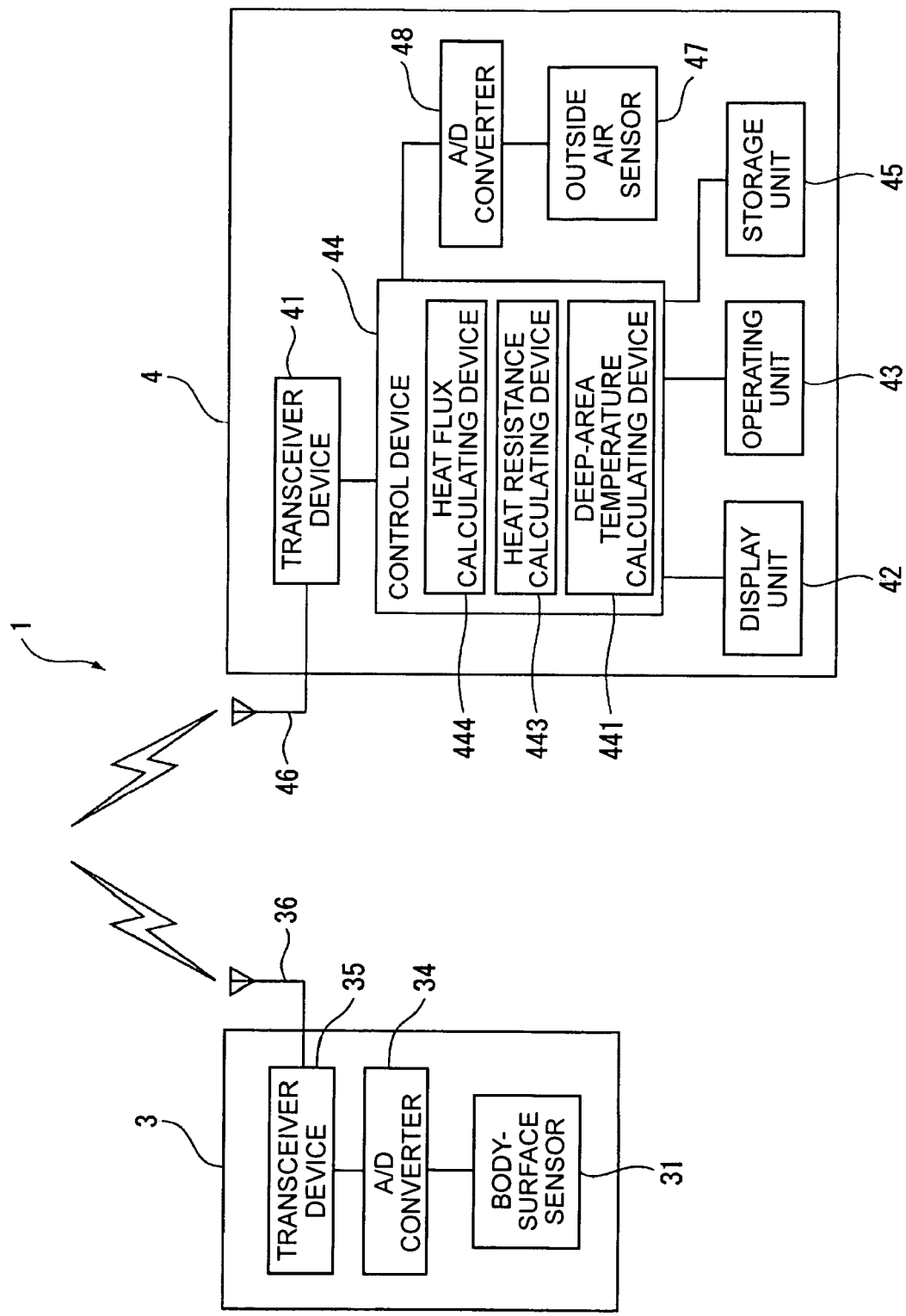
FIG. 31 is a view of a block diagram showing a thermometer according to a third modification.

FIG. 31 shows a block diagram of a modification of the thermometer 1 of the sixth embodiment. As shown in FIG. 31, the thermometer main body 3 is provided with a body-surface sensor 31, an A/D converter 34, and a transceiver device 35. The display device 4 is provided, similar to the sixth embodiment, with a transceiver device 41, a display unit 42, an operating unit 43, a control device 44, and a storage unit 45, and, additionally, an outside air sensor 47 as a reference temperature measuring unit (outside-air temperature measuring device) for measuring the outside-air temperature, and an A/D converter 48. The outside air sensor 47 and the A/D converter 48 have the same configuration as the outer surface sensor 33 and the A/D converter 34 of the sixth embodiment.

In the thermometer 1, the outside air sensor 47 measures the outside-air temperature $T_{amb}$. Therefore, the surface-layer heat resistance $R_s+R_t$ is calculated by the heat flux calculating device 444 according to the following formula on the basis of the for-calculation body-surface temperature $T_{0,b1}$ and the for-calculation outside-air temperature $T_{0,amb}$ in FIG. 19.

$$R_s + R_t = \frac{T_{0,core} - T_{0,b1}}{T_{0,b1} - T_{0,amb}} \cdot (R_u + R_v)$$

In this configuration, the outside air sensor 47 is provided to the display device 4, and the number of components in the thermometer main body 3 can therefore be further reduced, whereby the thermometer main body 3 can be additionally reduced in weight and size. Also, the outside air sensor 47 measures the outside-air temperature $T_{amb}$ instead of measuring the outer surface 30 of the thermometer main body 3, and a more stable temperature can therefore be measured.

In the first and fifth embodiments, the temperature measuring devices 3A and 3B are formed integrally on one thermal insulating material 37, but the thermal insulating material 37 may also be divided in two and the temperature measuring devices 3A and 3B may be formed separately.

In the fourth and seventh embodiments, the measuring units are not limited to the body surface, the intermediate area, and the outer surface, but may also constitute a plurality (at least three) of elements so that a curve approximation can be made. Also, the positions of the measuring units are not limited to the body surface or the outer surface, and can constitute any arbitrary positions. In the case that four or more measuring units are provided, a polynomial expression whose order is increased in proportion to the number of measuring units may be used as the temperature distribution function when the temperature distribution is calculated.

Logarithms are not necessary to calculate a temperature distribution, and merely performing an approximation as a polynomial expression with an increased order may be employed, as shown in the following formula, for example.

Also, the curve approximation is not limited to a polynomial approximation and may also include logarithm approximation, exponential approximation, or other types of approximations.

$$T(R)=a+bR+cR^2$$

In the first embodiment, the heat flux was adjusted using the thermal insulating material 38A and thermal insulating material 38B, but the heat flux can also be adjusted using a heater.

In the fifth embodiment, the temperature measuring devices 3A and 3B had a common thermal insulating material 37, but such a configuration is not an absolute necessity, and the total heat resistances of the temperature measuring devices 3A and 3B may be different. Therefore, the temperature measuring devices may be configured, for example, from two thermal insulating materials with different heat resistances, and the measuring units may be disposed at positions on these thermal insulating materials at which the measuring units corresponding to the temperature measuring devices have the same heat resistances from the body surface.

In the sixth embodiment, the for-calculation deep-area temperature was measured with a known thermometer and was input by the operator 5 into the control device 44 by operating the operating unit 43 of the display device 4, but the present invention is not limited to this option alone. Since the display device 4 includes a transceiver device 41, for example, the for-calculation deep-area temperature measured with a known thermometer may also be received by the transceiver device 41 via wireless communication. In this case, the body temperature measuring operation can be simplified because there is no need for the operator 5 to input the for-calculation deep-area temperature. Also, since the for-calculation deep-area temperature is acquired (received) by a communication device that uses an originally present transceiver device 41, the configuration of the thermometer 1 can be prevented from becoming complicated. Therefore, size reduction in the thermometer 1 can be facilitated because the number of structural components in the thermometer 1 can be prevented from increasing.

In the case that the thermometer main body and the display device are configured integrally instead of separately, a reception device may be provided separately from the thermometer for receiving the for-calculation deep-area temperature via wireless communication.

In the previous embodiments, the transceiver device is not limited to wireless communication with an antenna, and the thermometer main body and display device may be wired and operated by wired communication, for example. In such a configuration, there is no need for radio communication, and the effects of radio waves on the human body can therefore be eliminated. The configuration for electric power supply can be simplified because electricity can be supplied to the thermometer main body through the wires.

An A/D converter to convert analog temperature signals to digital signals was provided, but the configuration is not limited to this option alone and may be devoid of an A/D converter. In this case, it is possible, for example, to use a converter to convert temperature to frequency, and the temperature that has been converted to resistance or voltage can be subjected to frequency conversion by a multivibrator circuit, an oscillating circuit, a V-F encoder, or the like. Also, the temperature values may be converted to time. In this case, the signals converted to frequencies should be further converted to periodic time intervals or pulse width.

The thermometer is not limited to one in which the display device and the thermometer main body are provided as separate elements, and the display device and thermometer main body may be configured integrally.

The thermometer may be configured so that when the display device 4 and the thermometer main body 3 are provided separately as in the previous embodiments, the display device 4 manages information from a plurality of thermometer main bodies 3. In this case, an ID code or the like whereby the thermometer main bodies 3 can be distinguished may be provided, and the configuration should be designed so that the thermometer main bodies 3 can be identified and managed by the display device 4.

The thermometer information may be sent to a computer terminal or the like to manage the information about a plurality of thermometers. In this case, operability is improved because the body temperature data and the like for each organism can be stored and managed in the computer terminal. Also, with such a configuration, the thermometer can be made more convenient because previously calculated body temperature data and the like can be acquired from the computer terminal when a different thermometer is used.

In the previous embodiments, the thermometer main body 3 was capable of being attached by an adhesive, but the present invention is not limited to this option alone. In cases in which the thermometer main body 3 is incorporated into a hat or hair band, for example, the body-surface temperature measuring device can be attached to the forehead or back of the neck and brought into contact with the body surface when the hat or hair band is worn. Also, if the thermometer main body is incorporated into undergarments or the like, the body temperature measuring device can be brought into contact with the back or chest when the undergarments are worn.

The shape of the display device is not limited to a wristwatch, and may be a stationary object or in the form of a pendant, for example.

The preferred configurations, methods, and other aspects employed in order to carry out the present invention were disclosed in the above descriptions, but the present invention is not limited to these options alone. Specifically, the present invention is particularly illustrated and described primarily with reference to specific embodiments, but those skilled in the art can make various modifications to the shapes, materials, quantities, and other specific details of the embodiments described above without deviating from the scope of the technical ideas and objects of the present invention.

Therefore, the descriptions that are disclosed above with reference to limited shapes, materials, and other aspects are given solely with the intent of making the present invention easy to understand and are not intended to limit the present invention. For this reason, descriptions that contain names of members in which some or all of the aforedescribed limitations on shapes, materials, and other items have been removed are also included in the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A thermometer comprising:
   first temperature measuring device being configured to contact a first body surface of an organism, said first temperature measuring device having
      a first base temperature measuring unit to measure a first base temperature from said first body surface at a first base temperature measuring position having a first heat resistance, and
      a first heat flux measuring unit to measure a first heat flux at said first base temperature measuring position;
   second temperature measuring device being configured to contact a second body surface at a position different from said first body surface, said second temperature measuring device having
      a second base temperature measuring unit to measure a second base temperature from said second body surface at a second base temperature measuring position having a second heat resistance having an unknown ratio to said first heat resistance, and
      a second heat flux measuring unit to measure a second heat flux at said second base temperature measuring position;
   a heat flux adjusting device being configured to set said first heat flux and said second heat flux at different values; and
   a deep-area temperature calculating device being configured to calculate the temperature of a deep area in the organism using the ratios of said first and second base temperatures, said first and second heat flux, and said first and second heat resistance.

2. The thermometer according to claim 1, wherein
   said first temperature measuring device has a first reference temperature measuring unit to measure the temperature of a first reference temperature measuring position where the heat resistance from said first body surface is different from said first heat resistance as a first reference temperature,
   said second temperature measuring device has a second reference temperature measuring unit to measure the temperature of a second reference temperature measuring position where the heat resistance from said second body surface is different from said second heat resistance as a second reference temperature,
   said first heat flux measuring unit calculates said first heat flux on the basis of said first base temperature, said first reference temperature, and said heat resistance between said first base temperature measuring position and said first reference temperature measuring position,
   said second heat flux measuring unit calculates said second heat flux on the basis of said second base temperature, said second reference temperature, and heat resistance between said second base temperature measuring position and said second reference temperature measuring position, and
   a ratio of the heat resistance between said first base temperature measuring position and said first reference temperature measuring position, and said heat resistance between said second base temperature measuring position and said second reference temperature measuring position is known.

3. The thermometer according to claim 2, wherein
   thermal insulating materials having a common heat resistance are disposed between said first base temperature measuring position and said first reference temperature measuring position, and between said second base temperature measuring position and said second reference temperature measuring position, and said heat flux adj Listing device has a first thermal insulating material disposed between said first reference temperature measuring position and the outside air, and a second thermal insulating material disposed between said second reference temperature measuring position and the outside air and provided with a different heat resistance from the heat resistance of said first thermal insulating material.

4. The thermometer according to claim 2, wherein said heat flux adj ustment device has a first thermal insulating material disposed between said first base temperature measuring position and said first reference temperature measuring position, and a second thermal insulating material disposed between said second base temperature measuring position and said second reference temperature measuring position, and wherein said first thermal insulating material and said second thermal insulating material have a common thermal conductivity and cross section, and a thickness of said first thermal insulating material and a thickness of said second thermal insulating material are different.

5. The thermometer according to claim 2, wherein said first heat resistance and said second heat resistance are the same, and a formula, $$Tcore = \frac{\{Tb3 \cdot (Tb1 - Tb2) - \alpha \cdot Tb1 \cdot (Tb3 - Tb4)\}}{\{(Tb1 - Tb2) - \alpha \cdot (Tb3 - Tb4)\}},$$

is stored in said deep-area temperature calculating device to calculate a temperature $T_{core}$ of said deep area, $T_{b1}$ is a first base temperature, $T_{b2}$ is a first reference temperature, $T_{b3}$ is a second base temperature, $T_{b4}$ is a second reference temperature, and $\alpha$ is a ratio of heat resistance between said first base temperature measuring position and said first reference temperature measuring position, and the heat resistance between said second base temperature measuring position and said second reference temperature measuring position.

6. A method for measuring body temperature in a deep area in an organism, comprising:

measuring a first base temperature at a first base temperature measuring position having a first heat resistance from a first body surface of the organism;

measuring a first heat flux at the first base temperature measuring position;

measuring a second base temperature at a second base temperature measuring position having a second heat resistance whose ratio to the first heat resistance is unknown from a second body surface that is different from the first body surface;

measuring a second heat flux at the second base temperature measuring position; and calculating a deep-area temperature in the organism using the ratios of the first and second base temperatures, the first and second heat fluxes, and the first and second heat resistance.

7. The body temperature measuring method according to claim 6, wherein the temperature at a first reference temperature measuring position, where the heat resistance from the first body surface is different from the first heat resistance, is measured as a first reference temperature, and the first heat flux is calculated based on the first base temperature, the first reference temperature, and the heat resistance between the first base temperature measuring position and the first reference temperature measuring position, and the temperature at a second reference temperature measuring position, where the heat resistance from the second body surface is different from the second heat resistance, is measured as a second reference temperature, and the second heat flux is calculated based on the second base temperature, the second reference temperature, and the heat resistance between the second base temperature measuring position and the second reference temperature measuring position.

8. The method for measuring body temperature according to claim 6, wherein the first heat resistance and the second heat resistance have the same value, and calculating the deep area temperature, the temperature $T_{core}$ of the deep area is calculated by the formula $$Tcore = \frac{\{Tb3 \cdot (Tb1 - Tb2) - \alpha \cdot Tb1 \cdot (Tb3 - Tb4)\}}{\{(Tb1 - Tb2) - \alpha \cdot (Tb3 - Tb4)\}}$$

where $T_{b1}$, is a first base temperature, $T_{b2}$ is a first reference temperature, $T_{b3}$ is a second base temperature, $T_{b4}$ is a second reference temperature, and $\alpha$ is the ratio of the heat resistance between the first base temperature measuring position and the first reference temperature measuring position, and the heat resistance between the second base temperature measuring position and the second reference temperature measuring position.

* * * * *